(12) United States Patent
Sanford

(10) Patent No.: US 6,688,891 B1
(45) Date of Patent: Feb. 10, 2004

(54) METHOD AND APPARATUS FOR AN ELECTRONIC COLLABORATIVE EDUCATION PROCESS MODEL

(75) Inventor: Michael D. Sanford, LaGrange, TX (US)

(73) Assignee: Inter-Tares, LLC ( * ) Notice: Subject to any disclaimer, the term of this patent is extended or adjusted under 35 U.S.C. 154(b) by 227 days.

(21) Appl. No.: 09/979,674
(22) PCT Filed: Aug. 28, 2000
(86) PCT No.: PCT/US00/23622
§ 371 (c)(1), (2), (4) Date: Nov. 6, 2001
(87) PCT Pub. No.: WO01/16917
PCT Pub. Date: Mar. 8, 2001

Related U.S. Application Data

(60) Provisional application No. 60/151,241, filed on Aug. 27, 1999.

(51) Int. Cl.[7] .............................................. G09B 11/00
(52) U.S. Cl. ................................... 434/365; 434/307 R
(58) Field of Search ............................... 434/322, 323, 434/350, 362, 365, 307 R, 353; 709/227

(56) References Cited

U.S. PATENT DOCUMENTS

| | | | |
|---|---|---|---|
| 4,820,167 A | * 4/1989 | Nobles et al. .............. 434/336 |
| 5,261,823 A | 11/1993 | Kurokawa .................. 434/323 |
| 5,273,437 A | 12/1993 | Caldwell et al. ............ 434/351 |
| 5,294,229 A | 3/1994 | Hartzell et al. ............. 434/336 |
| 5,295,836 A | 3/1994 | Ryu et al. ................... 434/335 |
| 5,307,055 A | 4/1994 | Baskin et al. .................. 345/1 |
| 5,477,510 A | * 12/1995 | Ukita ........................... 369/18 |
| 5,601,436 A | 2/1997 | Sudman et al. ............. 434/307 |
| 5,727,950 A | 3/1998 | Cook et al. ................. 434/350 |
| 5,769,643 A | 6/1998 | Stevens, III ................ 434/350 |
| 5,823,788 A | 10/1998 | Lemelson et al. .......... 434/350 |
| 5,829,983 A | 11/1998 | Koyama et al. ............. 434/118 |
| 5,947,747 A | * 9/1999 | Walker et al. .............. 434/354 |
| 6,088,730 A | * 7/2000 | Kato et al. .................. 709/227 |
| 6,091,930 A | * 7/2000 | Mortimer et al. ........... 434/362 |
| 6,181,910 B1 | * 1/2001 | Jerrold-Jones et al. ...... 434/353 |
| 6,505,031 B1 | * 1/2003 | Slider et al. ................ 434/350 |

OTHER PUBLICATIONS

NetSchools Launches Revlutionary Technology Solution for k–12 that Defines the New 21st Century Classroom; Innovative "Kid–Proof" Laptop at Heart of Solution, Apr. 25, 1997, Bussiness Wire.*

PCT International Search Report, PCT/IS00/23622, Oct. 22, 2000.

* cited by examiner

Primary Examiner—Joe H. Cheng
Assistant Examiner—Kathleen M. Christman
(74) Attorney, Agent, or Firm—Melvin A. Hunn

(57) ABSTRACT

A method and apparatus is provided for facilitating education operations. A portable processor-based apparatus is provided which is used by a student and his or her parents. The portable device is adapted to releasably couple with a cradle which is maintained at least in the school environment. The portable unit may be coupled through the cradle to a school network. The portable unit may be utilized by the student, parents, and teacher to perform a number of specific school related activities including a presentation of course materials; the assignment, completion and return of homework assignments; the maintenance of school records; and digital communication between or among the student, teacher, and parents. The device preferably includes biometric security systems which limit the access to both the device and data maintained in the device or in the school network.

46 Claims, 33 Drawing Sheets

E-SLATE TRANSACTION
RECORD FLOW IN LICENSING AUTHORITY'S
VALIDATION MASTER FILE 2800

| E-SLATE SERIAL NUMBER | DATE/TIME OF TRANSACTION | REPORTING ENTITY ID | TRANSACTION |
|---|---|---|---|
| 2805 "1001" | 2001/01/01 19:40 | LICENSING AUTHORITY | SERIAL NUMBER LICENSED/ISSUED TO MFG. PLANT #6 |
| 2810 "1001" | 2001/02/01 14:30 | MFG. PLANT #6 | SERIAL NUMBER BURNED IN PROM |
| 2815 "1001" | 2001/02/21 12:22 | MFG. PLANT #6 | E-SLATE UNIT MANUFACTURED |
| 2820 "1001" | 2001/03/05 11:40 | MFG. PLANT #6 | UNIT SHIPPED TO SCHOOL ENTITY "A" |
| 2825 "1001" | 2001/03/15 13:10 | SCHOOL ENTITY "A" | RECEIVED UNIT INTO SCHOOL'S INVENTORY |
| 2830 "1001" | 2001/08/15 08:00 | SCHOOL ENTITY "A" | UNIT ISSUED TO LOCAL STUDENT ID "X" |
| 2835 "1001" | 2001/09/23 09:15 | SCHOOL ENTITY "A" | UNIT REPORTED "LOST" |
| 2840 "1001" | 2001/09/23 10:15 | SCHOOL ENTITY "A" | UNIT REPLACED BY UNIT "9009" REISSUED TO STUDENT "X" |
| 2845 "1001" | 2001/10/15 09:15 | REPORTING ENTITY "R" | UNIT REPORTED "FOUND" |
| 2850 "1001" | 2001/10/25 08:17 | LICENSING AUTHORITY | UNIT HAS BEEN SHIPPED TO SCHOOL ENTITY "A" |
| 2855 "1001" | 2001/11/15 09:29 | SCHOOL ENTITY "A" | UNIT RECEIVED BACK INTO SCHOOL'S INVENTORY OF AVAILABLE E-SLATES |
| 2860 "1001" | 2002/01/17 14:39 | SCHOOL ENTITY "A" | UNIT ISSUED TO LOCAL STUDENT ID "Y" |

FIGURE 28A

E-SLATE TRANSACTION
RECORD FLOW IN LICENSING AUTHORITY'S
VALIDATION MASTER FILE 2800 (CONTINUED)

| E-SLATE SERIAL NUMBER | DATE/TIME OF TRANSACTION | REPORTING ENTITY ID | TRANSACTION |
|---|---|---|---|
| 2865 "1001" | 2002/03/01 09:05 | SCHOOL ENTITY "B" | LOCAL STUDENT "Y" IS TRANSFERRING WITH UNIT, ASSIGNED NEW LOCAL STUDENT ID "YY" |
| 2870 "1001" | 2002/03/01 09:20 | LICENSING AUTHORITY | UNIT NOW ASSIGNED TO SCHOOL ENTITY "B" |
| 2875 "1001" | 2002/05/15 12:22 | SCHOOL ENTITY "B" | STUDENT "Y" HAS BEEN GRADUATED, UNIT RETURNED TO SCHOOL'S INVENTORY |
| 2880 "1001" | 2002/08/15 11:40 | SCHOOL ENTITY "B" | UNIT ISSUED TO LOCAL STUDENT "Z" |
| 2885 "1001" | 2002/09/15 13:10 | SCHOOL ENTITY "B" | STUDENT "Z" AND UNIT REPORTED AS "MISSING", ALERT REQUESTED |
| 2887 "1001" | 2002/09/15 13:11 | LICENSING AUTHORITY | ALERT ISSUED ON THIS UNIT AND STUDENT "Z"'S BIOGRAPHICS AND BIOMETRICS |
| 2890 "1001" | 2002/09/16 08:00 | REPORTING ENTITY "S" | MISSING UNIT FOUND IN ANOTHER STATE, SCHOOL, PARENTS AND AUTHORITIES ARE NOTIFIED |
| 2894 "1001" | 2002/10/20 09:15 | SCHOOL ENTITY "C" | REPORTS ATTEMPT TO REGISTER STUDENT "Z" UNDER FALSE ID BY NON-CUSTODIAL PARENT, BUT BIOBMETRICS MATCH "ALERTED" UNIT'S, AUTHORITIES NOTIFIED |
| 2898 "1001" | 2002/10/21 10:15 | SCHOOL ENTITY "B" | STUDENT "Z" RETURNED SAFELY TO PARENTS, ALERT REMOVED, UNIT REISSUED |

FIGURE 28B

STUDENT TRANSACTION
RECORD FLOW IN LICENSING
AUTHORITY'S
VALIDATION MASTER FILE 2900

| LOCAL STUDENT ID | DATE/TIME OF TRANSACTION | REPORTING ENTITY ID | TRANSACTION |
|---|---|---|---|
| 2905 "X" | 2001/08/15 08:00 | SCHOOL ENTITY "A" | SERIAL NUMBER "1001" ISSUED TO STUDENT |
| 2910 "X" | 2001/09/23 09:15 | SCHOOL ENTITY "A" | UNIT "1001" REPORTED LOST |
| 2915 "X" | 2001/09/23 10:15 | SCHOOL ENTITY "A" | ISSUED REPLACEMENT UNIT "9009" |
| 2920 "Y" | 2002/01/17 14:39 | SCHOOL ENTITY "A" | UNIT "1001" ISSUED TO STUDENT |
| 2925 "Y" | 2002/03/01 09:05 | SCHOOL ENTITY "B" | STUDENT IS TRANSFERRING FROM SCHOOL ENTITY "A", AND IS ASSIGNED NEW LOCAL STUDENT ID "YY" |
| 2930 "YY" | 2002/03/01 09:06 | SCHOOL ENTITY "B" | CROSS INDEX NEW ID TO SCHOOL ENTITY "A"'S LOCAL STUDENT ID "Y" |
| 2935 "YY" | 2002/05/15 12:22 | SCHOOL ENTITY "B" | STUDENT GRADUATED, UNIT "1001" RETURNED TO SCHOOL'S INVENTORY |
| 2940 "Z" | 2002/08/15 11:40 | SCHOOL ENTITY "B" | STUDENT ISSUED UNIT "1001" |
| 2945 "Z" | 2002/09/15 13:10 | SCHOOL ENTITY "B" | STUDENT AND UNIT "1001" REPORTED MISSING, ALERT REQUESTED |
| 2950 "Z" | 2002/09/15 13:11 | LICENSING AUTHORITY | ALERT ISSUED ON STUDENT'S BIOGRAPHIC AND BIOMETRIC INFORMATION AND ON UNIT "1001" |
| 2955 "Z" | 2002/09/16 08:00 | REPORTING ENTITY "S" | STUDENT'S E-SLATE REPORTED FOUND |
| 2960 "Z" | 2002/10/20 09:15 | SCHOOL ENTITY "C" | REPORTED ATTEMPT TO REGISTER STUDENT UNDER FALSE ID, BIOMETRICS MATCHED UNIT "1001"'S |
| 2965 "Z" | 2002/10/21 10:15 | SCHOOL ENTITY "B" | STUDENT RETURNED, UNIT "1001" REISSUED, ALERT REMOVED |

FIGURE 29

SCHOOL ENTITY AND STUDENT
ID STRUCTURE 3000

| STUDENT EXAMPLE | COUNTRY CODE | STATE CODE | REGIONAL EDUCATIONAL SERVICE CENTER (IF APPLICABLE) | STATE "DISTRICT" CODE | DISTRICT CAMPUS CODE | LOCAL STUDENT ID NO. |
|---|---|---|---|---|---|---|
| SCHOOL ENTITY "A" | | | (MONTE ALTO ISD) | | | |
| "X" | USA | TX | ESC 01 | 106915 | 001 (ELEMENTARY) | 777-77-7777 (FAUX SSN ASSIGNED BY DISTRICT) |
| "Y" | USA | TX | ESC 01 | 108915 | 002 MIDDLE SCHOOL | 123-45-6789 STUDENT'S VALID SSN |
| SCHOOL ENTITY "B" | | | VALLEY VIEW ISD | | | |
| "YY" | USA | TX | ESC 01 | 108916 | 001 HIGH SCHOOL | 123-45-6789 STUDENT'S VALID SSN |
| "Z" | USA | TX | ESC 01 | 108916 | 101 ELEMENTARY | 456-00-0000 STUDENT'S VALID SSN |
| SCHOOL ENTITY "C" | | | BENITO JAUREZ ELEMENTARY, COL ROMA, MEXICO CITY, MEXICO | | | LOCAL STUDENT ID NOT ISSUED BY SCHOOL ENTITY "C" AS E-SLATE ALERT FROM SCHOOL ENTITY "B" ("MISSING" STUDENT "Z") MATCHED "NEW STUDENT'S" BIOMETRICS |
| "Z" | MEX | DF | N/A | 1000 | 020 | |

NON-CUSTOMDIAL PARENT ATTEMPTED
REGISTRATION OF STUDENT "Z"
IN SCHOOL ENTITY "C"

FIGURE 30

METHOD AND APPARATUS FOR AN ELECTRONIC COLLABORATIVE EDUCATION PROCESS MODEL

This application claims the benefit of U.S. provisional application No. 60/151,241 filed Aug. 27, 1999.

TECHNICAL FIELD

The method and apparatus of the present invention relates, when employed in the USA, to K-12 (kindergarten through graduation from high school) education. By expanding or including the student into the communications directed to the parent/guardian (or even completely replacing the "parent roll" with that of the adult student), the invention is applicable to two (2) year associate and four (4) year undergraduate programs as well as trade schools and other educational/training institutions.

BACKGROUND ART

In the United States of America, one of the founding principles of our Republic has been to provide the best public education possible to the young citizens and residents of our country. Over the past five decades, the importance of public education to our national security, social well-being, competitiveness and economic health has been underlined numerous times by our presidents and other leaders. From the "Sputnik panic" of the 1950's, the "math gap" of the 1960's, the "Nation at Risk" Report of the 1980's through presidential initiatives to "connect every classroom in America to the Internet" during the 1990's, the importance of making public schools as productive, efficient and effective remains a paramount social, political and economic issue. Some say the very existence and continuance of our democratic institutions will depend on an ever-more educated and computer-literate society in the future.

Given this importance to our society and the nation, few revolutionary innovations in the way public education is actually conducted have been made, despite tremendous advances in technology and communications. Many public schools have web-pages and Internet/Intranet connectivity. Some even have video conferencing, distance learning and video broadcast/streaming capabilities. Hundreds of thousands of new desk top computers have been added to campus computer labs and now even into the classrooms themselves. In some states students are issued relatively expensive notebook computers that they can take home, but such initiatives have been both isolated and sporadic, at best.

The typical K-12 school in America today works in the following way: At the beginning of the school year, parents or legal guardians must physically go to the local school campus and appear at the school's office and "register" their child in order for him or her to be able to attend class. Normally a paper registration form is given to the parents by the school's clerk, which is then filled-out and signed by the parents. This form normally provides basic information about the student (home address, d.o.b., last school attended, immunizations, etc.) and information pertaining to the parents/guardians (work numbers, emergency numbers, etc.). The paper document is then filed by the school clerk either manually or some or all of the data is input into a school computer database either at the campus or centrally at the district administration offices.

If the student is a "returning student" then his or her "permanent record" (normally a paper file stored in a filing cabinet) is pulled by the school clerk, the new forms are added and all is re-filed (returned to the filing cabinet). It the student is transferring from another school district or state school system, then often a phone call will suffice to fax or mail "everything" in the student's permanent record (paper file) from the previous school. Protocols for "who is authorized" to request the transfer of the student's permanent record vary greatly from school district and state. However, it is obvious that the opportunity for incomplete records to follow the child from district to district and state to state is very great. Health records, disciplinary write-ups, special testing results (gifted and talented, special education, outside professional evaluations) are often not transferred to other schools, for various reasons, not the least of which are "privacy concerns".

Once in the classroom, the student's attendance, tardiness or absence is noted on an attendance sheet by the teacher and sent to the school's office. The student's daily performance is recorded by the teacher usually still in a paper file. Summary grades are sent to the office on a regular periodic basis. Periodic "report cards" (issued usually every six or nine weeks) are little more than summary information about the student's attendance, behavior and scholastic performance. One or both of the student's parents or legal guardians must sign the report card in ink to "certify" their receipt and review of the information. The card is thus first delivered by the student to the parents and then returned by the student to the teacher after the parent's signature.

The latest "craze" in public schools in this country is the school providing on-line "progress reports" on the Internet, accessible to a student's parents by password and log-in. But again, such simplistic approaches are limited and applicable to only those parents with knowledge of and access to personal computers and the Internet: hardly a universally fair, equitable or workable solution for this or any other country's public schools.

Seldom is there any formal, consistent daily communication between teacher and parents. The current education system usually reports only "history" rather than "news" relating to the parents' child. Interventions on the student's behalf (i.e. detecting dyslexia, attention deficit syndrome, other physical and/or emotional, disciplinary and/or health challenges) are usually slow to occur and difficult to coordinate (i.e. the school nurse collaborating with the student's teacher, parents, counselor, and personal physician regarding a potential hearing problem possibly being the root cause of the student recently having been disciplined for "not paying attention in class").

In order to facilitate a more consistent and sustainable daily flow of information with students and their parents, some classroom teachers employ an "assignment book", usually a spiral notebook in which the teacher may make notes specifically to the student's parents about specific assignments or specific needs of the student, and/or the parents can write specific questions or provide information to the teacher regarding their child's participation in the classroom, including excused absences.

An example of this interchange, for example, would be the "assignment book" entry from the teacher to the parents that "Johnny" has not been handing in his homework on time for the past few weeks. Johnny's parents are thus alerted of a potential problem and can "intervene" in a timely basis in the home or request to meet with the teacher/counselor to discuss the problem. The request for such a meeting is also made by the parents noting a request in the "assignment book", which the teacher/counselor would likewise initial (thus "certifying" the communication) and stating the time and date of the requested appointment with Johnny's parents. Of course Johnny can read all this "written" traffic back and forth between his parents and his teacher.

Clearly such written assignment book based communications are neither private nor secure. The student can read everything being written about him or her by either the parents or the teacher at anytime. Often the ability to provide information candidly might be more effective in dealing with the social or academic challenges of the student. Such a system also assumes a certain level of reading and writing ability on the part of the parents.

Furthermore, with class size in the US often exceeding a ratio of 20+ students per teacher, clearly such a handwritten-based system causes an additional workload and burden on the teacher that is barely supportable with the best of intentions. It is difficult to sustain such a system manually. Each book must be updated daily "by hand" by the teacher, and therefore these communications often become too brief to be meaningful or useful to the parents.

Some propose to simply expand the use e-mail to facilitate the communications between educators, student and parents. Such simplistic approaches are being attempted by school districts nationwide in this country and in other progressive societies around the world. This approach as a "universal" solution in public education is flawed and dead ends quickly. In order to truly be an education process model that addresses the needs of all a nation's children, an e-mail based solution must assume access to a computer and access to the Internet both exist in 100% of its students' homes. That simply is not the case in this country, nor is it a goal obtainable by the vast majority of countries in the world for decades to come, if ever.

Also e-mail based systems that simply use "passwords" to "identify" the recipient of information and communications are not secure, as people in the same household historically are casual about religiously keeping such information confidential (i.e. the parent's school password kept on a post-it note underneath the keyboard, or one spouse yelling to the other spouse that's in the shower "honey, do you remember our school access password?", would be little surprise for any of us). Biometrics offers the only practical and realistic method of "certifying" who is accessing, sending or just reading information. The present invention employs such biometric certification in all interactions securely.

For example, in most schools today, if the student is to go on a field trip, a permission slip is sent home with the child for the parent to sign. How many "attempted forgeries" by little hands have taken place is not known. However, with the present invention, the acceptance or declining of "Bobby's field trip" would not be left to such obvious temptations to go around a disapproving parent or guardian. The "permission slip" delivered to the parent via e-mail would be even easier to "forge" if the child had somehow gotten knowledge of the parent's password. And again, any such e-mail-based education process model would unfairly exclude less fortunate families that have neither a home computer nor Internet access.

However, none of these "technological advances", from schools issuing notebook computers, to parent's buying desk top computers for the home or schools buying them for use in computer labs or in the classroom, to writing e-mail messages or posting information on the school's web site, no one advance or all together have fundamentally altered the parent, student, teacher, administrator communications, interaction and coordination capabilities "universally" in public schools. It is fine to have lunch menus and PTA meetings posted on the school web-page, but that does nothing regarding a specific student, with his or her specific educational issues and needs. It is fine to set up "collaborative" e-mail based forums between teacher and parents on the web, but still the majority of parents of school aged children still do not have access to the Internet or even a computer in the home. Conversion to such an overall education model nationally or even on a state level would be exclusionary; ignoring the children who often need coordinated efforts and help from educators the most; namely, the underprivileged child.

So amazingly, despite all the technological advances in virtually all other sectors of society, the fundamental "public education process model" and the devices employed have changed very little in the past 40 years. With the exception of an occasional computer lab, a little e-mail traffic and lunch menus being posted on the Internet (and maybe a metal detector at the door and even armed security guards) a student or teacher of 40 years ago would be as much "at home" with the procedures and educational devices used in the classroom of the year 2000 as they were in the classroom of the 1960's:

In this country, for the most part, school announcements are still made on the campus intercom, school bells ring in the hallways, students carry heavy paper textbooks, ring binders, satchels (now in "backpack form"). Teachers still "call roll", student's say "here" and the teachers place the paper attendance slips outside their classroom doors to be picked up (hopefully by the right "assisting student") and carried to the office. Occasionally the teacher sends a handwritten note to the student's parents (which may or may not make it to them) and summary paper report cards come out every six or nine weeks delivering just "a history of" rather than actual "current news about" the student's academic performance, social behavior and activities. It's back to the future all over again. Not for a lack of effort or commitment by dedicated teachers and administrators, but for lack of a fundamental transformation of the education process model and devices made available to them. Strapping rocket engines onto a horse and buggy will not result in a quantum improvement in public transportation. Issuing a few notebook computers here and there and sending e-mails to parents who may or may not have home Internet access will not result in a quantum improvement in universal public education, either.

Internationally, public education varies greatly in both the infrastructure available to students and teachers and the resources applied to public schools. One fact, however, is "universally" accepted by virtually all nations regarding educating their young: they need the very best education possible in order for them to be competitive in the global economy and for their people to excel as a whole.

It is in the interests of the entire international community, this nation and all nations, therefore, that quantum advances be made in the effectiveness and efficiency of public education throughout the world. There is as great a need (if not greater) for an education process model to be implemented worldwide that will transform the educational experience and opportunities for the children in the dusty streets of New Delhi, the ghetto's of South Africa, the most isolated pueblito of Mexico or rural Native American Reservation, as there is for such a transformation in New York City or London. The need to dramatically improve and transform public education's effectiveness knows no boundaries: geographic, political, cultural or economic.

The "content" of what is taught in a given nation's public schools must, of course, remain with the individual countries concerned, reflecting the social, cultural, political, national, linguistic, and artistic heritage and priorities of "the people". Rather, it is regarding how public education is facilitated, delivered and managed that the present invention seeks to transform . . . thus making the learning experience more rewarding for all children; from Manhattan to Mexico City, from Capetown to Copenhagen.

DISCLOSURE OF THE INVENTION

The present invention is a method and apparatus for effectuating a true Electronic Collaborative K-12 Education Process Model, bringing together parents, student, teachers and school administrative staff (principals, counselors, district, state, national and international education administrators and other professionals) to form a Team Education Community (TEC) employing a collaborative approach to virtually all aspects of learning and teaching. The present invention is meant to be deployed initially in the United States of America K-12 public school sector, but is applicable to public and private schools internationally, as well. By modifying the parent component to include an "adult student", the present invention is applicable to two (2) year associate and four (4) year undergraduate programs and even trade school and other specialized education/training institutions.

The present invention facilitates the entire mechanics of the K-12 (kindergarten through graduation from high school, in US parlance) interactivity between parents, students, teachers and administrators at all national, state, district, school campus and classroom levels. The ability for this interaction to take place internationally, where agreed to by sovereign nations, is also fully facilitated by the present invention, including provisions for an International Education Information Clearinghouse of "shared and reported" data between participating nations.

In a preferred embodiment, the apparatus for interaction between all these parties will be the electronic slate, hereafter referred to simply as the "e-Slate": a relatively lightweight portable computer-based device that includes a touch-screen display, a biometric identification security device for certification of actions in the collaborative process, a built-in speaker and microphone for audio recording and playback and an array of specialized collaborative, interactive, localized tutorial content, communications software and other education specific applications.

In the classroom (and optionally at home) a docking station, the e-Slate "Cradle" provides access to other network resources (printers, scanners, modems, routers, etc.) as well as Internet connectivity.

The e-Slate will act as an electronic textbook, writing tabletand courseware delivery device for both on-line or off-line collaborative or "distance" learning applications (having both video real-time and playback capabilities). In an optimal implementation it is envisioned that e-Slates would be issued to all students, teachers and administrators in the TEC along with an e-Slate "Cradle" hereafter referred to as the "e-Cradle," which will facilitate the ability in the home for hard copy printing and a full-sized modular QWERTY keyboard which could be localized for local languages with a Spanish, Russian, French, German, style keyboard. The e-Slate Cradle would also offer a variety of additional peripherals ranging from a larger video screens (for easier viewing), a computer mouse, optional video (net) camera, as well as an Internet/Intranet interface device (high speed modem, WAN network card or wireless device), CD or DVD players, scanners and other peripherals.

The present invention also provides a process model for licensing, manufacturing, distributing and tracking e-Slates internationally. The inventor's vision is for these devices to be licensed for manufacture (or at least assembly) locally throughout the world for each country's domestic public school sector. It is possible that certain components of the e-Slate and e-Slate Cradle could be made out of local materials by local manufacturers in even less developed countries (the body of the e-Slate Cradle being molded out of recycled car tires in Brazil or Bangladesh, for example). This would serve to cut costs and distribute "technology-based" employment and opportunities worldwide. Expanding local manufacture to include local software development and support would also serve to facilitate the full "localization" of e-Slates to accommodate local languages, writing systems, curricula, and content through local third party software and content developers. Local hardware maintenance companies would also participate and benefit.

Further, the present invention includes a process and method by which the e-Slate can be used as an ancillary tutoring device to assist students in redundant, but fundamental skill's enhancement exercises such as handwriting, spelling, and math. Because of the wide diversity of languages and character sets ("alphabets") used globally, it is envisioned that the use of local third party software developers and curriculum authors would modify and or develop and support these tutorial programs for their local community. Putting these critical aspects of the present invention in the hands of local educators, technicians and curriculum development professionals will help insure that sensitively to cultural, linguistic and ethnic considerations will be properly taken into account for each specific geographic area.

Finally, the present invention includes a data structure and process model for an international collaboration, exchange of, access to and sharing of information between national education clearinghouses using the e-Slate devices and methodology. Such voluntary cooperation between "sovereign nations" is mandatory for the "emerging global economy" to thrive for all peoples of the world. As more and more people become skilled and better trained, they tend to become more mobile and able to migrate, short term or long term, to better employment and economic opportunities throughout the globe. They take their children with them and hence the need to facilitate the efficient electronic exchange of information regarding public school records and students will only continue to grow.

The above as well as additional objectives, features, and advantages will become apparent in the following description.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of the preferred embodiment when read in conjunction with the accompanying drawings, wherein:

FIGS. 28A and 28B are representations of the flow of data record transactions from a licensing authority's validation master file, concerning a single exemplary e-Slate.

FIG. 29 is a representation of record transactions from a licensing authority's validation master file, concerning several exemplary students.

FIG. 30 is an exemplary depiction of the structure and components comprising school entity codes and student ID's of the examples used in FIGS. 28A, 28B, and 29.

BEST MODE FOR CARRYING OUT THE INVENTION

Figure 1A:
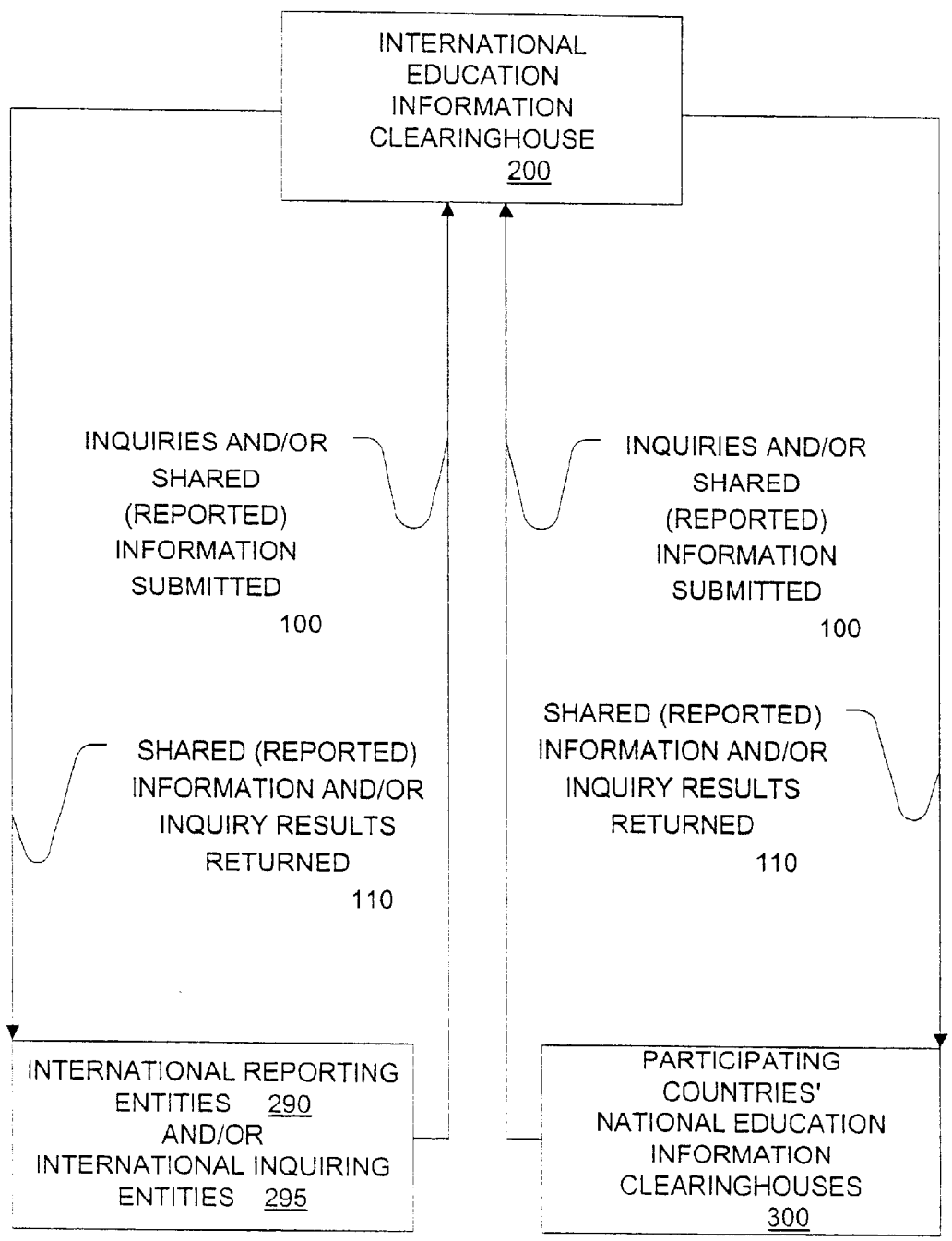
FIG. 1A is a block diagram representation of the flow of data and queries between international and national education information clearinghouses, reporting entities, and inquiring entities.

One goal of the present invention is the creation of a Team Education Community (TEC), bringing to bear all the "players" in education together for the benefit of the student. The medium of interchange will be the student's e-Slate. This device contains the student's textbook and other reading, video and curriculum materials in digital form, as well as homework, worksheets, course work, assignments, daily grades, etc . . . . But perhaps most importantly, the e-Slate will provide the secure medium by which teachers, administrators, the student and his or her parents come together on a daily basis, to share, inquire about and report "late breaking news" of the student's social and academic progress and status, instead of reporting "history" (e.g. periodic "report cards"), long after the fact, as is now the case in the majority of schools worldwide.

The e-Slate allows daily, secure, private communication, collaboration and interaction via several different avenues (handwritten or typed text, voice, video, on-line interactive or off-line replication) between all the constituent parties of the TEC. Further, it provides a means of fast response and intervention when challenges in the student's school experience arise, and serves to facilitate communication and coordination supporting the effectiveness of such remedies and corrective actions, all to the benefit of the student.

Furthermore, by incorporating elements of an existing patent of the inventor, the present invention provides for a "kindergarten to high school graduation" (and beyond) repository of information, encompassing all educational (and other relevant) entities (national and/or international) regarding the student that may be accessed, viewed, and researched by authorized parties. The use of the inventor's existing patent in concert with the present invention, for example, would allow all school health records from the many different schools located in several states that a given student may have attended to be accessible along with insurance company records and medical information also spanning a decade. Being able to collate, compare and review all this information together, seen in different "views" could give a physician or other health care professional tremendous insights when trying to diagnose the child's illness. Such insights into cross-institutional information concerning children are simply not currently available. Access to disciplinary and mental health information from the many schools attended by a student over a number of years, when combined with insights from video clips spanning those years recorded by other school professionals who have sought to help the troubled student could likewise assist a guidance counselor in dealing with the "new" student's behavioral problems.

The existing patent of the inventor also provides the basis for the system of data sharing among internationally and nationally-based education institutions envisioned in the current invention. This addresses the reality that any new education process model must incorporate and interact with existing database structures of existing educational institutions, nationally and internationally, while providing a 21st century "overlay" upon which to build new datasets and methodologies based on the envisioned universal implementation of the e-Slate.

The "multi-dimensional" and "multi-institutional" data structure of the inventor's existing patent provides a method by which information can be maintained by virtually an infinite array of data collecting and reporting entities over the academic life of the student (and beyond). The data can be seen in an infinite number of "views" spanning decades and accessed (in accordance with strict legal and ethical guidelines) according to a variable set of "viewing rules". This feature is the subject of U.S. Pat. No. 5,504,890, entitled "System for Data Sharing Among Independently-Operating Information Gathering Entities with Individualized Conflict Resolution Rules," which is incorporated herein by reference as if fully set forth.

As stated previously, it is amazing that despite all the technological advances in virtually all other sectors of society, the fundamental "public education process model" and the devices used "universally" in schools have changed very little in the past 40 years. What the present invention provides is a unique, new method and apparatus to rapidly move the public education process model of all schools in all nations for all students and parents into the $21^{st}$ century; equally, fairly, economically, regardless of "circumstances at home" vis a vis literacy, language, electricity, phone service, computers and or access to the Internet.

The present invention brings the 21st century to all homes, students and parents, even if there is virtually no modern infrastructure available outside of the school. Yet, the present invention is also a radical and valuable new tool for the most technologically advanced, economically blessed and infrastructure rich communities and families. The present invention literally lets "all families rise together" in the coming century, rather than "leaving any child behind" because of the family's economic circumstances.

If a family is economically blessed and has a home computer and Internet access, wonderful! That may be considered a plus for the child in such a home. But the "unfair" competitive situation created by such an economically-based "digital divide" for those who have no such "home field advantage" are greatly diminished by the present invention. Nothing is taken away from the privileged, but little is lost by the under-privileged either by using the present invention universally in public education. It provides a baseline "level playing field" for all children to have 21st century technology available at school and at home. That might mean a child doing their homework on the e-Slate by candlelight because the parents can't pay the electric bill in urban Detroit or because there is no electric service yet available to the unincorporated "colonia" in the Rio Grande Valley. This takes away nothing from the blessed child at Beverly Hills High or Highland Park Elementary who has the latest greatest Pentium computer and a DSL connection to the Internet. It is simply a plus for all other children.

US schools are also faced with an ever more complex array of responsibilities, expectations and considerations concerning the children placed in their care. Security (i.e. who is authorized to pick up the child from school in an emergency or for early release for a dental appointment), identifying and intervening in cases of possible child abuse or neglect in the home, providing for bilingual (or multilingual) communications with parents (and/or students), security and privacy issues, and so on are all new challenges that will only grow in scope and importance in the coming century. At the center of all these concerns, however, is the question of the each student's success in their own social and academic education as well as his or her physical and mental well-being.

In order for there to be a quantum change in the fundamental education process model, any new system must be "child-centered", not in the "hip theoretical sense" but actually physically centered around the child. Any new system for universal public education must be deployable across all cultural and economic strata nationally and internationally; across all "digital divides". For example, a model based on the assumption that the student's home has Internet access and a computer (or even electricity or a working phone), is not one that would address all families in the United States of America, nor in some communities, even the majority of families. Such a model would be even less applicable to nations and cultures less advanced technically, but who are still as committed to quantum improvements in education for their children as any "advanced society". Any system that Would require even every classroom to be interconnected into a real-time network would still not address communications between the students' parents, teachers and school administrators, if many students' homes have neither a personal computer nor Internet access, not to mention neither electricity nor phone service.

For there to be a sea change in the way education is delivered and managed in the United States and the rest of the world there must be a complete retooling of the systems, methods and devices used to facilitate all aspects of the student's educational experience at school and in the home. The idea of making the model and the apparatus student-centered means that all points of intersection include the child and his or her family as the center point of communication, rather than just addressing the educator's or administrator's valid needs and concerns regarding their specific job functions, but not directly benefiting any one given student.

The education process model of the present invention is intended to facilitate communications between parents and educators (including teachers, administrators, counselors, and other "staff" . . . band instructors, coaches, nurses, etc.) concerning the most important student in the world; the parents' child. It provides for a secure collection and reporting of information under an "eyes only" level of security, between these parties, by use of biometric identification access security protocols and a detailed profiling of the types of information captured and stored and a access control methodology for all data captured and stored. The medium for this capture, storage and sharing of information is the e-Slate.

Finally, there is an obvious aspect of the present invention that could facilitate the tutoring, further education and quality of life improvements for the parents in the home, as well. If the parents are trained in the use of the e-Slate by the student or the teacher, then the parents could be enrolled in "at home" courses learning to read, to write, to spell and so forth. Parents and child learning together, perhaps by candlelight with a 21st century education tool promises to change that image for at least the next generation throughout the world.

In accordance with the preferred embodiment, the e-Slate will be the electronic school writing tablet, typewriter and textbook of the 21st century. Each student will be issued an e-Slate upon "registration" at public school. The registering parents or guardians will present the child to the school's office, a digital photo will be taken of the child and a biometric reading will be captured of the child (i.e. fingerprint, voiceprint, etc.). Additionally digital photos and biometric readings will be recorded of the parents. All biographic and other information (i.e. financial information for school meal programs, health records, immunization records, etc . . . ) will be verified with the registering party. The information that is specific to the student and parents (i.e. personal information, e-mails, voice mails, video messages, digital photos, homework, grades, biometrics) will be stored both on the central server of the school and on the student's e-Slate. The information on the student's. e-Slate can only be accessed by the student, his or her parents (guardians), and the authorized educators at the school or the district administration.

If the student's e-Slate is lost or stolen (or one just attempts to "take a peek"), the e-Slate information cannot be accessed without the proper biometric "read", so the student's and parents' information is secure. There is also little of a "black market" for the e-Slate device, as the algorithms for accessing the invention's operating system are held secure at several levels "off site" from the school campus. In the preferred embodiment, the invention is not based on the much more popular Microsoft (MS) Windows operating system, but is rather LINUX-based (a "free" version of UNIX), thus lessening its desirability for black-market sales and the entire system's vulnerability to common MS-directed viruses on the net. This will also help in greatly reducing the cost of each e-Slate unit by its use of a "free" operating system that belongs to "the world" rather than a US-based company's software product. This reflects the inventor's desire to remain sensitive to international "perceptions" wherever possible in creating a revolutionary international education process model and its apparatus, so that both will actually be embraced and adopted by a critical mass of countries.

The central servers of the present invention will use commercially available "access control" server software systems (i.e. Lotus Domino, MS-Exchange, Novell's Group-Wise, etc . . . ) for the creation of user access groups, support of data and messaging replication and directing e-mail and other messaging to the proper destination.

The e-Slate device itself will not fully "boot" when it is turned on without the proper biometric read (e.g. voiceprint or thumbprint recognition) and the data access will be limited to the security level allowed by the biometric read (e.g. if the student "logs in" the system, he or she cannot read video messages from the teacher to the parents without a parent's biometrics first being contemporaneously recognized by the e-Slate unit, but a parent could look at any of the student's data and messages, if those are the access rules that are established by the school and its TEC).

All information is automatically replicated to the school's/district's servers whenever the e-Slate is connected to a docking station, the e-Slate Cradle, that has connectivity to the school's network. This would normally be at the student's desk, the school library, or, in an optimal implementation, through Internet/Intranet connection at home. In this manner, all information is "backed up" as of the last connection with the school's systems, so only data captured in-between connections would be missed should the e-Slate unit become lost (i.e. the dog ate my e-Slate) or even if the unit were to be completely destroyed (i.e. daddy's car ran over my e-Slate).

The e-Slate itself is relatively lightweight and simple in design, having no built-in mechanical keyboard or other external moving parts. The e-Slate has a touch screen video display, with software driven QWERTY keyboard emulator, as well as a stylus for "handwritten" notation, a built-in microphone for dictation of "text" through voice recognition or for recording voice memos (digital recordings) and a speaker for playing audio. The e-Slate can have built-in Internet/Intranet access capability (wireless high speed modem and/or network card), will "boot up" in a browser or "client" (i.e. Lotus Notes) environment for access to the World Wide Web, and feature a multi-gigabyte memory storage capacity. As the e-Slate has no external moving parts and no openings save the docking station and power/battery outlets, built-in microphone, speaker and their jack ports, it will be extremely portable and durable given the user-base (K-12 Students). The e-Slate is not intended to be used as a video game device by students, as notebook computers could easily be used. Because the e-Slate's operating system is LINUX-based and will have preset parameters (controlled by the school) as to which applications may be run on the system, the unit should remain primarily an education tool, rather than serve as a "Game Boy". Conceivably, however, net-based games and or other entertainment sites could be accessed using the e-Slate's browser and with Internet access, if allowed by the school's URL access filtering protocols.

The present invention is designed to facilitate on a daily basis, the rapid and secure collectiori, storage, organization, access, retrieval and delivery of virtually all information vital to all parties involved in the student's education (the TEC), not the least of whom is the child and his or her parents.

The present invention is well suited for deployment at the local, regional, state, national and international levels. The present invention is uniquely "fair", in that it does not presume that the child's home has a computer and/or is connected to the Internet (or that there is even electricity or a functioning phone connection).

The present invention does not presume that the child's parents or guardians are computer literate or that they can even read or write English (or any other particular language, for that matter). Audio and/or video messages from the teachers can, of course, be made in the parent's native language if the teacher is able to speak that language, or translation services or technologies can be employed to translate the message by transcription for the child's family. The same is true for communications from the parents, which can simply be digitally recorded (like voice mail) and delivered to the teacher via replication the next time the student's e-Slate "plugs into" the classroom e-Slate Cradle. All these communications between parents and educators are secure and private due to the biometric identification and certification processes employed by the present invention.

Whether serving children in rural, inner city, suburban or upscale communities, the present invention assumes nothing of the economic capabilities of the child's home environment or the family's personal resources. The e-Slate (and the optional home Cradle) will be issued to the student and family, just as textbooks are now by public schools in America. In case of loss or theft, a new unit can be reconfigured at the school campus level and the student's and parents' information, biometrics, permanent record, digital photos, curriculum, grades, course work, e-mails, etc . . . , (as of the last Cradle connection and replication) can be downloaded from the school's central server computer to a new e-Slate and reissued to the child the very same day.

Biometric access control and "group-ware" security organization and designations will also assure the privacy and security of the student's and his/her family's personal information at school. For example, even though a given teacher is a bonafide educator at the child's school, if the student is not in his or her class, that teacher will not have access to any of the child's information. Even if a teacher is the student's teacher, he or she will not be able to access the child's health information (reserved for the school nurse's specific access) unless authorized by the access rules set forth by the school vis a vis the student.

Likewise, disciplinary information, on the other hand, might be accessible to the school's principal, assistant principal or the counselor in charge of the child's "case", but the student's coach or the band teacher would not have access to it, unless the school allowed such access to such a "group". The nurse would be able to access all health-related information regarding the student, but perhaps not the economic data. All such "access rules" are definable by the local school by setting the "grouping" of the educator involved.

Yet, for purposes of "seeing" trends regarding a group of students or even a specific class, or segment of students (i.e. all fifth grade math students), the information from all the relevant "permanent" records could be collated, assessed and graphed for "blind" analysis (withholding the individual identities of the students) if such a study were authorized by the school.

The present invention will also help in facilitating interventions concerning possible child abuse or neglect, identifying "stolen" or kidnapped children and in identifying children of parents who have fled with the child against court order. The present invention could also help identify food stamp, welfare, or other potential fraud. The present invention would also facilitate and support the proper dispensing of valid economic benefits such as school breakfast programs, Head Start programs, immunizations, health services, after-school athletic and other programs, etc . . . by documenting the child's participation in those programs and assuring the school (and such program's governmental or private sponsors) of accurate certified attendance rosters of student participants in those programs.

The use of the patented database design and architecture (inventor's existing U.S. Pat. No. 5,504,890) for the creation of the various clearinghouses containing student information from a multitude of sources over the entire academic life of the student (and beyond) will provide new vista's of capabilities for counselors, nurses, educators and parents to identify "trends" (positive or negative) in the child's educational journey. The inventor's existing patent allows for the collection and access of information regarding an individual e.g. the student) from virtually an infinite number of educational and/or other data-sharing institutions. Use of elements of the inventor's existing patent in the present invention allows for a multitude of "views" of information. This allows one authorized to access the student data to "slice and dice" the information across time and across varied institutions, data element by data element. The inventor's existing patent would allow educational institutions to share, inquire about and access information concerning a given student with health care professionals, insurance companies, social workers, child welfare agencies, judicial and other governmental institutions, again as agreed to voluntarily by the organizations involved and/or authorized by statute.

By fully exploiting such a system, for example, the school nurse and counselor could collaborate and view information regarding a troubled student who recently transferred in from out of state. The information viewed might include insurance company claim records or medical records of the student that show that the child has suffered from ear infections each January and February over the past five years. They note that there is corresponding drop in the student's test scores and there has been a consistent and marked increase in disciplinary problems during those two winter months for that student, as well. They surmise that the student's recent rash of "falling asleep in class incidents" that led to the present "intervention effort" by members of the TEC may also be due to heavy use of prescription antibiotics currently prescribed, because of the chronic ear infection, or perhaps some allergic reaction to same. Contacting the child's parents, the TEC works together to coordinate information and seek possible solutions. The nurse, the counselor and the student's doctor collaborate and develop a course of intervention (i.e. changing the dosage, or the drug itself, closer monitoring of the child by the school nurse and reporting symptoms regularly to the physician and the parents, or perhaps the doctor recommends surgery for the introduction of ear drainage tubes, and thus seeks approval for the procedure from the insurance company, or refers the child to an ear, nose throat specialist, and so on). The combinations of such possible "problem patterns" is endless. However, if the problem pattern can be "seen" by dedicated and authorized members of the TEC, then the problem can be better dealt with. The coordination of and rapid collaboration by all the student's education "community" (in the above example including the student's insurance company and personal physician) are all facilitated by the present invention to the personal benefit and betterment of the child.

Other possible benefits of the present invention are in the area of school and personal security. In an age of Littleton Colo. and other shocking acts of violence on public school campuses, how much safer would our children be if communications between, parents, students, teachers, administrators, school security personnel and local police were better facilitated? Problems and concerns could be transmitted, shared and dealt with many times faster with special "hot line" or "alert" work flow protocols, when immediate crisis intervention could perhaps save lives or at least limit the scope and severity of security problems at our public schools.

Valid privacy concerns and fears of an Orwellean "Big Brother", in this country at least, should be laid to rest. In many if not most states, even getting a driver's license requires digitized fingerprinting, the taking of a digital photo and even digitalization of the individual's signature, exactly the kinds of biometrics that the present invention will require of the student and their parents. If these "intrusions" are acceptable for public access to the nation's highways, they should likewise be acceptable steps for access to our public schools in the interests of our children's long-term success and safety.

Across the United States of America, the growing fear of predatory pedophiles and kidnappers of children (all too often a non-custodial parent or estranged relative of the child) drives concerned parents to take their children to the malls and other forums where an ever-increasing number of departments of public safety and other state and local governmental institutions provide free fingerprinting and the taking of "mug shot" photographs of children, just in case such a terrible event should happen and their child "disappears" for one reason or another.

What parent would not authorize having all their child's biographic and biometric information (fingerprints, voiceprint, height, weight, color of eyes) as well as a recent high quality digitized color photo transmitted instantly to police, hospitals, airports, etc . . . statewide, nationwide or even worldwide should their beloved child be lost, taken from them, run away or just plain "disappear"? The present invention would make such instant communications possible, across these United States and even the entire world.

The present invention's education process model and apparatus will effectuate a quantum leap forward in bringing 21st century technology and communications to every school child of every economic standing and to their parents, their teachers, nurses, principals, coaches, administrators for the benefit of that one child and the advancement of all communities (local, state, national, and the world). The child will become a better citizen and contributing participant. If we are more successful in educating the young of all nations, then public education has done its job and the world should be a better place for all.

With these prefatory comments in mind, the preferred embodiment of the present invention will now be described with reference to the figures.

FIG. 1A is a simplified block diagram and flow representation of the interrelationship between an international education information clearinghouse 200, international reporting entities 290, international inquiring entities 295, and participating country's national education information clearinghouses 300. As is shown, inquiries and/or shared (reported) information 100 and shared (reported) information and/or inquiry results returned 110 may be communicated between these entities. For example, the international education information clearinghouse 200 may receive requests for information in the form of inquiries or may receive shared and reported information from other entities such as an international reporting entity 290 and/or an international inquiry 295. Likewise, the international education information clearinghouse 200 may receive inquiries or shared, reported data from any one of a number of participating country's national education information clearinghouses 300. The amount of data that is shared may be determined by agreement among these entities. Likewise, the amount of information that may be obtained as a result of an inquiry may also be determined by agreement. In the view of FIG. 1A, inquiries and/or shared (reported) information 100 is shown as flowing into the international education information clearinghouse 200. Similarly, the shared (reported) information and/or inquiry results returned 110 is shown as flowing outward from the international education information clearinghouse 200. The system used for sharing and viewing the data among these participants in the international education information clearinghouse 200, is that which is provided by use of the inventor's existing U.S. Pat. No. 5,504,890, entitled "System for Data Sharing Among Independently-Operating Information Gathering Entities with Individualized Conflict Resolution Rules", which is incorporated herein by reference as if fully set forth.

Figure 1B:
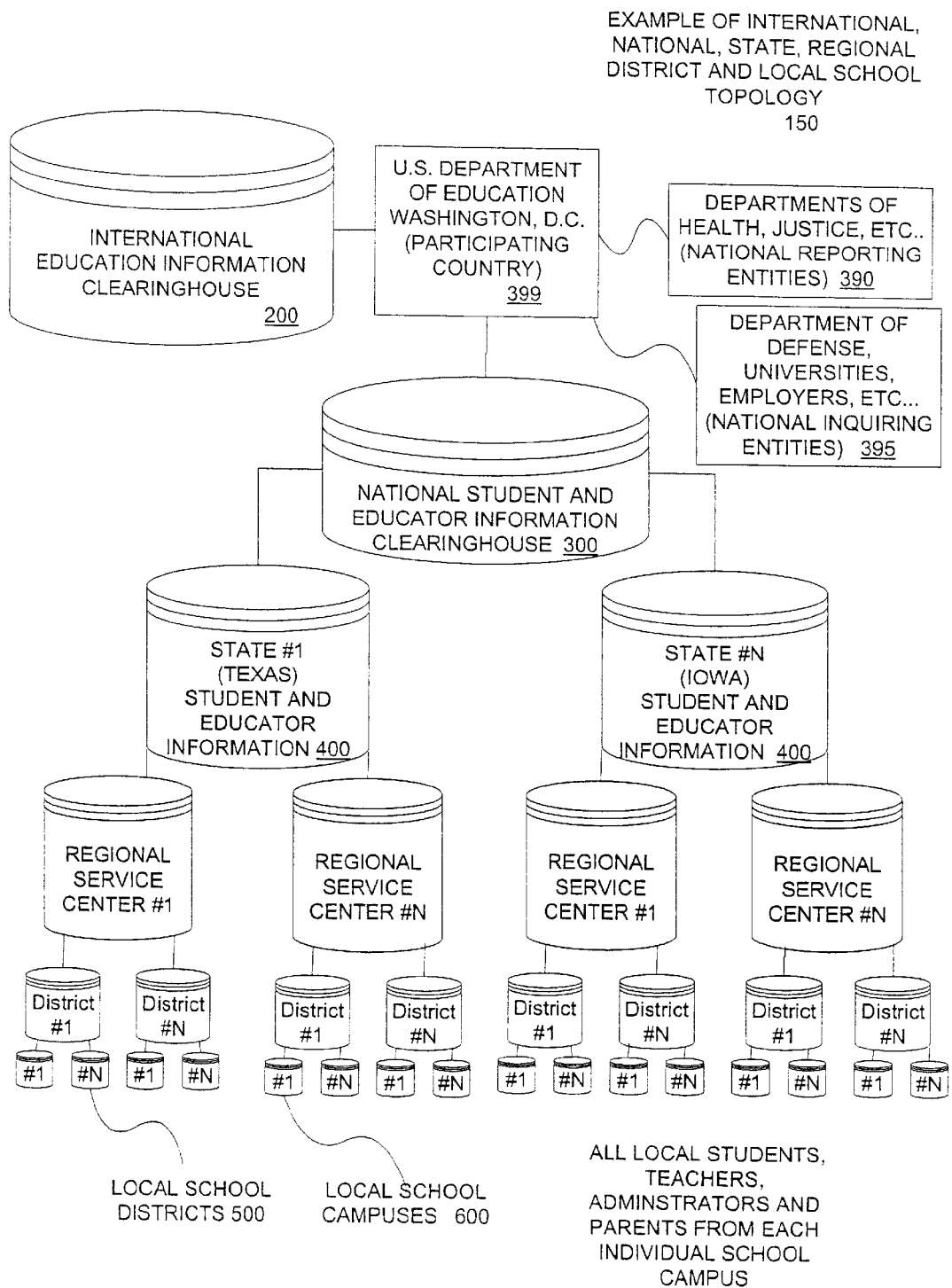
FIG. 1B is a block diagram representation of an exemplary international, national, state, regional, district, and local school topology.

FIG. 1B is a block diagram representation of an exemplary international, national, state, regional, district, and local school topology which is exemplary of implementation of the present invention in a member nation such as the United States of America. As is shown, the US Department of Education 399 is shown as having a communication relationship with the international education information clearinghouse 200. Various other federal departments have a command, control, communication relationship with the US Department of Education. In the view of FIG. 1B, the Departments of Health, Justice, etc. are shown as comprising national reporting entities 390 which have a data-sharing relationship with the US Department of Education 399. Likewise, the Department of Defense, public and private universities, employers, and others are identified as being national inquiring entities 395. Put more simply, the US Department of Education will aggregate data received from other governmental units. It will make the aggregated data available to governmental entities, and others on an agreement basis. As is shown in the example of FIG. 1B, the US Department of Education may have a command, control, communication relationship with a national student and educator information clearinghouse 300. This may be a sub-department established by statute to maintain the aggregated data. Various state entities may have a subordinated command, control, and communication relationship with the Department of Education 399 and may provide data for the national student and education clearinghouse 300. In the example of FIG. 1B, states 1–N are shown as having such a relationship with the national student and educator information clearing house 300. As is shown, the State of Texas may maintain a student and educator information database 400. Likewise, the State of Iowa may maintain a student and educator information database 400. These entities may have similar relationships with regional service centers within the state which have a data sharing relationship with local school districts 500 and local school campuses 600. Of course, each local school district 500 is composed of all the local students, their parents, the local teachers, the administrators for each individual school campus.

Figure 1C:
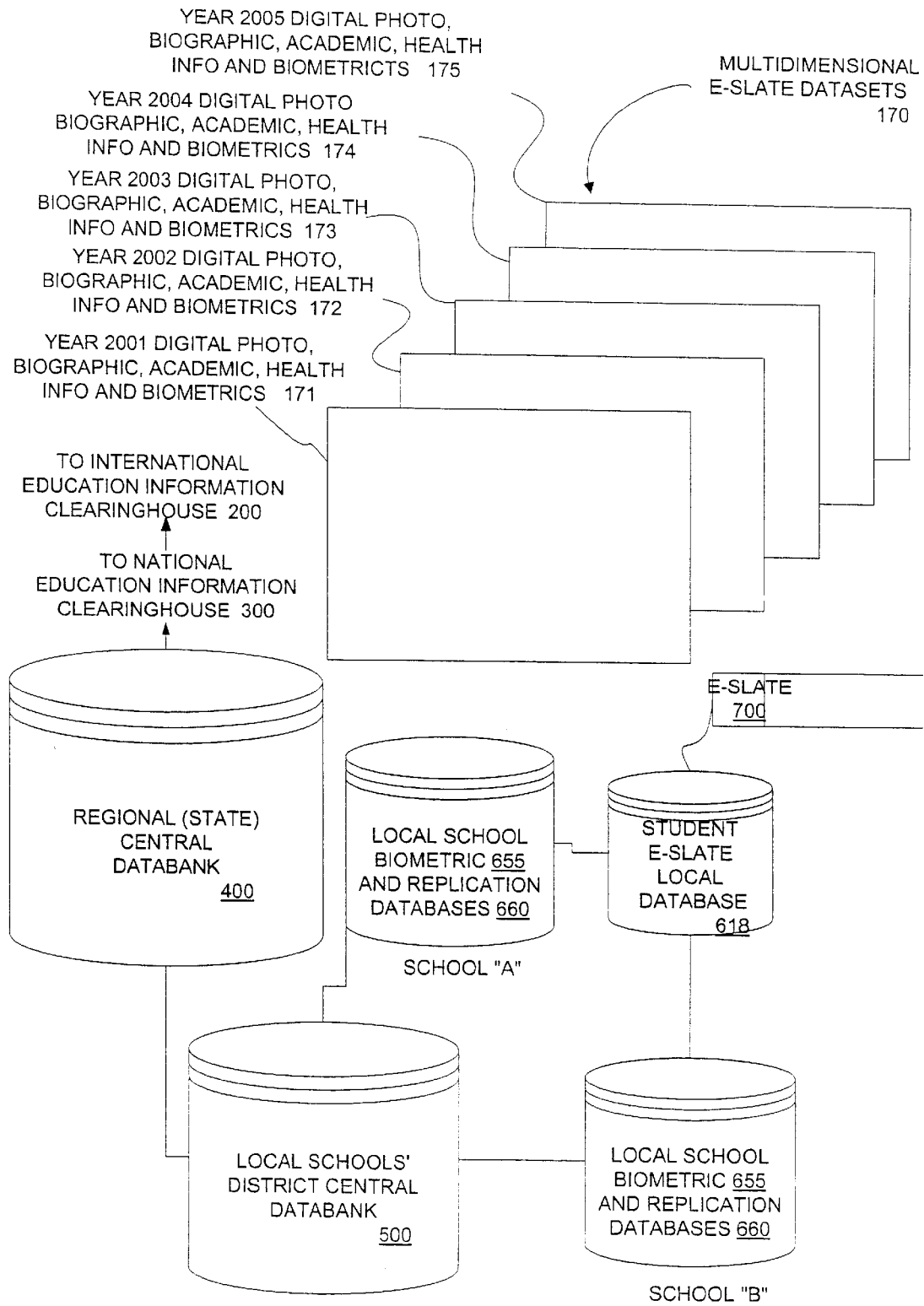
FIG. 1C is a simplified pictorial representation of a plurality of multidimensional e-slate datasets.

FIG. 1C is a simplified pictorial representation of a plurality of multidimensional e-slate datasets maintained for a particular student over a several year interval. As is shown, the plurality of datasets 170 are established for years 2001, 2002, 2003, 2004, 2005. Each of the e-Slate datasets preferably includes a digital photo, biographic information, academic information, health information, and some biometric data. Datasets 171, 172, 173, 174, 175 are provided for the years spanning from year 2001 through year 2005. In the preferred implementation, each dataset for every year of a student's academic career is maintained in a plurality of databases. For example, the information may be maintained in a national education information clearinghouse 300. It may also be maintained in a regional (state) central databank 400. It may also be maintained in a local school's district central databank 500. It may likewise be maintained in a local school biometric database 655 and in replication databases 660 in backup form. Finally, it may be maintained on the student e-Slate device database 618. The system used for organizing and sharing the e-Slate's "multi-dimensional" and "multi-institutional" information is that which is provided by use of the inventor's existing U.S. Pat. No. 5,504, 890, entitled "System for Data Sharing Among Independently-Operating Information Gathering Entities with Individualized Conflict Resolution Rules", which is incorporated herein by reference as if fully set forth.

Figure 2:
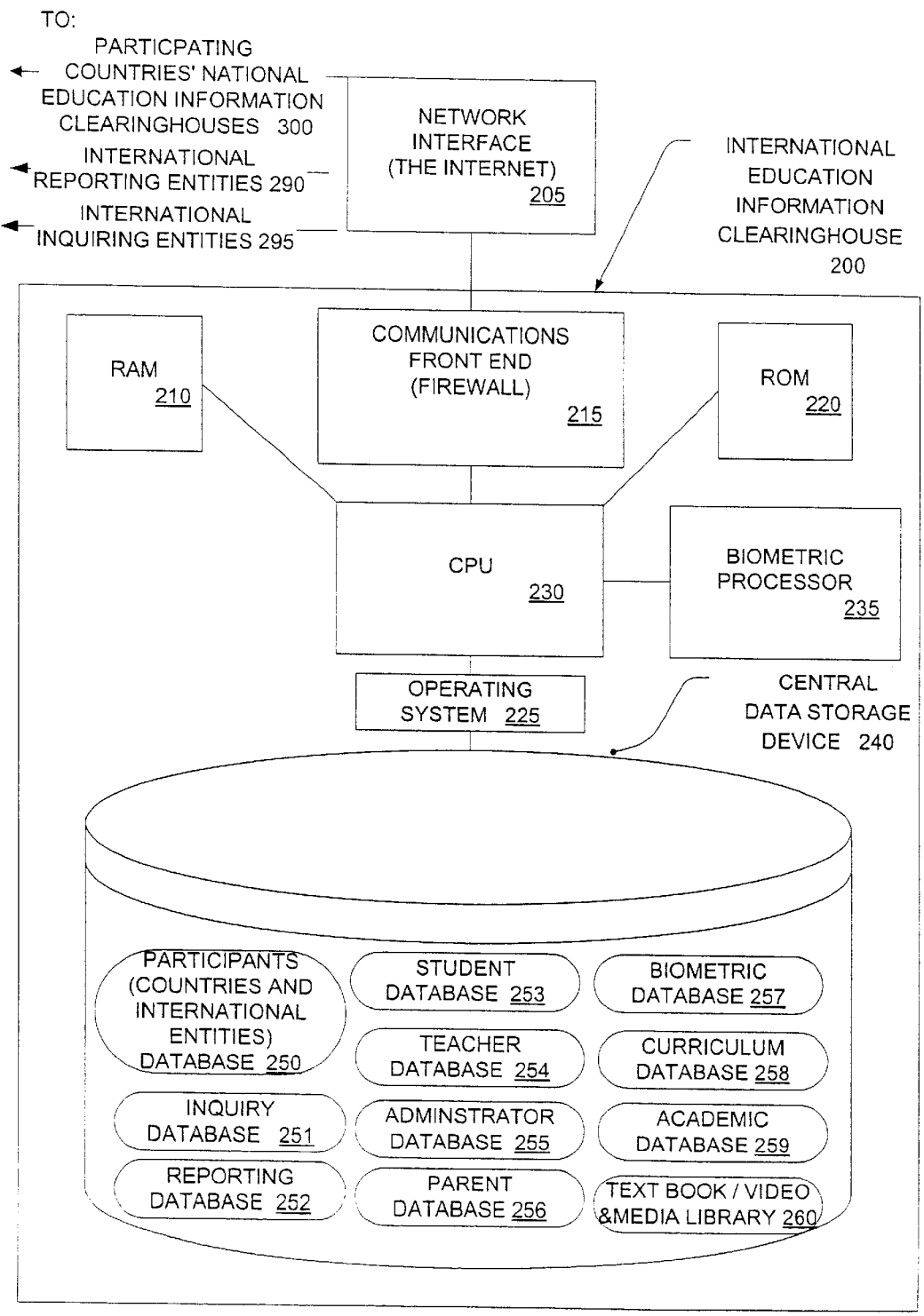
FIG. 2 is a block diagram representation of an international education information clearinghouse.

FIG. 2 is a block diagram representation of an international education information clearinghouse 200. The international educational clearinghouse 200 may communicate through a network interface 205 which may be implemented through the Internet or through a wide area network (WAN). The network interface 205 allows communication with each participating country's national education information clearinghouses 300, international reporting entities 290, and international inquiring entities 295. The international education information clearinghouse 200 includes a communications front end and firewall 215 which preferably provides a series of cascading graphical user interfaces which are utilized to facilitate the bidirectional communication of data and the bi-directional communication of inquiries and inquiry results. The central processing unit (CPU) 230 has associated with it dedicated RAM memory 210 and ROM memory 220.

The communication front end and firewall 215 is defined by executable program instructions which are executed by central processing unit 230. An operating system 225 is loaded and executed by central processing unit 230. As discussed above, the preferred operating system of the present invention is a UNIX environment, although other alternative operating systems can also be utilized. In accordance with the preferred embodiment of the present invention, a biometric processor 235 is provided which is dedicated for the processing of biometric data which is utilized in accordance with the preferred embodiment of the present invention in order to secure access and use to the e-Slate device as well as to the data maintained on the e-Slate device and associated school networks. Furthermore, a central storage device 240 is preferably utilized in order to store a relatively large amount of education data. A plurality of linked databases are maintained in central storage device 240. Some of the preferred database components include participant (countries and international) entities database 250, inquiry database 251, reporting database 252, student database 253, teacher database 254, administrator database 255, parent database 256, biometric database 257, curriculum database 258, academic database 259, text book/video & media library 260. As is shown in FIG. 2, a network interface (preferably an Internet interface) 205 allows the communications front end and firewall 215 to be accessed via a wide area network (such as the Internet). The network interface allows communication with participating countries' national education information clearinghouses 300, international reporting entities 290, and international inquiring entities 295.

Again, the system used for sharing and viewing the data among these participants in the international education information clearinghouse 200, the national education information clearinghouse 300, the state 400 and school districts 500 and local school campuses 600 is that which is provided by use of the inventor's existing U.S. Pat. No. 5,504,890, entitled "System for Data Sharing Among Independently-Operating Information Gathering Entities with Individualized Conflict Resolution Rules", which is incorporated herein by reference as if fully set forth.

Figure 3:
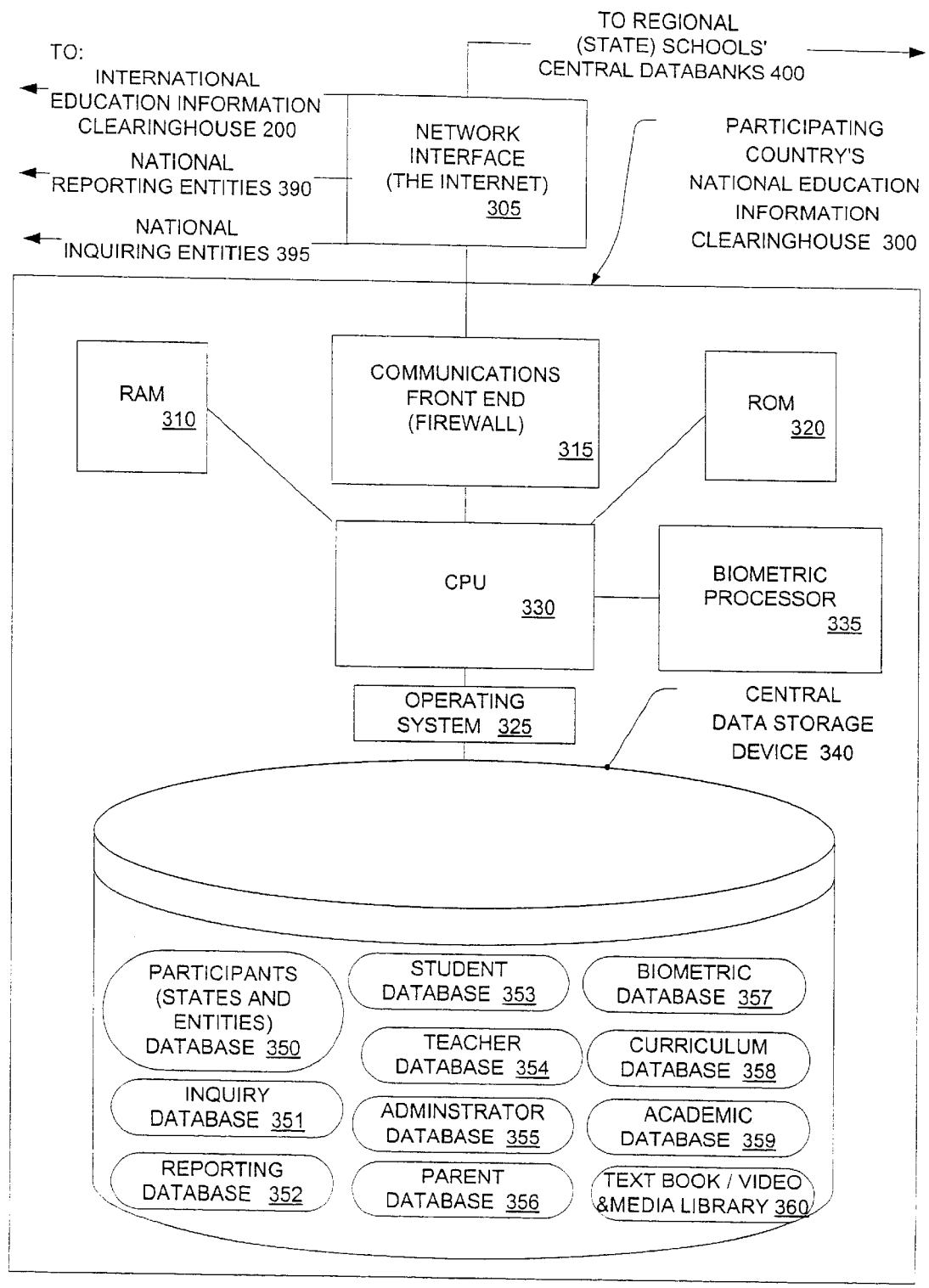
FIG. 3 is a block diagram representation of a participating country's national education information clearinghouse.
Figure 4:
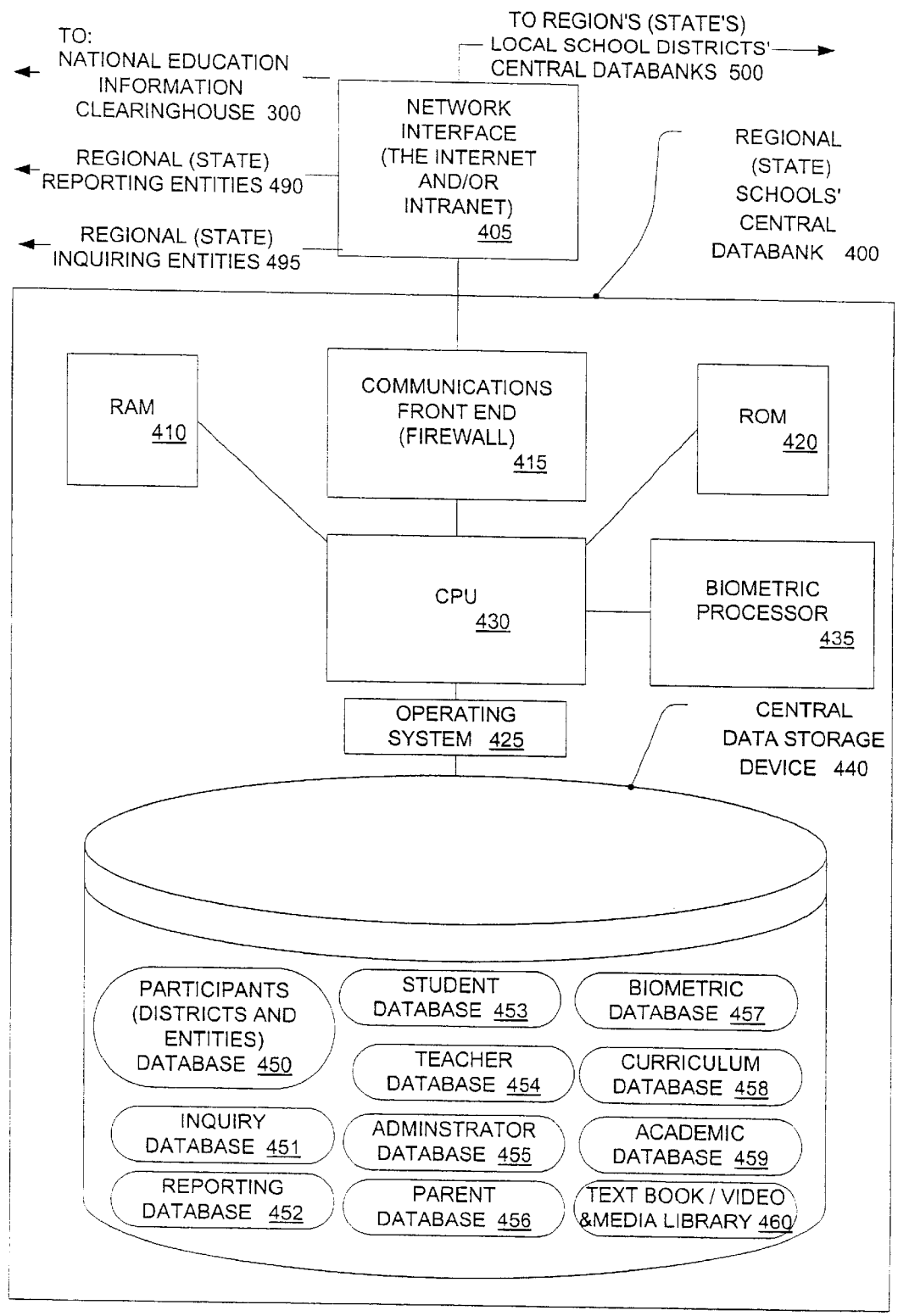
FIG. 4 is a block diagram of a regional school's central databank.
Figure 5:
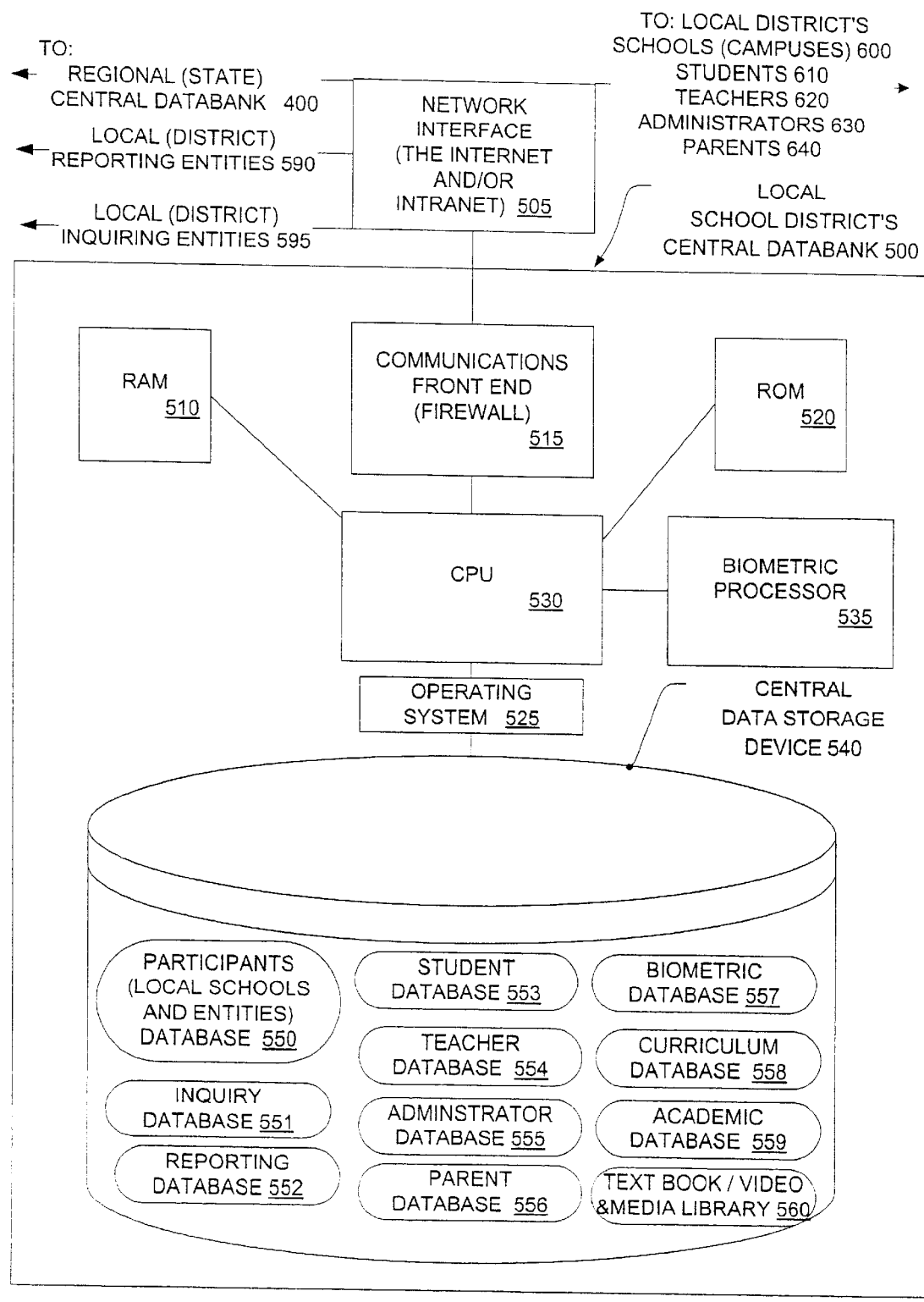
FIG. 5 is a block diagram representation of a local school district's central databank.

FIGS. 3, 4, and 5 show the preferred configuration of the information clearinghouses for each participating national country, each regional school's central databank, and a local school's central databank. As is shown in FIG. 3, a participating country's national education information clearinghouse 300 will preferably include a communications front end firewall 315, a CPU 330, and its associated RAM 310 and ROM 320 memory. The central processing unit 330 executes program instructions, in accordance with an operating system 325. Once again, biometric processor 335 is provided in order to process the biometric security data. The central storage device 340 includes similar databases such as the participating entities database 350, inquiry database 351, reporting database 352, student database 353, teacher database 354, administrator database 355, parent database 356, biometric database 357, curriculum database 358, academic database 359, text book/video & media library 360. A network interface 305 serves to allow wide area network communication (preferably via the Internet) with other clearinghouses such as the international education information clearinghouse 200, national reporting entities 390, national inquiring entities 395, and with regional (state) school's central databanks 400.

The regional (state) school's central databank 400 is depicted in FIG. 4. As is shown, the regional school's central databank 400 includes a communications front end and firewall 415, and central processing unit 430 and its associated RAM 410 and ROM 420 memory which executes program instructions and which operates in accordance with operating system 425. Additionally, biometric processor 435 is provided to handle biometric security data. Central storage device 440 includes a number of database components such as participants (districts and entities) database 450, inquiry database 451, reporting database 452, student database 453, teacher database 454, administrator database 455, parent database 456, biometric database 457, curriculum database 458, academic database 459, text book/video & media library 460. Once again, a network interface 405 is provided which allows Internet and/or intranet communication with other entities and clearinghouses such as the national education information clearinghouse 300, regional (state) reporting entities 490, regional (state) inquiring entities 495, and to region's (state's) local school district's central databanks 500.

As is shown in FIG. 5, a local school district's central databank 500 is similarly configured to include a communications front end firewall 515, and a central processing unit 530 and its associated RAM 510 and ROM 520 memory which executes program instructions and which operates in accordance with operating system 525.

Furthermore, biometric processor 535 is provided to process the biometric security data. A central data storage device 540 includes a number of database components such as participant's local schools and entities database 550, inquiry database 551, reporting database 552, student database 553, teacher database 554, administrator database 555, parent database 556, biometric database 557, curriculum database 558, academic database 559, and text book/video & media library 560. Once again, a network interface 505 is provided to allow Internet or intranet communication with other entities such as the regional (state) central data bank 400, the local (district) reporting entities 590, the local (district) inquiring entities 595, to local schools 600, students 610, teachers 620, administrator 630, and parents 640.

Figure 6:
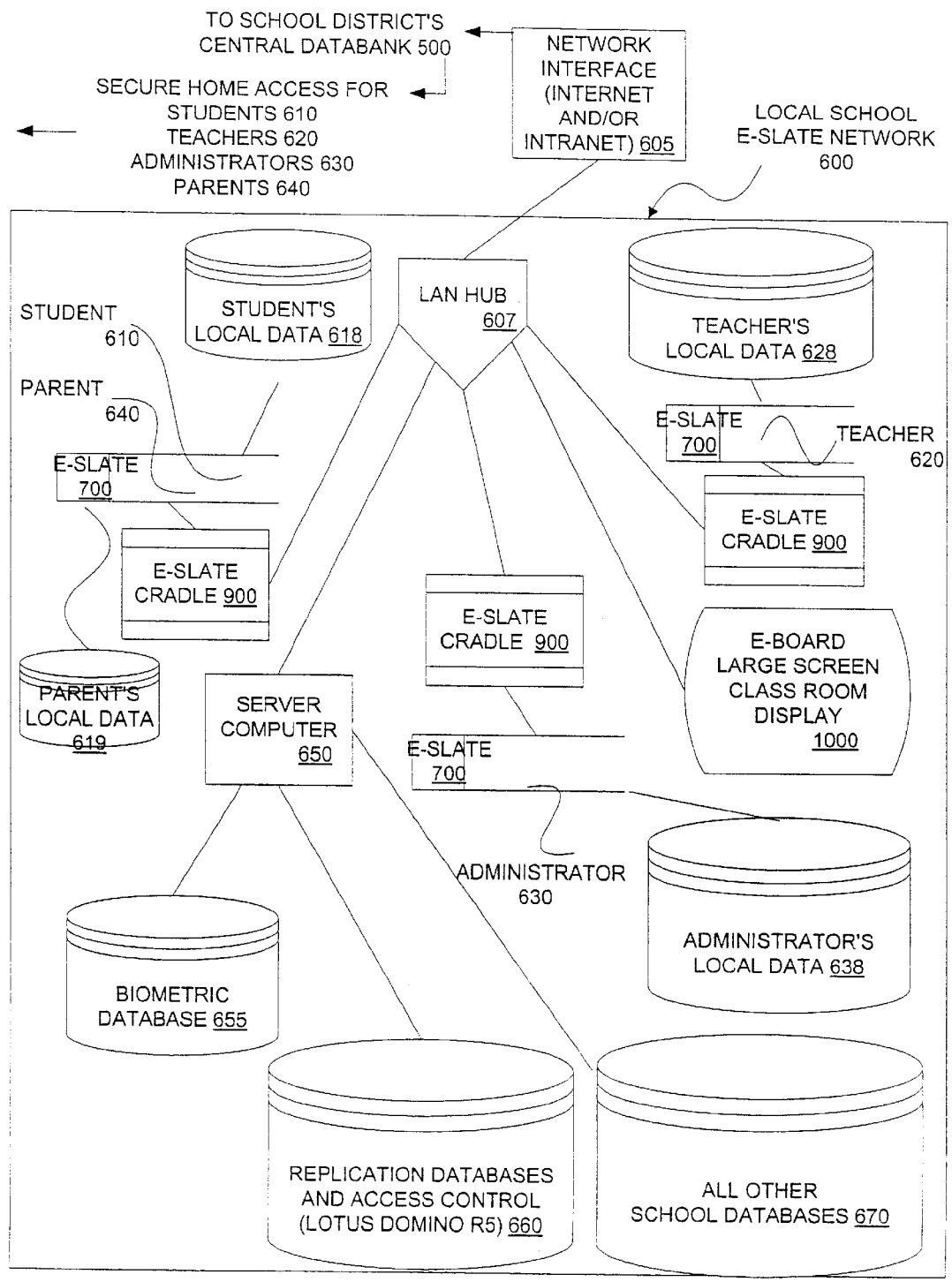
FIG. 6 is a block diagram representation of a local school's e-Slates network.

FIG. 6 depicts a preferred local school e-Slate network 600. A network interface 605 is provided to allow Internet and/or intranet communication with other entities such as the school district's central database 500 or to allow secure home access for students 610, teachers 620, administrator 630, and parents 640. A local area network (LAN) hub 607 is provided to facilitate bidirectional communication within the local school e-Slate network 600. Local area network hub 607 communicates with a number of other components within the local school e-Slate network 600, including server computers such as server computer 650 which allows and controls access to databases such as biometric database 655, replication database and access control systems 660 (which is preferably a system such as Lotus Domino R5), and other school databases 670. The local area network hub 607 is also connected to a plurality of e-Slate Cradles 900 (also referred to as e-Cradles). In accordance with the preferred embodiment of the present invention, teachers, administrators, students, and possibly parents are issued e-Slate Cradles 900. Each e-Slate Cradle 900 is adapted to couple electrically with an e-Slate 700. As discussed above, an e-Slate is a lightweight portable notebook-like computer which may be carried about by teachers, students, and administrators. It may be electrically connected to an e-Slate Cradle 900 in order to connect the e-Slate 700 to the local school e-Slate network 600, but also to allow the use of peripheral hardware devices such as keyboards, graphical pointing device such as a computer mouse, video cameras, and interface devices such as high speed modems and network cards which allow access to the Internet or intranet. As is shown in the view of FIG. 6, an e-Slate 700 and e-Cradle 900 are issued to each teacher 620. Likewise, an e-Cradle 900 and e-Slate device 700 are issued to each administrator 630. Likewise, an e-Slate 700 and e-Cradle 900 are issued to each student 610 and to the parents 640. In the preferred embodiment of the present invention, the parents 640 also have access to the student's device at home, before or after the student has used it. Also, as is shown in the view of FIG. 6, the teacher's local data 628 is maintained on the issued e-Slate 700. Likewise, the administrator's local data 638 is maintained on the administrator's e-Slate 700. Similarly, the student's local data 618 and parent's local data 619 are maintained on the e-Slate 700 which is issued to each student 610 and parent 640. In accordance with the preferred implementation of the present invention, the replication databases and access control system 660 is utilized to control what data goes where, who is to have access to the information and what level of security is required to see it.

Figure 7:
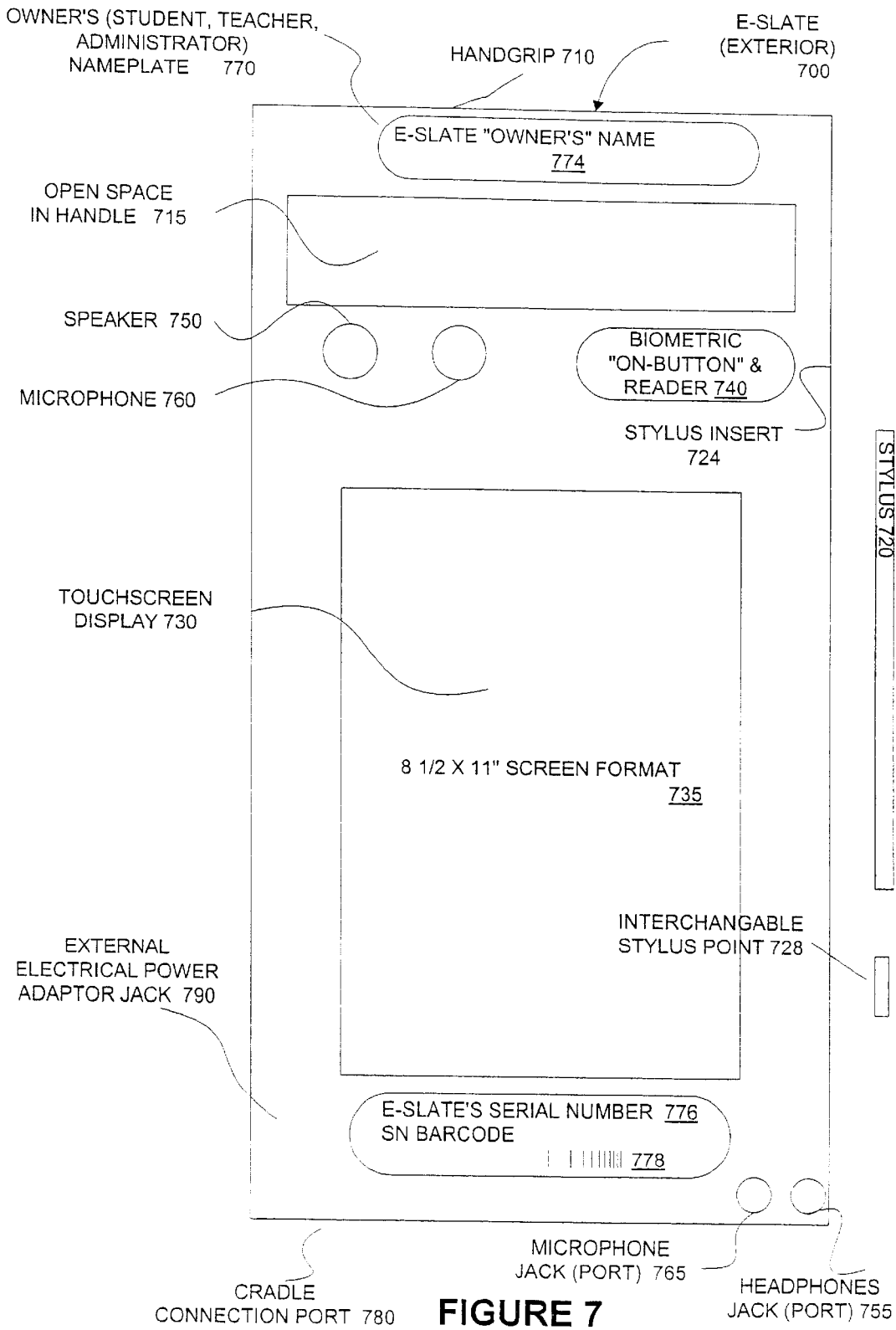
FIG. 7 is a pictorial representation of an exemplary e-Slate device in accordance with the preferred embodiment of the present invention.

FIG. 7 is a pictorial representation of the exterior of e-Slate 700. The e-Slate 700 includes a relatively small housing which carries a number of functional elements which are accessible to the user during ordinary use. A relatively small touch screen display 730 is provided. Preferably, the screen format corresponds generally to a conventional "page" size. For example, in the United States of America, an 8½×11" screen would represent a conventional page. In other nations, other page formats are utilized. For example, in Europe an A-4 format is utilized which is longer and narrower than the conventional US page format. Of course, new page formats may be developed especially for use with the present invention. A stylus 720 is provided in order to activate the touch screen display 730. Preferably, interchangeable stylus points 728 are provided to allow stylus 720 to be used for other functions. A handgrip 710 is provided and open handle space 715 is also provided. The student, teacher, administrator, may carry the e-Slate 700 by grasping it with one hand at the handgrip 710 and passing a portion of the hand through the open space 715. It is envisioned that a variety of local "carrying" devices will emerge to more easily transport and/or protect the device, in keeping with local customs and preferences. These may include "backpacks", satchels or slings, among other such ancillary devices. Preferably, each e-Slate 700 carries an owner's nameplate 770, and the owner's name 774 is permanently printed, marked, or engraved thereon. Furthermore, each e-Slate 700 should carry a serial number 776 as well as the serial number in a barcode format 778. In order to secure access to the device, a biometric on-button and reader 740 is provided. Currently, thumbprint readers are commercially available at reasonable (and descending) prices to provide a relatively good biometric security system, but other different and additional biometric sensors may be used. In order to enable audio applications, a built-in speaker 750 and microphone 760 are provided on e-Slate 700. Similarly, a microphone jack 765 and headphone jack 755 are also provided on e-Slate 700. While the e-Slate carries its own internal power supply in the form of rechargeable battery pack, an external electrical power adapter jack 790 is provided to allow the device to be powered from a conventional electrical outlet. Furthermore, an e-Cradle connection port 780 is provided which allows communication with the local area network 600 of FIG. 6 when e-Slate 700 is electrically connected to its e-Slate cradle 900 (of FIG. 6). Connection to the e-Slate's Cradle also results in the automatic recharging of the e-Slate's battery.

Figure 8:
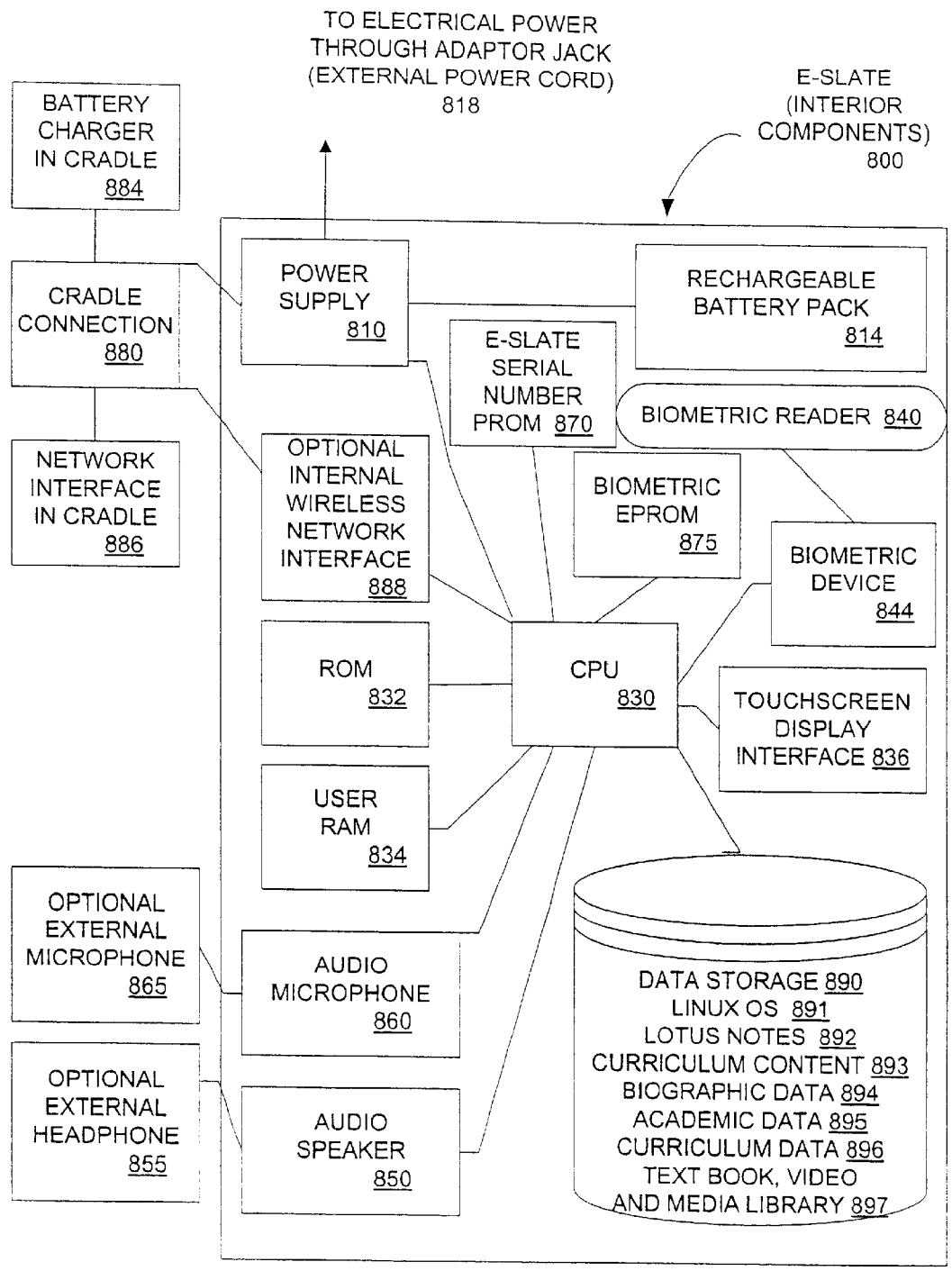
FIG. 8 is a block diagram of the interior components of an exemplary e-Slate device.

FIG. 8 is a block diagram representation of the interior components 800 of e-Slate 700. As is shown, central processing unit 830 is provided in order to execute program instructions. Central processing unit (CPU) 830 has associated with it ROM memory 832 and user RAM 834. CPU 830 is electrically connected to audio microphone 860 and is likewise electrically connected to audio speaker 850 and can receive audio input from audio microphone 860 and provide audio output by electrically driving audio speaker 850. When an external microphone 865 or external headphone 855 is utilized, the audio microphone 860 or audio speaker 850 are overridden. CPU 830 also controls the operation of touch screen display 836. It serves to receive input from the touch screen and to display images such as text to the display. The CPU communicates with biometric EPROM 875 which serves to record the biometric data (such as the thumbprint data) which are associated with the particular e-Slate 700. The biometric reader 840 and biometric device 844 cooperate to allow the input of biometric data. The CPU operates to compare biometric data received at reader 840 with the content of biometric EPROM 875. If there is no match between the biometric data, access is restricted or denied to the e-Slate 700. If there is a match, access is allowed, but only to the extent that the particular individual identified by the biometric data is allowed access. In other words, a parent may have different and greater access to the content of e-Slate 700 than the student may have. This secures communications between the teacher and the parent. Furthermore, the e-Slate 700 carries an e-Slates serial number in programmable read only memory (PROM) 870 which is utilized to electronically record a serial number associated with e-Slate 700. In accordance with the preferred implementation of the present invention, the e-Slate 700 includes an optional internal wireless network interface 888 which is adapted to allow communication either through e-cradle connection 880 to a network interface 886 which is associated with or carried by the e-cradle or directly to the Internet for a truly "wireless" connection. Additionally, in the preferred implementation, e-Slate 700 includes data storage which carries programs and data. Exemplary operating systems and programs include the LINUX operating system 891, Lotus Notes 892, curriculum content 893 which may be composed of text and images and combinations of text and images, biographical data 894 which is uniquely associated with the student, and the academic data 895 which is also uniquely associated with the student and represents the academic record for the student. Furthermore curriculum data 896 and a textbook, video and media library 897 may be stored on the data storage device 890. The e-Slate 700 is powered by a rechargeable battery pack 814 but may also receive DC power from power supply 810 which connects to a conventional wall outlet via an optional power cord. Furthermore, the e-Slate 700 may receive power through the e-Cradle connection 880 from battery charger 884 which is preferably located within the e-Cradle.

Figure 9:
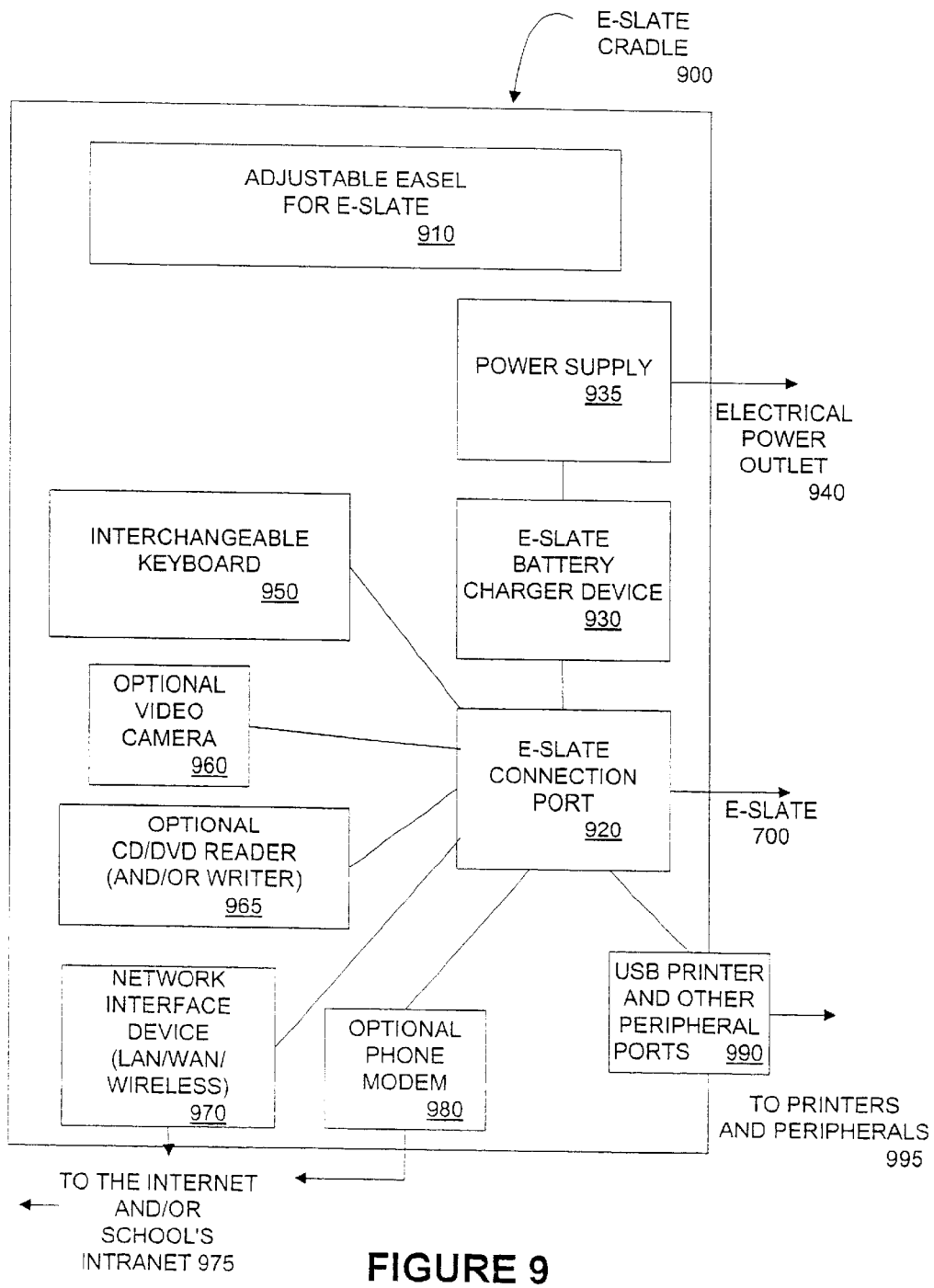
FIG. 9 is a block diagram depiction of the preferred components of an e-Slate cradle.

FIG. 9 is a block diagram representation of the e-Slate Cradle and it is used to illustrate the various operative components of an e-Slate Cradle (e-Cradle) 900. As is shown, the e-Cradle 900 includes an adjustable easel 910 which allows the adjustment and position to accommodate various users. There are a number of electrical and electromechanical components which cooperate to allow for the input and output of data. For example, interchangeable keyboard 950 is provided which allows a student, teacher, administrator, parent to key in information. An optional video camera connection 960 is provided. An optional CD/DVD reader (and/or writer) 965 may be provided. A network interface 970 may be provided to allow for local area network/wide area network/wireless communication to the Internet or the school's intranet 975. An optional phone modem 980 may be provided. A USB port 990 may be provided for releasable connection to printers and peripherals 995. An e-Slate connection port 920 may be provided for connecting to the e-Slate 700. An e-Slate battery charger device 930 may be provided for passing power from power supply 935 through e-Slate connection port 920 to e-Slate to provide electrical power for the electrical power consuming components of e-Slate 700 and in order to recharge the e-Slate's battery pack 814.

Figure 10:
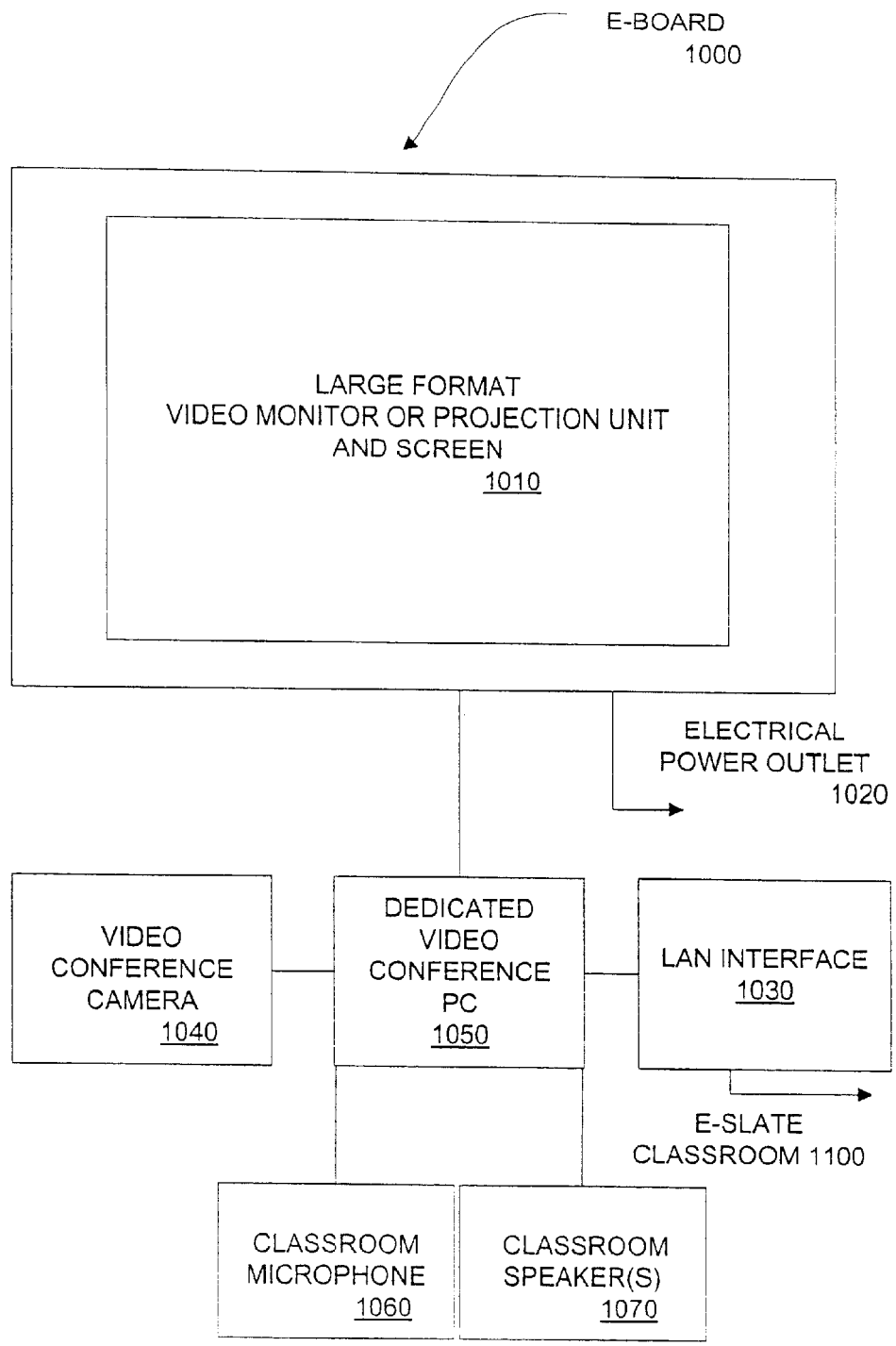
FIG. 10 is a block diagram representation of an e-Board in accordance with the preferred embodiment of the present invention.

FIG. 10 is a pictorial representation of classroom equipment which may be utilized in combination with the e-Slate devices and the local area network to conduct group work activities such as presentation of classroom material in support of a lecture or tutorial. As is shown, an electronic blackboard, e-Board 1000 is composed of a number of electrical components which cooperate to facilitate this type of activity. A large format video monitor 1010 is provided. Alternatively, a projection unit and screen may be used in lieu of a large video screen format. Relatively large plasma screen displays provide crisp high resolution images and are sufficiently large to allow a large group of people to view a single screen format displays is rapidly falling in price so the use of these may be economically possible in school in the near future. The large format video monitor is connected to electrical power outlet 1020. Electrical power outlet 1020 also supplies power to the other power consuming components which cooperate with large screen video monitor 1010 to push digital content to the screen. A number of other components are provided including a video conference camera 1040 which allows for real-time video conferencing with remote locations. This allows for extremely high quality presentations to be video cast to relatively large number of students, thus amortizing the costs and expenses of developing the materials. Dedicated video conference PC 1050 may be provided also. A local area network interface 1030 is provided to allow for bidirectional communication with the e-Slate classroom 1100. Furthermore, a classroom microphone 1060 and classroom speakers 1070 are provided in order to allow the input and output of audio information. This allows the class to interact in real-time with remote locations or with a remotely located instructor.

Figure 11:
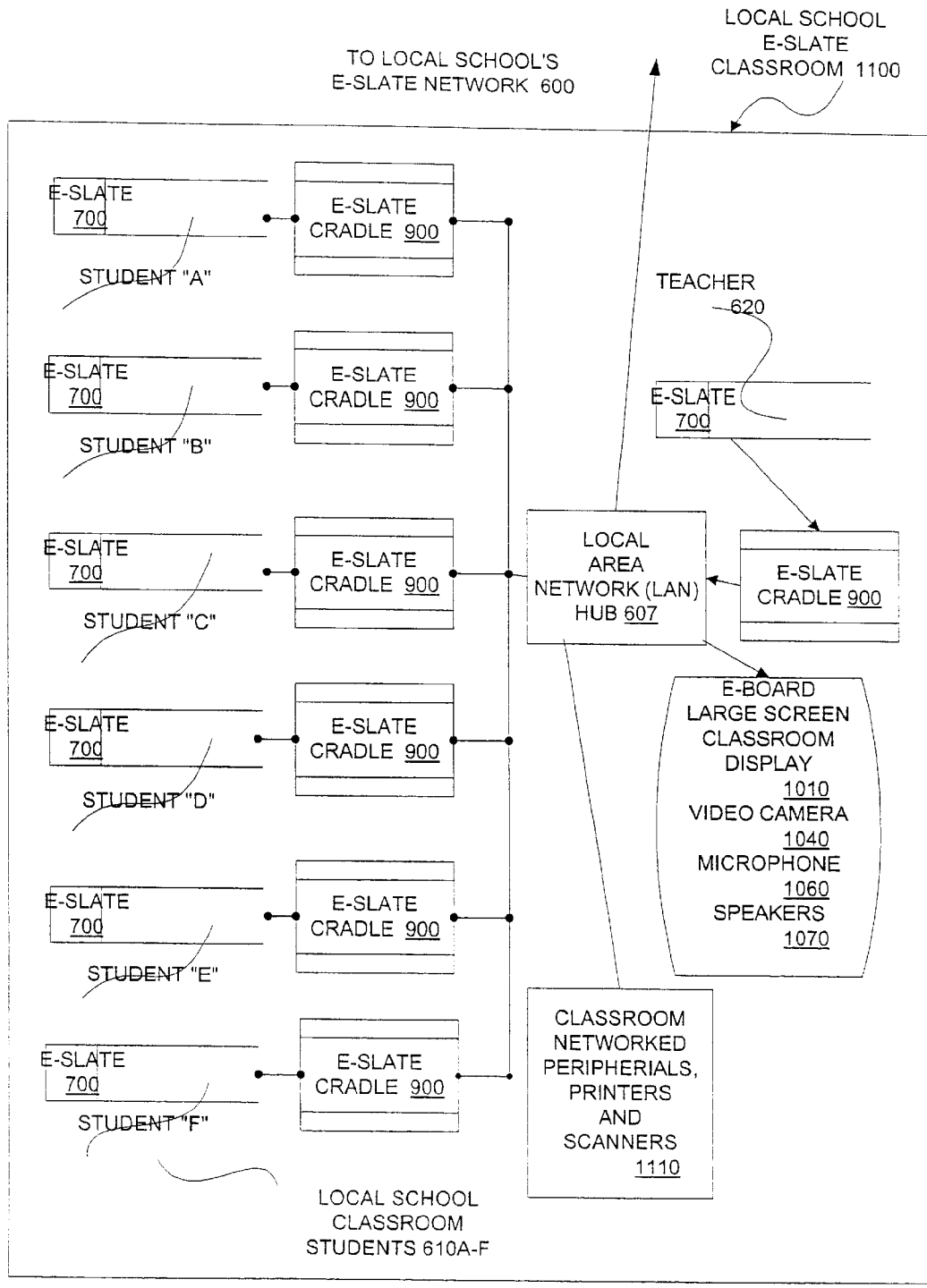
FIG. 11 is a block diagram representation of a local school e-Slate classroom.

FIG. 11 is a block diagram representation of a preferred local school e-Slate classroom 1100. As is shown, students A, B, C, D, E, F are located in the classroom 1100. Teacher 620 is also located in the classroom. Each of students A, B, C, D, E, and F has possession and control of an e-Slate device 700. Additionally, each student has at their desk an e-Cradle 900. All e-Cradles are electrically connected to a local area network hub 607. Likewise, the teacher 620 has an e-Slate device 700 which may be cradled in an e-Cradle 900. The teacher's e-Cradle 900 is also connected to the local area network hub. Various peripheral devices are connected to the local area network hub and may be accessed utilizing an e-Slate devices 700 when cradled in the e-Cradle 900. FIG. 11 depicts some of these peripherals. They include peripherals, printers and scanners 1110. They further include the e-Board large screen classroom display 1010, video camera 1040, microphone 1060, and speakers 1070.

In accordance with the present invention, during normal use, the e-Slate devices 700 are cradled in a classroom environment. This optimizes the use of the e-Slate devices, reduces battery drain, and allows for a much greater digital interaction between teacher, students, and the digital systems, content, and media. In many ways, the electronic system of the e-Slate devices 700, the network, and the peripheral devices will perform many functions which are currently being performed utilizing a blackboard and chalk. The advantage of utilizing the e-Slate devices for group and individual work is that the e-Slate device can capture the work product and record it in memory on any predetermined basis, in order to allow parent's to actually review the content of the instruction for that or any particular day. This allows a parent to become much more involved in the education process of a child. A parent can review relatively quickly the entire activities of a single class day.

Figure 12:
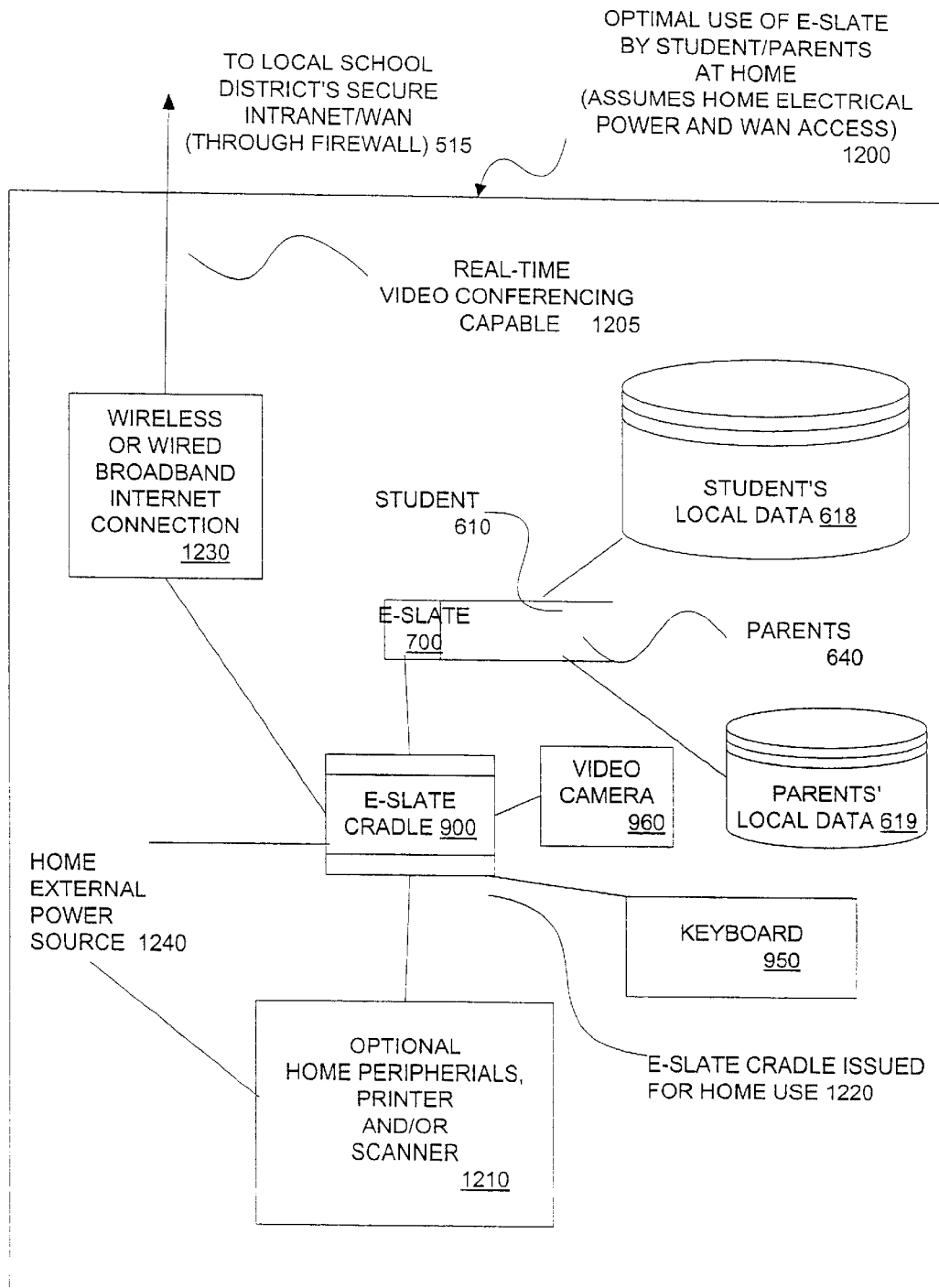
FIG. 12 is a block diagram representation of the optimal use of an e-Slate by either a student or parents in a home environment, assuming that the home has electrical power and wide area network access.

FIG. 12 is a block diagram representation of optimum use of the e-Slate device by a student and/or parent at home. This assumes that there is electrical power in the home and wide area network access. As is shown in FIG. 12, home 1200 includes wireless or wired broadband Internet connection 1230. This establishes a communication link which may support real-time video conferencing functions 1205. Additionally, it enables digital communication with the local school district's secure Internet or wide area network (WAN) 515 through any applicable firewall. The e-Cradle 900 is electrically connected to the wireless or wired broadband Internet connection 1230. Additionally, e-Cradle 900 is connected to video camera 960 which may be utilized during video conferencing functions. Furthermore, e-Cradle 900 is releasably electrically coupled to keyboard 950 which is a conventional keyboard and may be utilized by either the student or the parent to key in text which is recorded in memory of e-Slate 700 which is cradled in e-Cradle 900. The e-Slate 700 includes two local databases: the student's local data 618 and the parents' local data 619. Student 61.0 may access his or her data 618 while parents 640 may access their data 619. Of course, the biometric security system must authorize the access. In this way, the parents may utilize the biometric measurement (such as a fingerprint) in order to access content carried by the e-Slate 700 which is available or accessible only to the parents 640, while the student may utilize his or her biometric data (thumbprint) in order to access his or her data 618. Home 1200 may further include external peripheral devices which may be optional or which may be necessary for some activities. These include a printer and/or scanner 1210. Home external power source 1240 is utilized to provide power to the power consuming components. Home external power source 1240 directly supplies power to e-Cradle 900 which in turn provides power to e-Slate 700 as well as to recharge the e-Slate's internal battery pack 814. Additionally, home external power source 1240 powers the peripheral devices 1210.

Figure 13:
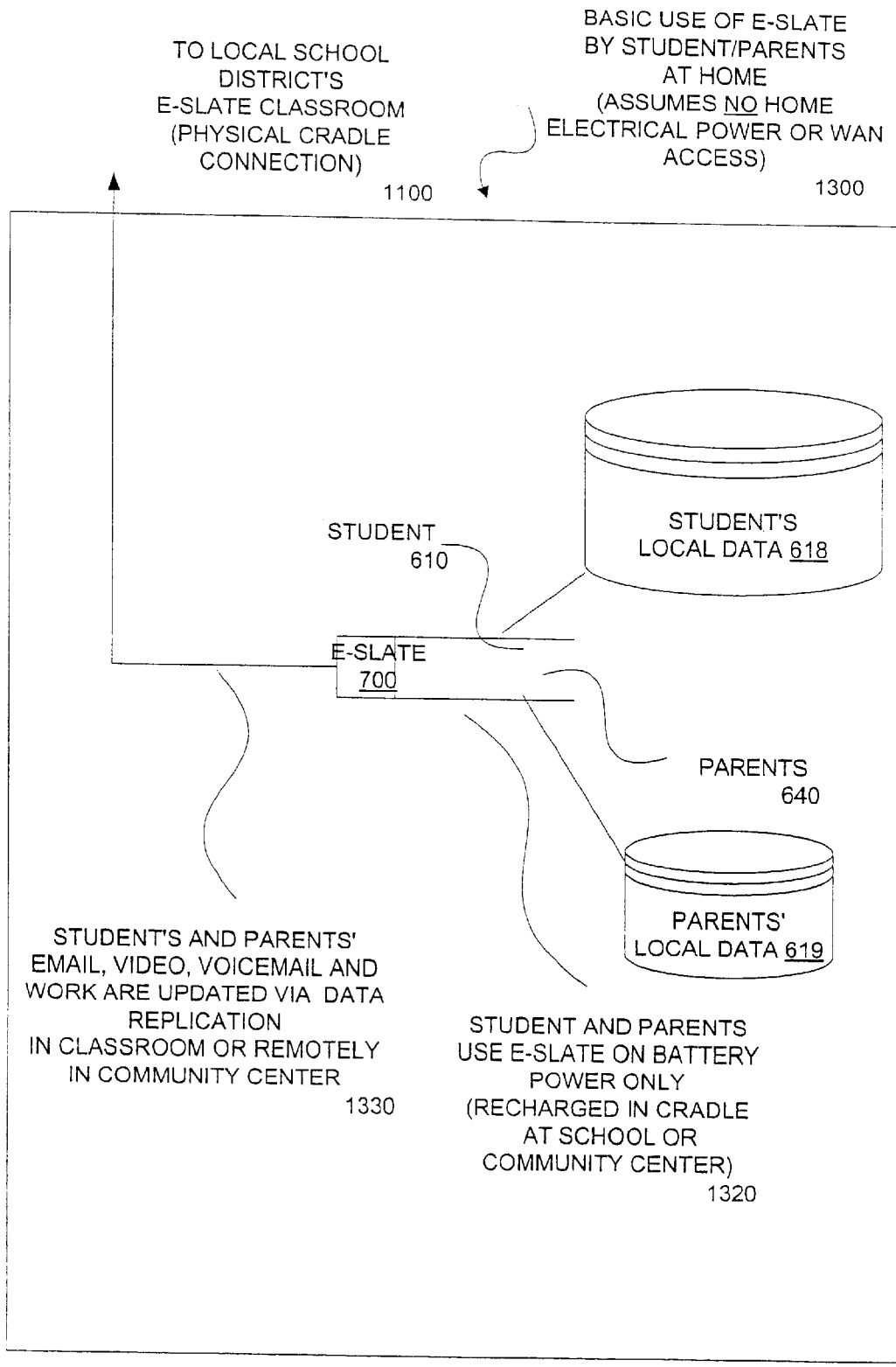
FIG. 13 is a block diagram representation of the basic use of an e-Slate device by either the student or parents in a home environment which has no home electrical power or wide area network access.

FIG. 13 depicts an alternative utilization of the e-Slate 700. More particularly, it depicts the use of the e-Slate in a home 1300 which has no home electrical power or wide area network access. This is the case in most third world countries, and the present invention accommodates this harsh reality. As is shown, the e-Slate 700 may be brought to the home 1300 and the student 610 may access his or her local data 618 which is resident in the e-Slate 700. Likewise, the parents may access the parent's local data 619 which is also resident in the e-Slate 700. Of course, the biometric security is utilized to limit the access to certain types of data, so the student may not access the parent's local data 619 without the parent's cooperation. The e-Slate is carried into the home and powered solely by its battery pack. The battery pack is recharged in the classroom environment when the e-Slate 700 is cradled in its e-Cradle 900. The student and parents use the e-Slate in a battery operated mode only. No recharging occurs in the home environment, nor is there any wide area network access. Accordingly, the student's and parents' e-mail, video, voice mail, and work are updated with the school's classroom network through a data replication process in the classroom or remotely in a community center.

Figure 14:
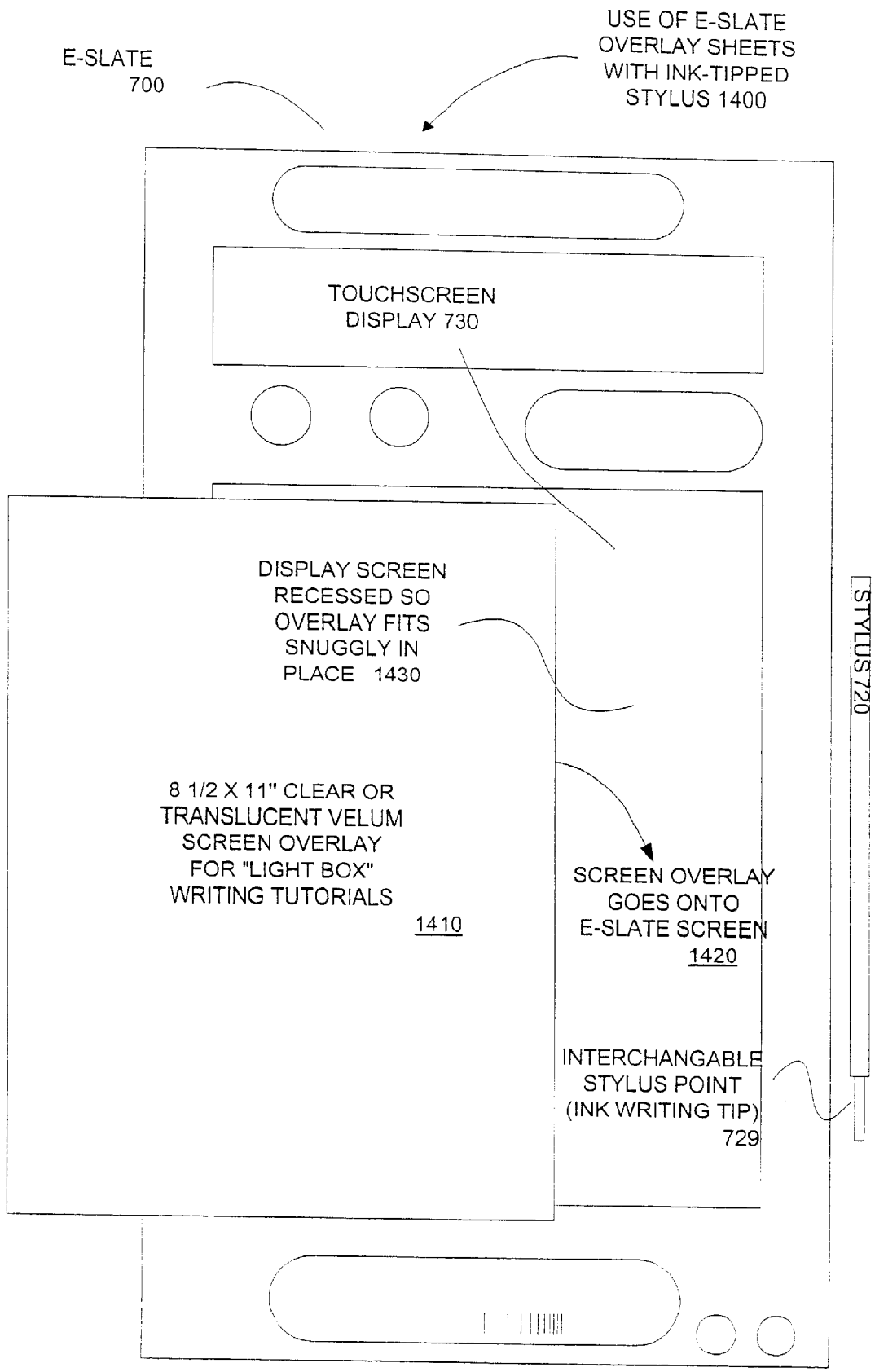
FIG. 14 is a block diagram representation of the combined use of the e-Slatedevice and a translucent velum overlay for light box writing tutorials.
Figure 15:
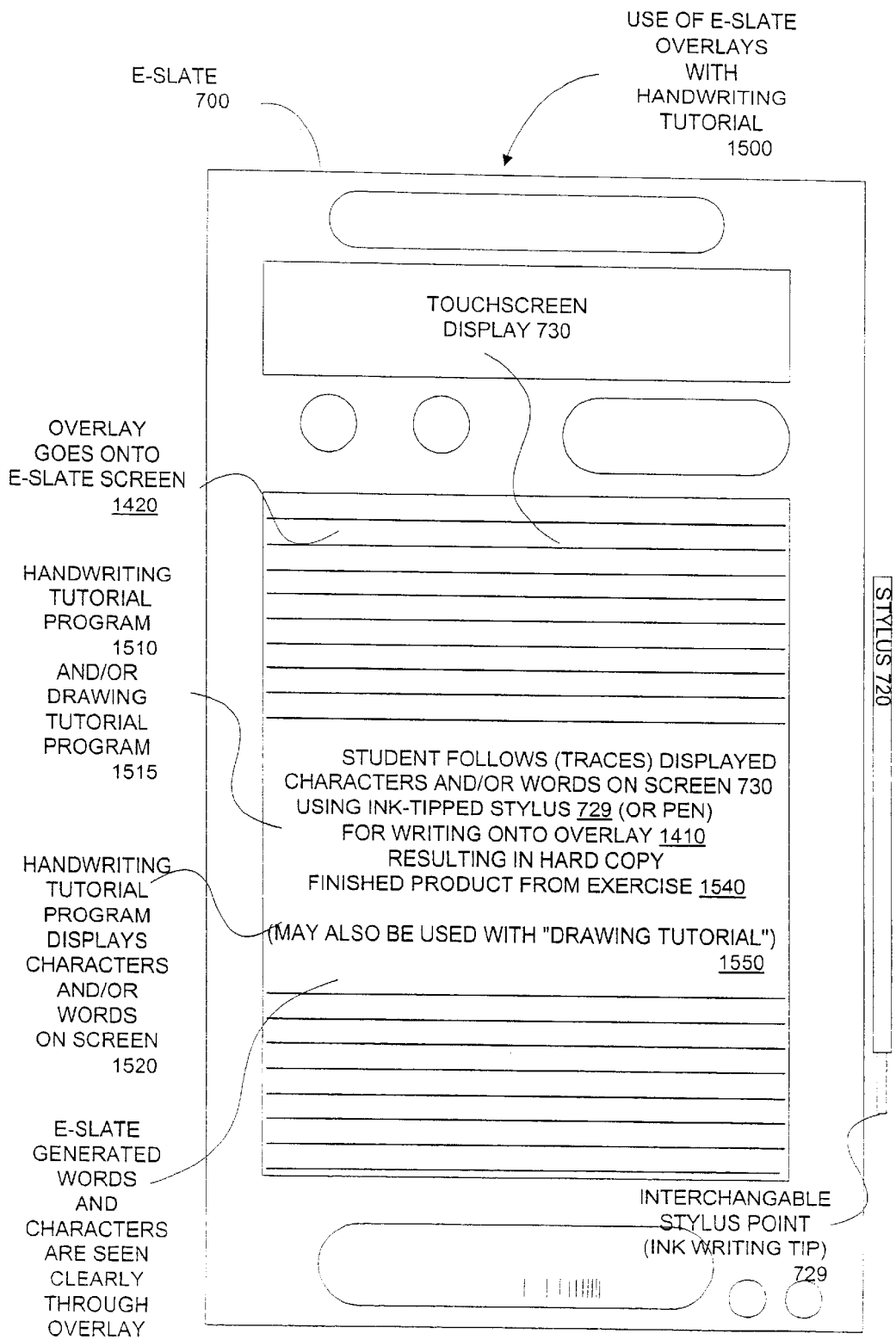
FIG. 15 is a pictorial representation of the e-Slate device with the handwriting tutorial overlay.
Figure 16:
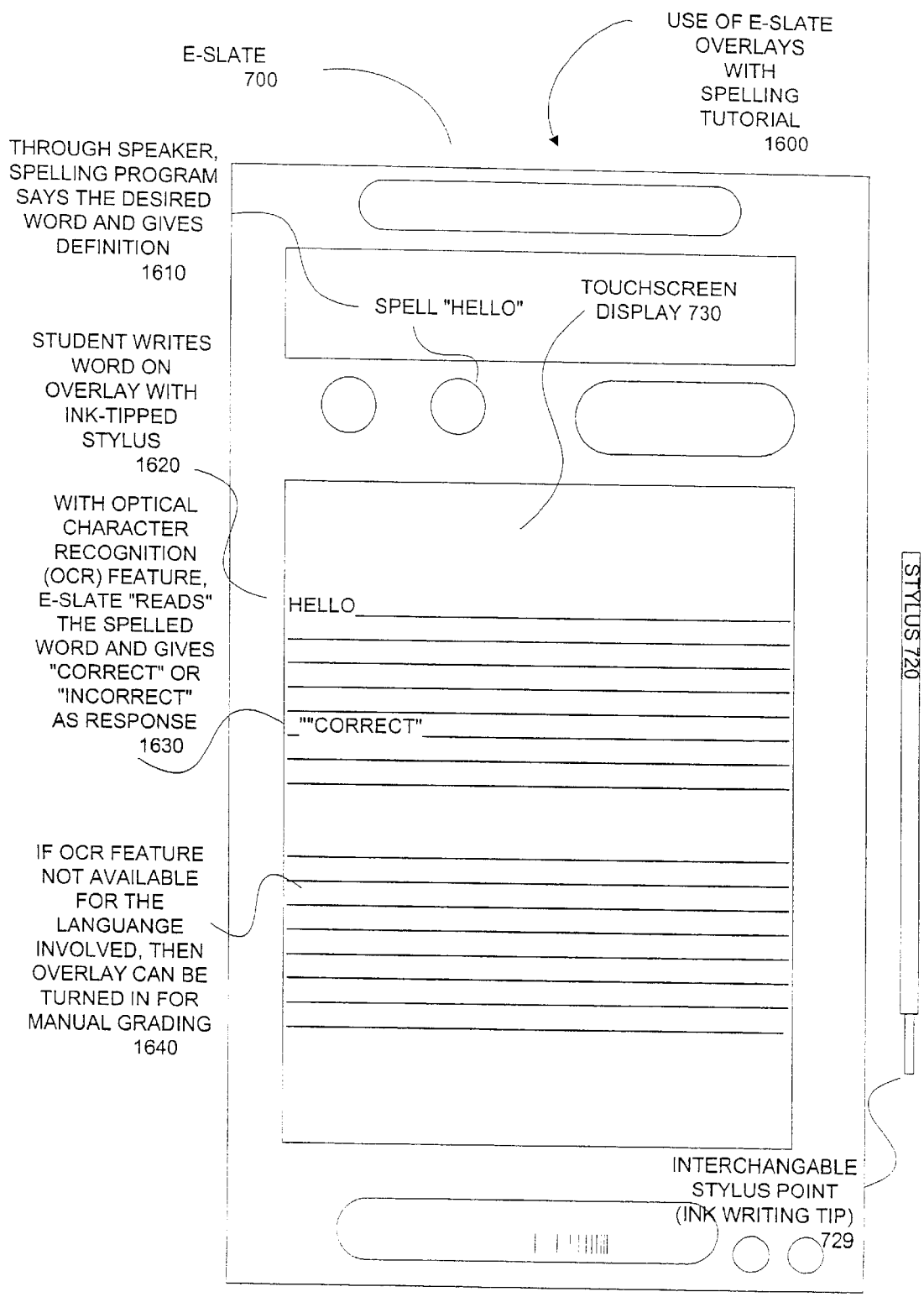
FIG. 16 is a pictorial representation of an e-Slate with a spelling tutorial overlay.

FIGS. 14, 15, and 16 depict novel uses of the e-Slate device for particular education activities. For these figures, stylus 720 is equipped with an interchangeable stylus point which includes an ink writing tip 729. Various screen overlays are provided which are positioned over the e-Slate touch screen. FIG. 14 depicts the use of e-Slate overlay sheets 1410 in combination with the use of an ink-tipped stylus 729. As is shown, e-Slate 700 has a touch screen display 730 which is dimensioned to correspond to a conventional "page" in a print format. In the United States of America, this represents an 8½×11" display. Transparent velum overlays 1410 are provided which are generally of the same dimensions, namely 8½×x11" in the United States of America, but other dimensions in other geographic areas. The transparent velum 1410 is laid on top of the touch screen display 730 and the ink writing tip 729 of the stylus 720 is utilized to conduct handwriting tutorials 1420. The student's work product can be preserved on the translucent velum 1410, but it also may be recorded into memory of the e-Slate 700 when the touch screen display 730 is activated to record the writing tutorial.

FIG. 15 represents an alternative use of the e-Slate 700. In this instance, and overlay is utilized to conduct a handwriting tutorial 1500. As is shown, handwriting tutorial program 1510 is executed and utilized to display text on the text screen display 730. In accordance with this program, the student will follow by tracing the displayed characters and/or words on screen 730 using the ink-tip stylus 729 or a conventional pen. The handwriting tutorial program displays characters and/or words on the screen 1520. The words and characters are seen clearly through the overlay 1530. They are traced, resulting in a hard copy finished product 1540. Alternatively, there also may be a drawing tutorial 1550 which allows tracing exercises to teach drawing or illustration. Of course, the e-Slate 700 may be utilized to capture the work product in digital memory for parental, teacher, or other types of review. This occurs when the touch screen display 730 is actuated to record the pressure from the writing tip 729 as the pen bears down upon the overlay. It is also possible the transparent velum overlays could be preprinted with testing or other information (graphics, check boxes, guides, etc . . . ).

FIG. 16 depicts the utilization of the e-Slate 700 in a spelling tutorial 1600. As is shown, the speaker is utilized in the spelling program to provide instructions and to provide the words which must be spelled. For example, as is shown in FIG. 13, the speaker may be utilized to say "spell hello." In accordance with step 1610, utilizing the speaker, the spelling program 1600 says the desired word and gives a definition. In response, and in accordance with step 1620, the student writes the word on the overlay utilizing stylus 720 which is equipped with ink writing tip 729. Then, in accordance with step 1630, utilizing optical character recognition (OCR) feature, the e-Slate 700 "reads" the spelled word and gives appropriate feedback. For example, the program may say "correct" or "incorrect" utilizing the speaker. Alternatively, and in accordance with step 1640, when an optical character recognition (OCR) feature is not available for the language, then the overlay can be turned in for manual grading or auxiliary OCR scanning.

Figure 17:
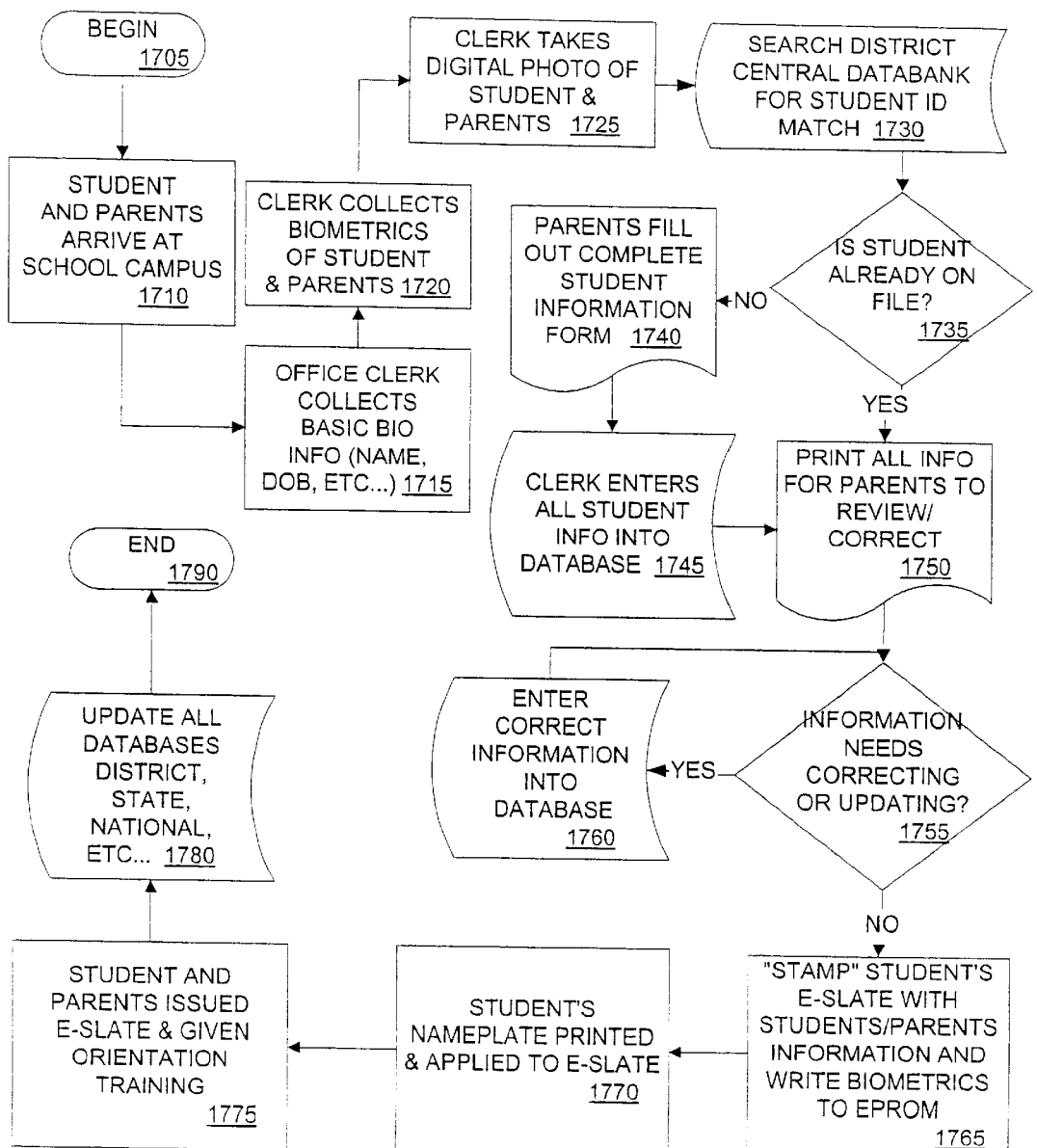
FIG. 17 is a flowchart representation of the issuance of an e-Slate device to a student during a registration process at a school campus.

FIG. 17 is a flowchart representation of the process through which an e-Slate 700 is issued for the first time to a student during the initial registration process at a school campus 1700. The process begins at block 1705 and continues at block 1710, wherein the student and parents arrive at the school campus. In accordance with step 1715, the office clerk collects the basic biographical information such as name, date of birth, parent's name, address, phone numbers, and any other basic information necessary to effect registration. In accordance with step 1720, the clerk then collects biometrics from the student and the parents. Presently, thumbprint recognition is relatively well developed technology with relatively low cost input devices. However, it is likely that voice and retina biometric systems will be more fully developed, commercialized, and affordable in the very near future. The present invention is not limited to any one particular type of biometric measure, and eventually may require several different independent biometric measurements to enhance security. In accordance with step 1725, the clerk then takes a digital photo of the student and his or her parents. Next, in accordance with step 1730, the clerk will search the district central databank for a student ID match. In accordance with block 1735, a determination is made as to whether the student is already on file in that particular district central databank; if the student is already on file, processing continues at block 1750; however, if the student is not on file processing continues at block 1740. Considering the first situation in which a student is already on file, in accordance with block 1750, the clerk will print all information for the parents to review and correct. However, if the student is not already on file, control passes to block 1740, wherein the parents fill out a complete student information form, and then in accordance with step 1745 the clerk enters all the student information into the database and control passes to block 1750 wherein a printout is generated of the information for the parents to review and correct. In block 1755, a determination is made as to whether the information needs correcting and/or updating. If so, control passes to block 1760, wherein the correct information is entered into the database. If not, control passes to block 1765, wherein the e-Slate 700 is electronically "stamped" with the information and biometric measures for both the student and his or her parents. Preferably, the "stamping" takes the form of recording digital content into an EPROM device. From that point on, this particular e-Slate 700 is uniquely associated with that student and his or her parents. Next, in accordance with step 1770, a student's nameplate is printed and applied to the e-Slate. Then, in accordance with step 1775, the student and parents are issued the e-Slate 700 and given orientation training. Next, in accordance with step 1780, all databases including the local, state, national, international databases are updated as is appropriate and as is agreed upon by all the entities. Then, the process ends in accordance with step 1790.

Figure 18:
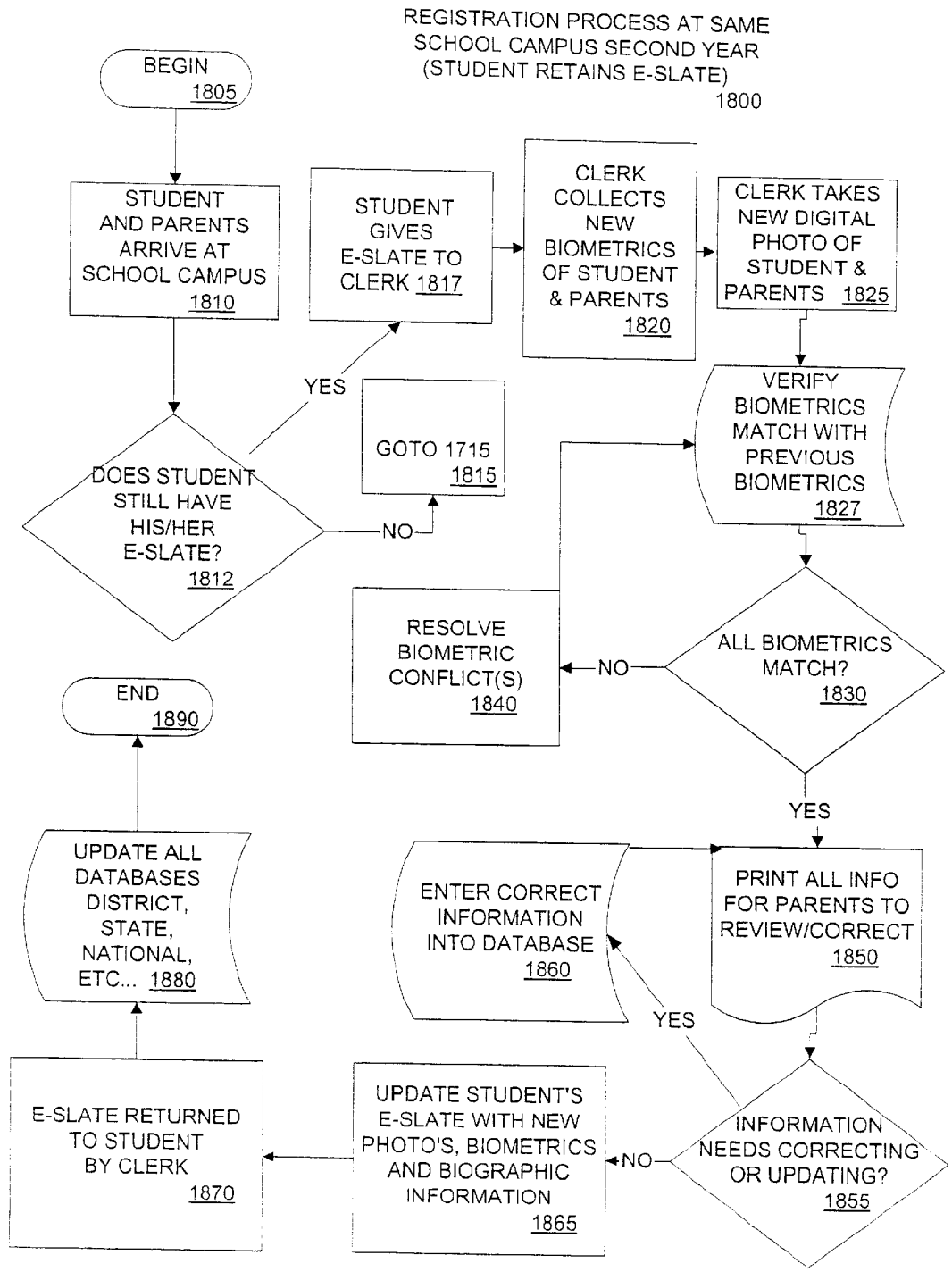
FIG. 18 is a flowchart representation of the registration process at the same school campus in additional years.

FIG. 18 is a flowchart representation of a registration process at the same school campus in a subsequent year. Under this scenario, the student retains the e-Slate 700 between grades and utilizes the same device in the next school year. The process begins at block 1805. In accordance with block 1810, the student and parents arrive at the school campus. In accordance with block 1812, a determination is made as to whether the student still has his or her e-Slate 700. If the e-Slate has been lost or destroyed, processing continues in accordance with block 1715 of FIG. 17;

however, if the student still has the e-Slate 700, control passes to block 1817, wherein the student gives the e-Slate to the clerk. Next, in accordance with block 1820, the clerk collects new biometrics from the student and parents. As set forth in block 1825, the clerk takes a new digital photo of the student and the parents. In accordance with step 1827, the biometrics are examined to determine whether they match with the previous biometrics. At block 1830, a determination is made as to whether all biometrics match. If there is not a complete match, in accordance with step 1840, the biometric conflicts are resolved and control returns to block 1827; however, if all biometrics match, control passes to block 1850, wherein all information is printed for the parents to review and correct. In accordance with step 1855, a determination is made as to whether any information needs to be corrected or updated. If correction is necessary, control passes to block 1860, wherein the correct information is entered into the database, and the information is printed again in accordance with step 1850 for final review and correction 1855. However, if it is determined in step 1855 that the information does not need correcting or updating, control passes to block 1865, wherein the student's e-Slate is updated with the new photos, the biometrics, and any modified biographical information. Next, in accordance with step 1870, the e-Slate 700 is returned to the student by the clerk. Then, in accordance with step 1880, the system updates all relevant databases, including local, state, national and international, and the process ends at step 1890.

Figure 19:
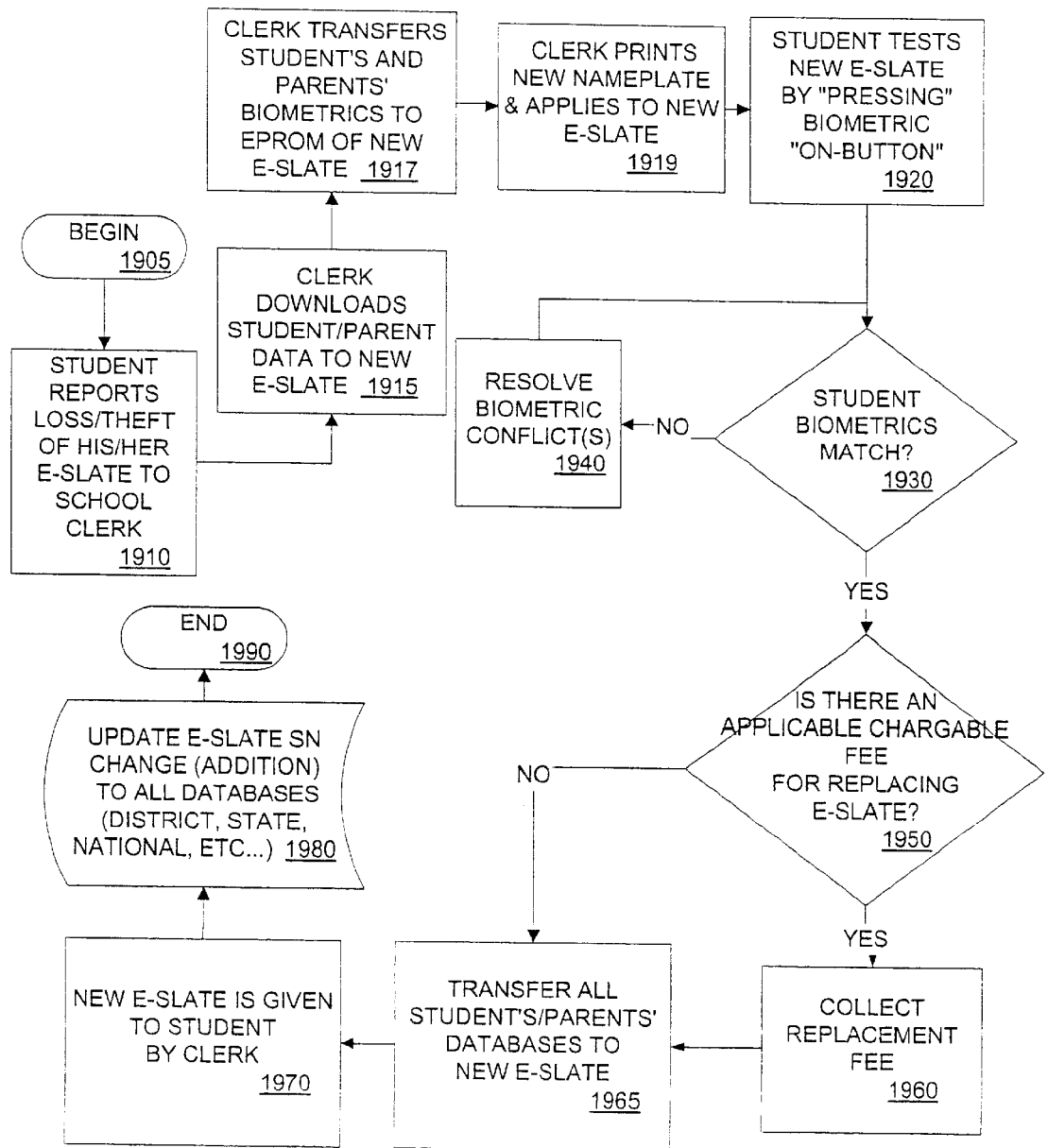
FIG. 19 is a flowchart representation of the process utilized to replace lost or stolen e-Slates devices during a school year.

FIG. 19 is a flowchart representation of the process utilized to replace lost or stolen e-Slate devices to a student during a school year 1900. The process begins at block 1905, and continues at block 1910, wherein the student reports either the loss or theft of his or her e-Slate 700 to the school clerk. Next, in accordance with step 1915, the clerk downloads the student parent data to a new e-Slate. Then, in accordance with step 1917, the clerk transfers the student's and the parents' biometric data to the EPROM of the new e-Slate 700. The clerk then prints the new nameplate and applies it to the e-Slate in accordance with step 1919. Next, in accordance with step 1920, the student tests the new e-Slate by "pressing" the biometric "on-button." In block 1930, the e-Slate biometric device examines the biometric data received from the "on-button" and compares it to the biometric data recorded in EPROM memory and determines whether there is a match between the biometrics. If there is no match, control passes to block 1940, wherein the clerk resolves the biometric conflicts. If there is a match in the biometrics, as determined in step 1930, control passes to block 1950, wherein the clerk determines whether there is an applicable chargeable fee for replacing the e-Slate; if there is an applicable fee, in accordance with step 1960, the clerk collects the replacement fee; however, if there is no applicable fee, the clerk transfers ail of the student and parent databases to the new e-Slate in accordance with step 1965. Control then passes to block 1970, wherein the e-Slate is then given to the student by the clerk. In accordance with step 1980, the e-Slate serial number is changed (added) on all relevant databases, district, state, national, etc. and the process ends at block 1990.

Figure 20:
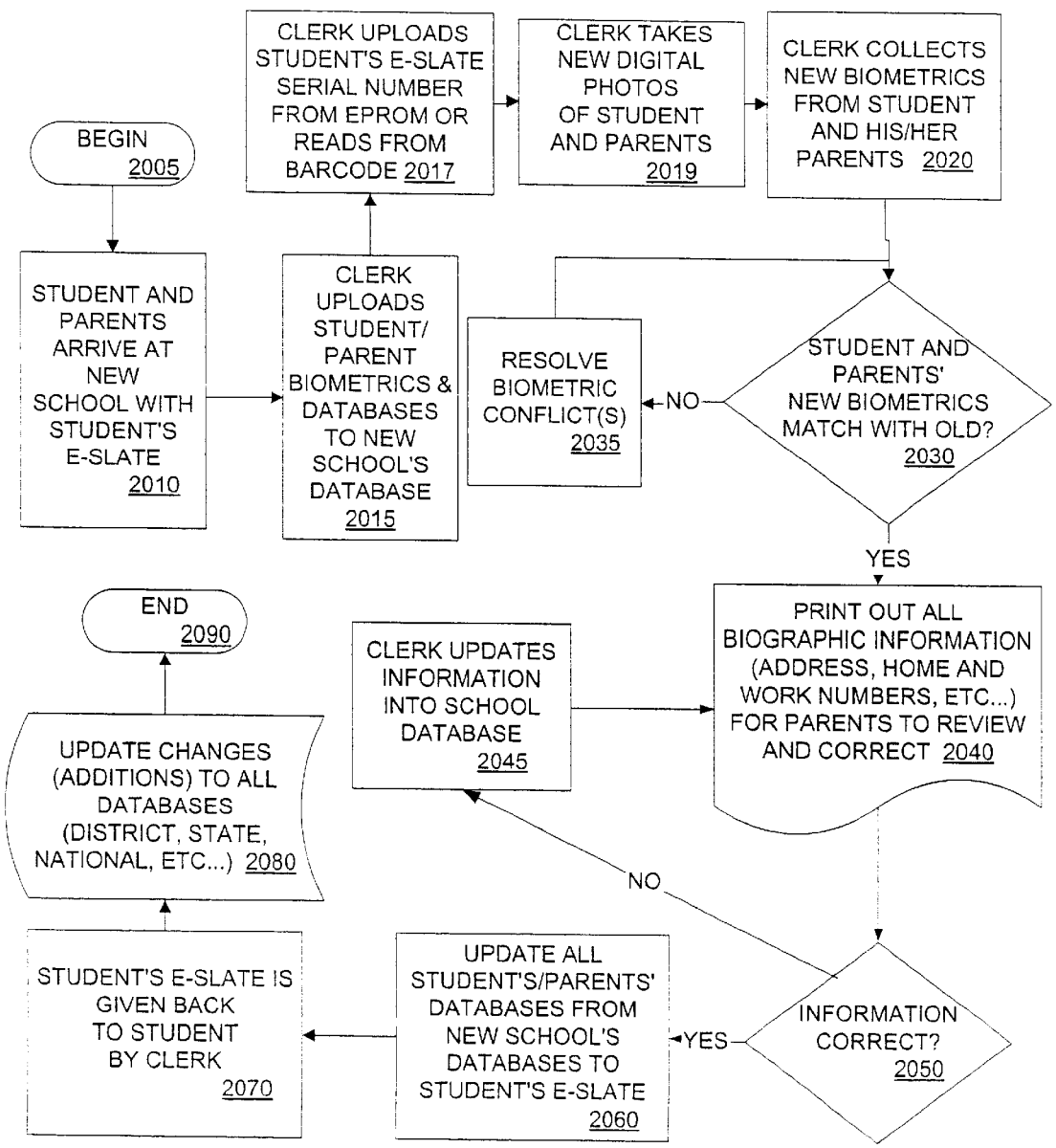
FIG. 20 is a flowchart representation of the process utilized for the transfer of a student during a school year, taking the e-Slate with him or her.

FIG. 20 is a flowchart representation of the process which is utilized when a student transfers to a new school during the school year and takes the e-Slate with him or her to the new school 2000. The process commences at block 2005, and continues to block 2010, wherein the student and parents arrive at the new school with the student's e-Slate. Next, in accordance with step 2015, the clerk uploads the student and parent biometrics, as well as the student and parents' databases from the student's e-Slate to the new school's database. Then in accordance with step 2017, the clerk uploads the student's e-Slate serial number from the EPROM or reads it from the barcode which is carried on the e-Slate. Next in accordance with step 2019, the clerk takes a new digital photo of the student and his or her parents. In step 2020, the clerk collects new biometrics from the student and his or her parents. Control then passes to block 2030, wherein a comparison is made between the new biometrics data and the old biometrics data in order to determine whether there is a match. If there is no match, control passes to block 2035, wherein the biometric conflicts are resolved; however, if there is a match in the biometric data, control passes to block 2040, wherein all the biographic information is printed for the parents to review and correct. Control then passes to block 2050, wherein it is determined whether the information is correct. If the information is not correct, control passes to block 2045, wherein the clerk updates the information into the school database; if the information is correct however, control passes to block 2060, wherein all of the student and parent databases are updated from the new school's databases to the student's e-Slate, then control passes to block 2070, wherein the student's e-Slate is given back to the student by the clerk. In accordance with step 2080, all changes and additions to the relevant databases are made, including any district, state, national, or international databases which are operatively associated with this data and the process ends at block 2090.

Figure 21:
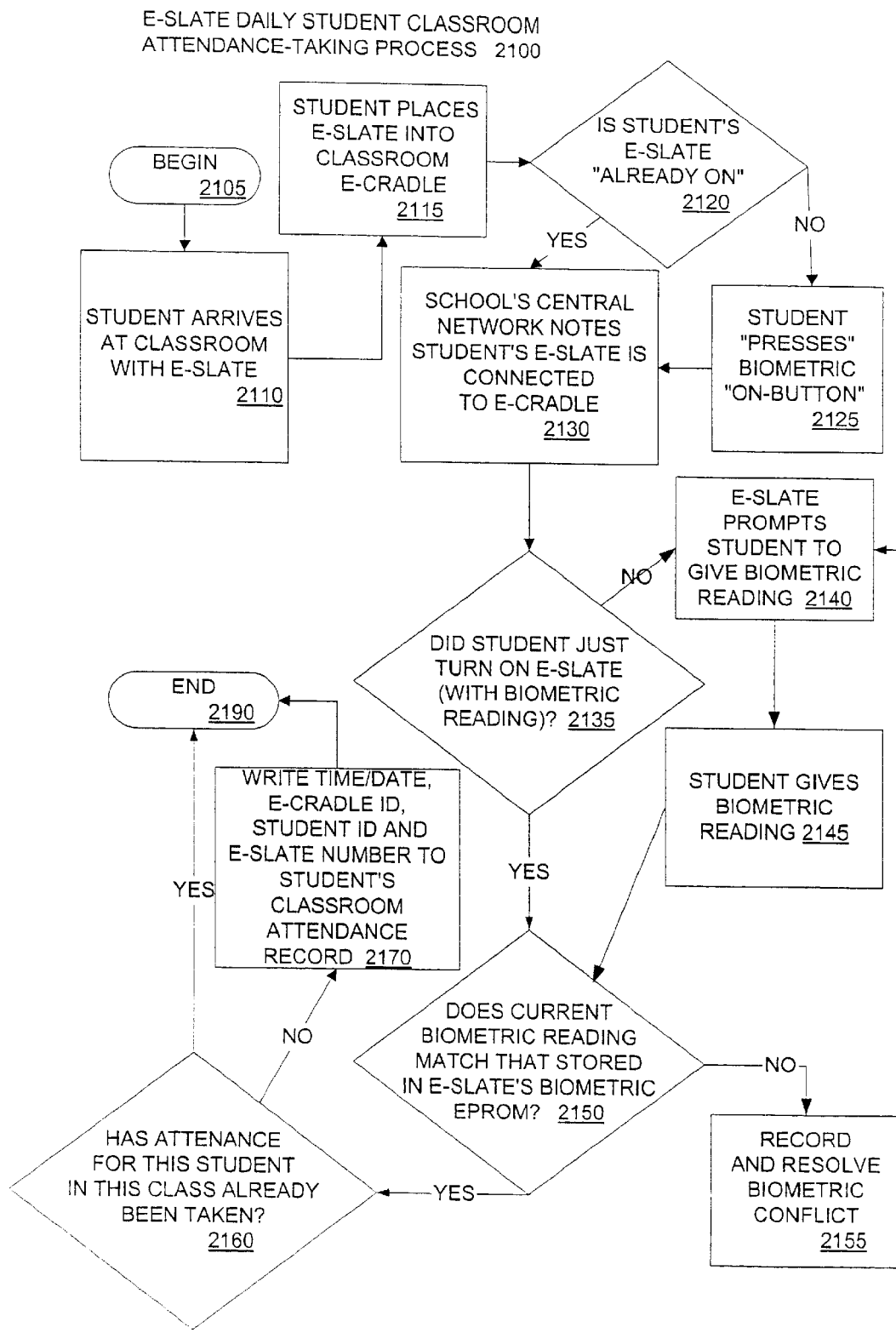
FIG. 21 is a flowchart representation of the utilization of an e-Slate for student classroom attendance-taking purposes.

FIG. 21 is a flowchart representation of the utilization of e-Slate 700 in the classroom in order to take daily attendance 2100. The process commences at block 2105 and continues at block 2110, wherein the student arrives at the classroom with his or her e-Slate. In accordance with step 2115, the student places his or her e-Slate 700 in the classroom e-Cradle 900. In accordance with block 2120, the central network determines whether the student's e-Slate is in an "already on" condition; if the e-Slate is not "already on" control passes to block 2125, wherein the student presses the biometric "on-button;" however, if the e-Slate is in an "already on" condition, control passes to block 2130, wherein the school's central network notes the student's e-Slate is connected to the e-cradle. Control then passes to block 2135, wherein the central network determines whether the student just turned the e-Slate on utilizing the biometric reading; if it was not just turned on, the student is prompted by the e-Slate to give a new biometric reading in accordance with block 2140. This is accomplished by providing a text or audio prompt to the student in a message passed from the network, through the e-Cradle 900, into the e-Slate 700. In accordance with step 2145, the student gives a biometric reading. In accordance with block 2150, the network examines the biometric reading and determines whether or not there is a match between the biometric data stored in the e-Slate 700 and the current reading. If there is no match, control passes to block 2155, wherein the event is recorded and the biometric conflict is resolved. Control will then pass to block 2140. However, if it is determined in block 2150 that the biometric data does match, control passes to block 2160, wherein the central network determines whether or not attendance for the student in this class has already been taken; if so, control passes to block 2190, wherein the process ends; however, it the attendance has not been taken already, control passes to block 2170, wherein the time and date, the e-Cradles ID (i.e. IP address), student ID, and the e-Slate number are written to the classroom attendance record, then control passes to block 2190 and the process ends.

Figure 22:
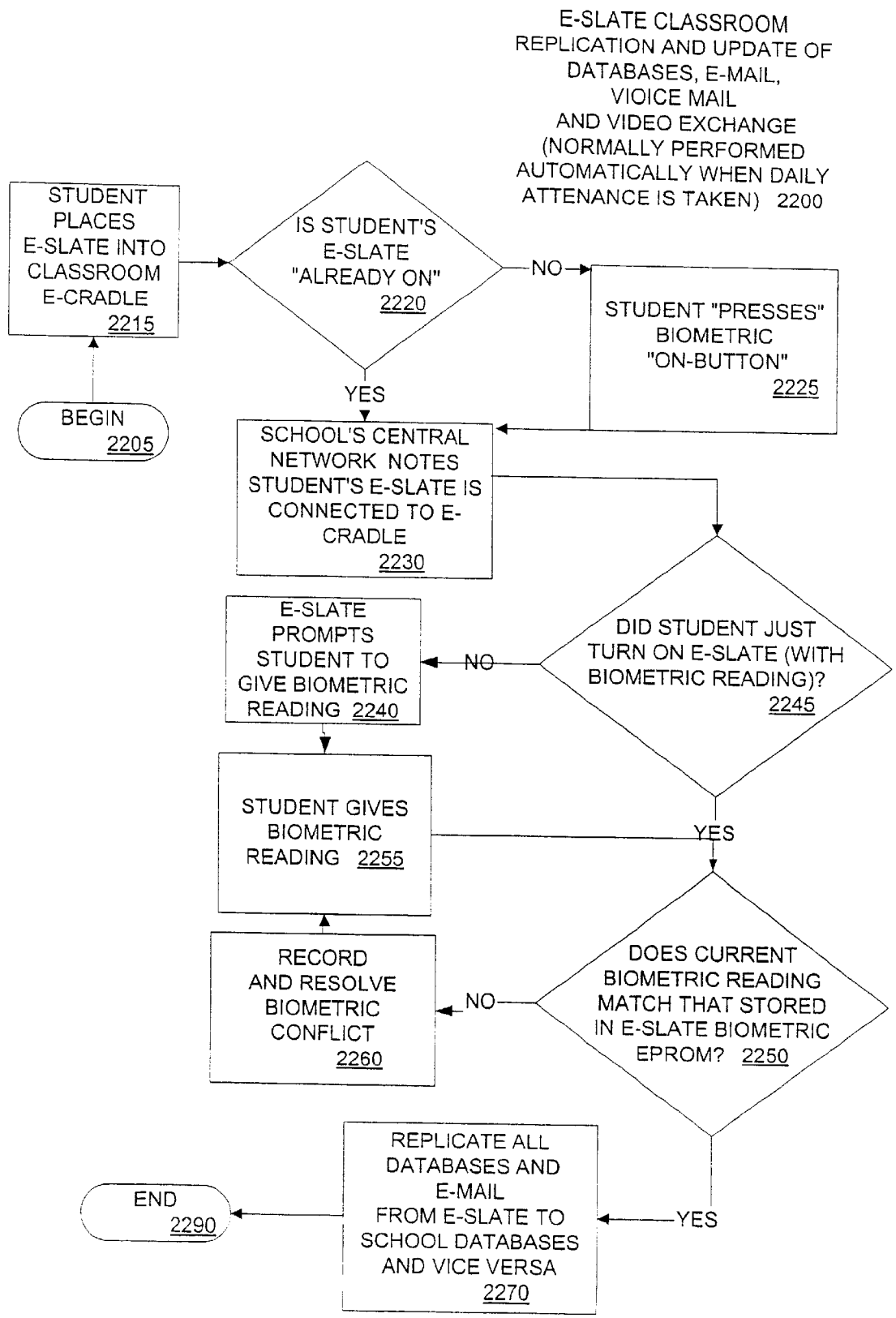
FIG. 22 is a flowchart representation of the updating of the e-Slate data.

FIG. 22 is a flowchart representation of an updating process which is preferably conducted automatically when daily attendance is taken 2200. This updating will update the databases, e-mail messages, voice mail messages, and video exchanges, which are resident or carried in either the e-Slate 700 or the system network. For example, e-mail, video, or voice mail messages from a parent are carried in the e-Slate 700 and passed into the network for routing to an appropriate destination. For example, a message or e-mail to a teacher would be updated through the network and "pushed" to the appropriate e-Slate 700 for the correct teacher. Alternatively, a message for an administrator would be updated through the system network and "pushed" to the appropriate e-Slate 700 for the appropriate administrative personnel. The process commences at block 2205, and continues at block 2215 wherein the student places his or her e-Slate 700 in the classroom e-Cradle 900. In accordance with block 2220, the central network determines whether the student's e-Slate is in an on or off condition. If the student's e-Slate is "already on," control passes to block 2225, wherein the student is prompted to "press" the biometric "on-button" (that is, in the case of a thumbprint biometric, but other prompts may be required and other input devices may be required if other different or additional biometrics are utilized). If the student's e-Slate is "already on," or if the student "presses" the biometric "on-button," control will pass to block 2230, wherein the school's central network notes the student's e-Slate is connected to the network through the e-Cradle 900. In accordance with block 2245, the network determines whether the student just turned the e-Slate 700 "on" with a biometric reading; if not, control passes to block 2240, wherein the student is prompted by the e-Slate to give an additional biometric reading, and the biometric reading is received in accordance with block 2255; if the student just recently turned "on" e-Slate 700 with the biometric reading, blocks 2240 and 2255 are skipped and control passes directly to block 2250. In accordance with block 2250, the e-Slate examines the biometric reading and determines whether it matches with the biometric data stored in the e-Slate biometric EPROM. If there is no match, control passes to block 2260, wherein a record is made of the mismatch, and an attempt is made to resolve the biometric conflict, and additional biometric readings may be required; however, if there is a match in block 2250, control passes to block 2270, wherein all new data, new e-mail, new voice mails, new video messages from the e-Slate are replaced or copied to the network database, and wherein all new data, e-mails, voice mails, and video messages carried by the network and not previously communicated to the e-Slate are passed into the e-Slate and recorded in memory along with homework, new assignments, reading materials, video clips, test results, etc . . . . The process then ends in accordance with block 2290.

Figure 23:
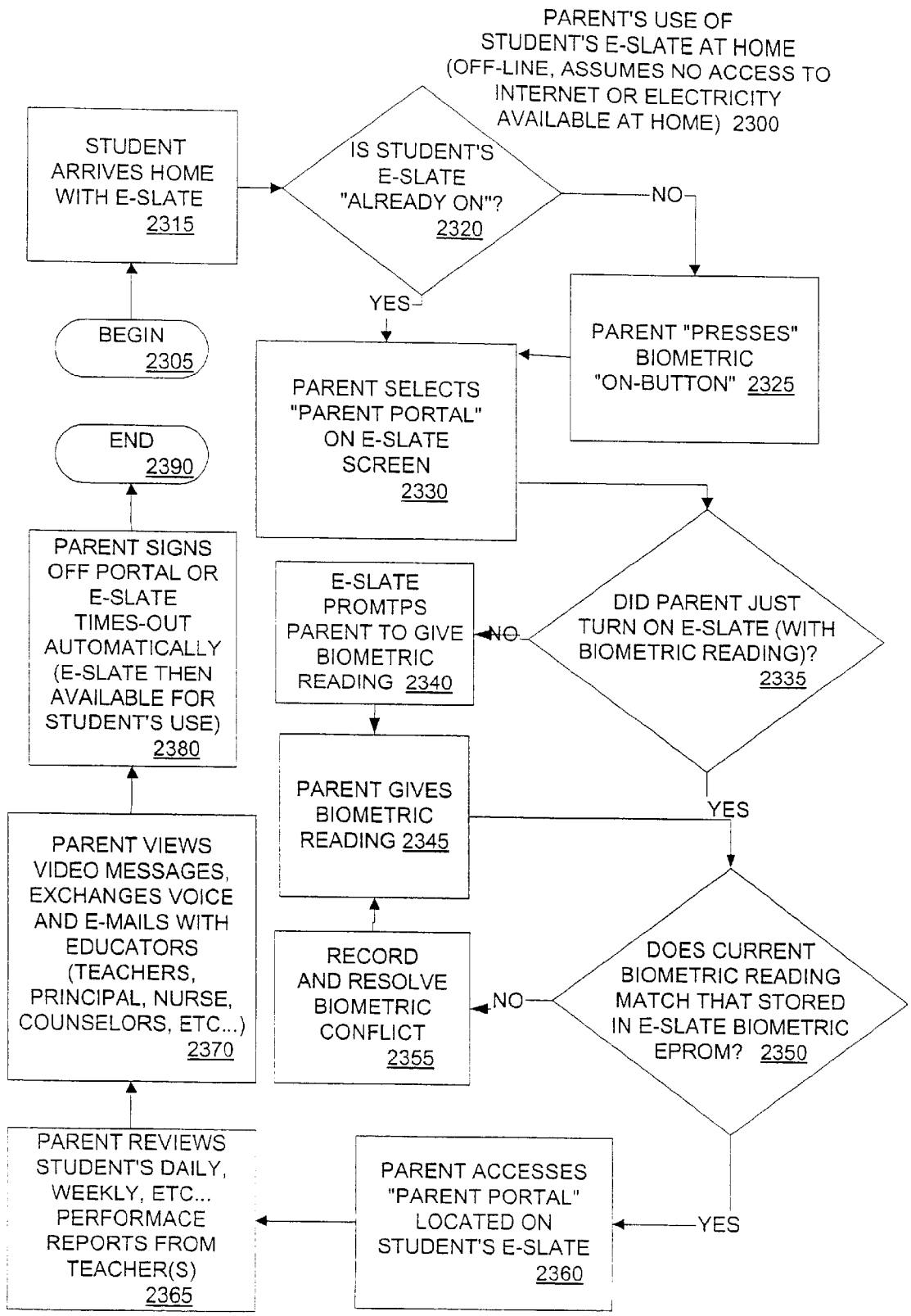
FIG. 23 is a flowchart representation of a parent's use of a student's e-Slate at home in an off-line mode of operation.

FIG. 23 is a flowchart representation of the parents' use of the student's e-Slate in a home environment 2300. This scenario assumes that the home does not have electricity and further that the home does not have access to the Internet. The process commences at block 2305, and continues at block 2315, wherein the student arrives at home with his or her e-Slate 700. In accordance with step 2320, the parent examines the student's e-Slate 700 to determine whether it is in an "already on" condition. If the e-Slate is not in an "already on" condition, control passes to block 2325, wherein the parent presses the biometric "on-button." If the e-Slate is in an "already on" condition, control passes to block 2330. In either case, the parent will then select the "parent portal" option on the e-Slate screen by depressing the appropriate touch sensitive portion of the screen. Then, in accordance with step 2335, the e-Slate determines whether the parent recently turned the e-slate 700 to a "on" condition with a biometric reading; if not, control passes to block 2340, wherein the parent has requested through a prompt to provide a biometric reading. Then the biometric reading is received in accordance with step 2345 and control returns to block 2350. If it is determined in step 2335 that the parent did just turn the e-Slate on with the biometric reading, the procedures of step 2340 and 2345 are bypassed and control passes directly to block 2350. In block 2350, the e-Slate 700 determines whether the biometric reading matches that stored in the e-Slate biometric EPROM. This is done in accordance with step 2350. If there is no match, control passes to blocks 2355 and 2345, wherein the conflict is resolved. This may entail requesting the parent to give additional biometric readings, in accordance with block 2345. However, if it is determined in block 2350 that there is a match in the biometric data, control passes to block 2360, wherein the parent is permitted entry into the parental portal portion of the e-Slate database. The parent may then review the student's daily, weekly, or other types of performance reports from the teachers, all in accordance with block 2365. Next, in accordance with block 2370, the parent or parents may view any video, voice, or e-mail messages and may respond to such messages. The responses are recorded in memory of the e-Slate 700 and carried back by the student to the classroom where they are replicated and passed through the network to the appropriate recipients. Then, in accordance with block 2380, the parent signs of the portal or the e-Slate "times-out" automatically. Now, the e-Slate is available for the student's use. The process then ends in accordance with block 2390.

Figure 24:
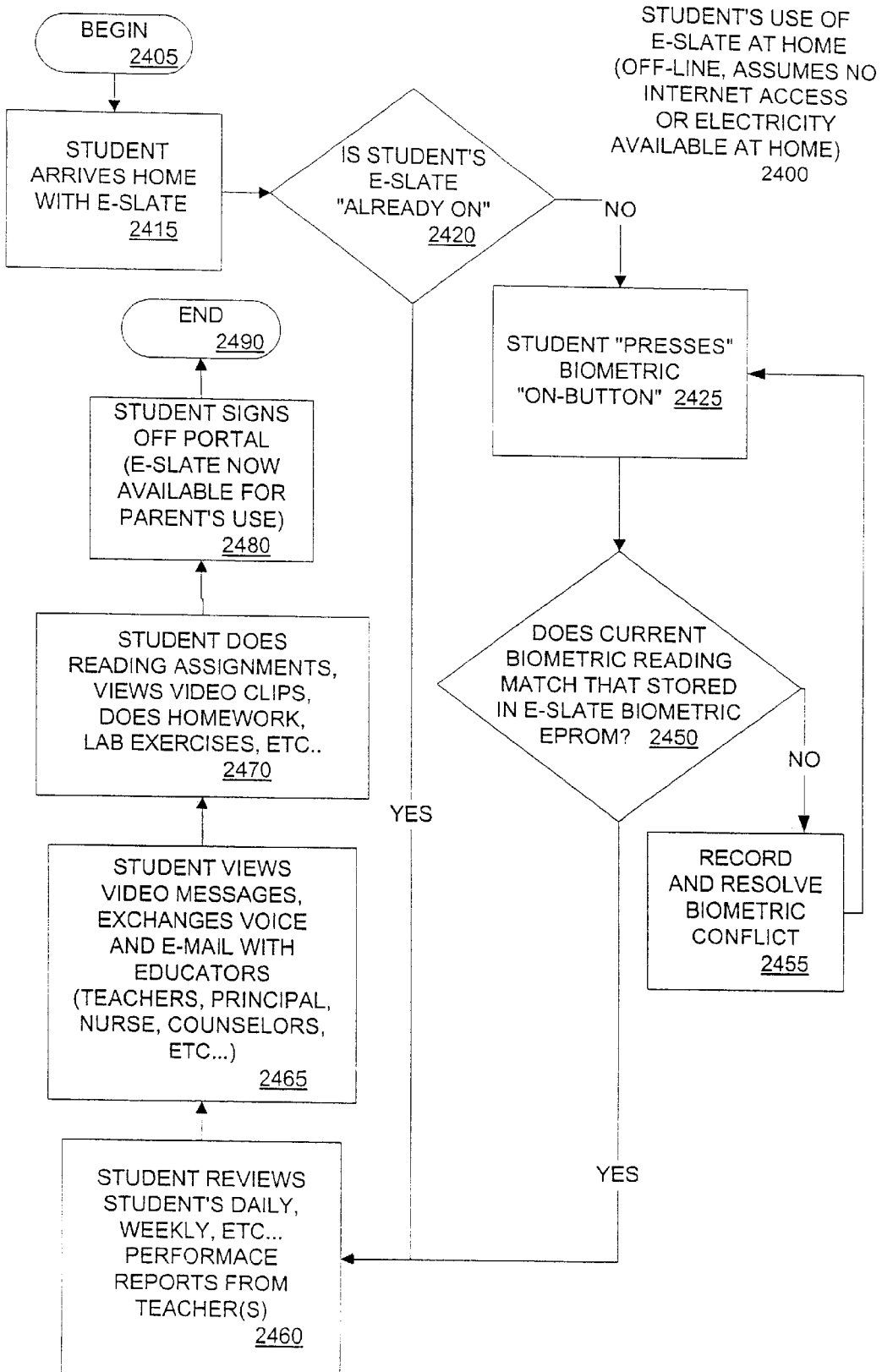
FIG. 24 is a flowchart representation of a student's use of the e-Slate at home in an off-line mode of operation.

FIG. 24 is a flowchart representation of the utilization of an e-Slate 700 at a home environment in an off-line mode of operation 2400. This assumes a household which has neither Internet access nor electricity available to power the device. The process begins at block 2405 and continues at block 2415 wherein the student arrives at home with his or her e-Slate 700. Next, in accordance with block 2420, the e-Slate determines whether it is in an "already on" condition; if not, control passes to block 2405; if so, control passes to block 2460. When the e-Slate is not in an "already on" condition, in accordance with block 2425, the student must "press" the biometric "on-button" in order to initiate the device and utilize the device. The device responds in accordance with block 2450 by examining the biometric reading and determining whether it matches the stored biometric data in the e-Slate 700 EPROM, wherein the conflict is resolved, to the extent that it can be resolved. This may require additional readings of the biometric data utilizing the biometric "on-button" in accordance with block 2425, so control may pass back to block 2425. However, if it is determined in block 2450, that the biometric reading matches the stored biometric in the EPROM, control passes to block 2460. In block 2460, the student reviews his or her daily, weekly, or other performance reports from a teacher. Then, in accordance with block 2465, the student views any video messages, voice messages, or e-mail messages from the instructor or the other school personnel, such as administrative personnel, school nurses, counselors, etc. The student may respond to these messages with responsive e-mail, voice mail, or even video messages (if the video camera is battery powered). Next, in accordance with step 2470, the student performs all reading assignments, views all video clips, and does all homework, or lab exercises that are presented to the student in a predetermined or logical manner by the e-Slate 700. Finally, the student signs off the student portal of the e-Slate and may make the e-Slate 700 available for parental use, all in accordance with block 2480. The process ends at block 2490.

Figure 25:
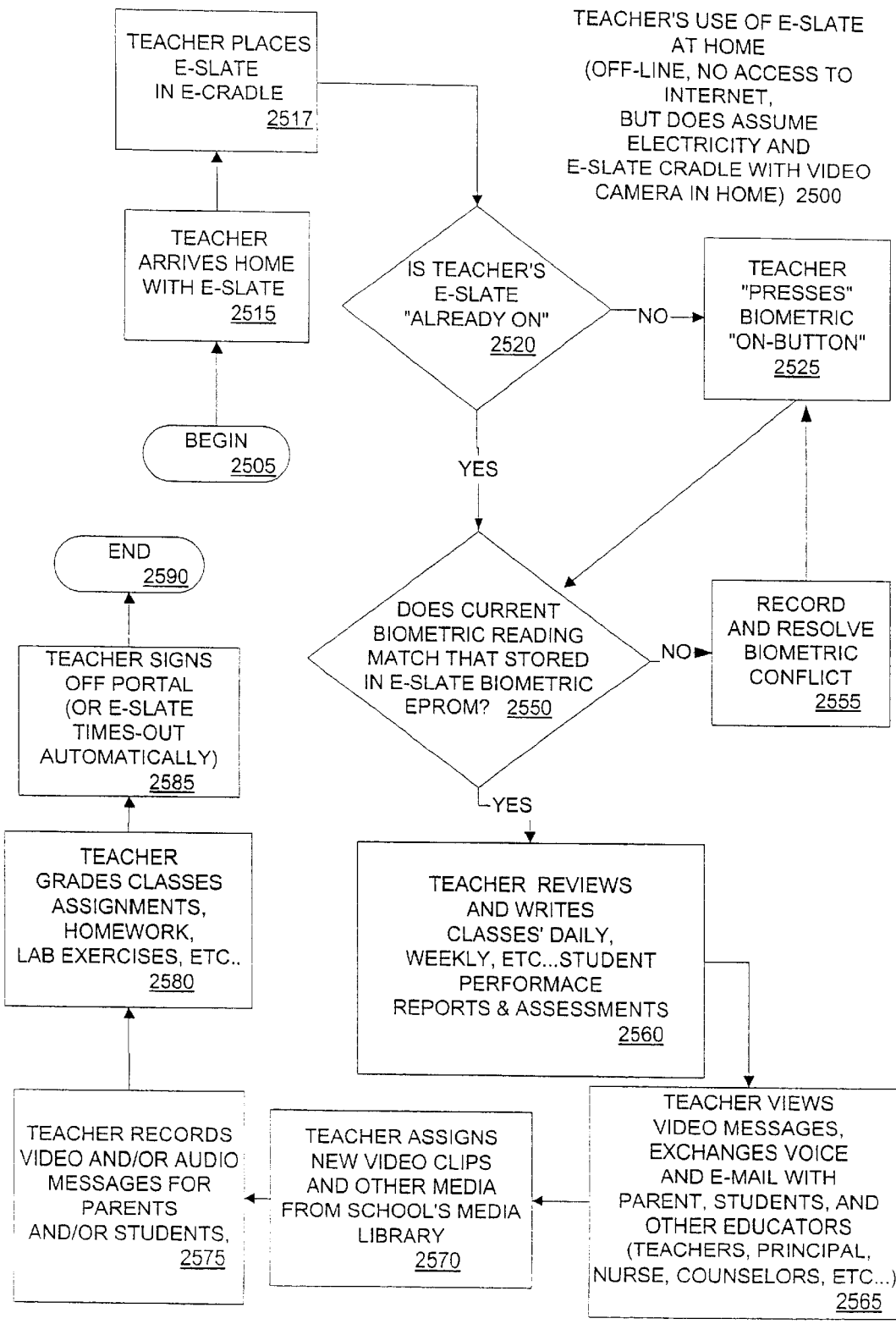
FIG. 25 is the flowchart representation of a teacher's use of the e-Slate at home in an off-line mode of operation.

FIG. 25 is a flowchart representation of the teachers use of an e-Slate at home 2500. This scenario assumes off-line use, with no access to the Internet. However, it does assume the availability of electricity and the possession of an e-Slate Cradle 900 with a video camera located in the home for at-home use. The process begins at block 2505 and continues at block 2515 wherein the teacher arrives at home with his or her e-Slate 700. In accordance with step 2517, the teacher places the e-Slate in its e-cradle. In accordance with block 2520, the operating state of the e-Slate is examined to determine whether it is "already on." If the e-Slate is not "already on" control passes to block 2525, wherein the teacher "presses" the biometric "on-button." If the e-Slate is "already on," control passes to block 2550, wherein the current biometric reading is examined to determine whether it matches the stored biometric data in the biometric EPROM of e-Slate 700, all in accordance with block 2550. If there is no match, control passes to block 2555, wherein the diametric conflict is resolved. This may require the passing of control back to block 2525 to obtain other biometric readings. Once a match is identified, control passes to block 2560, wherein the teacher reviews and writes the daily, weekly, or other class performance reports, in accordance with block 2560. Then, in accordance with block 2565, the teacher views video messages, e-mail or voice messages from parents, students, other educators, and administrators. The teacher may appropriately respond to one or more e-mail, voice mail or video mail messages by actuating the device microphone, using the keyboard, or using a digital camera located in the home, all in accordance with block 2565. Then, in accordance with block 2570, the teacher assigns new video clips and other media from the school's video library to various students. Next, in accordance with block 2575, the teacher records video and/or audio messages for parents and/or students. These may be personal messages to parents relating to a child's performance or behavior. They also may be group messages which are directed to all parents. Next, in accordance with block 2580, the teacher grades the class assignments, homework, lab exercises, and other items. Then, in accordance with block 2585 the teacher turns off the e-Slate, alternatively, the e-Slate may time-out automatically due to a lack of use. The process ends at block 2590.

Figure 26:
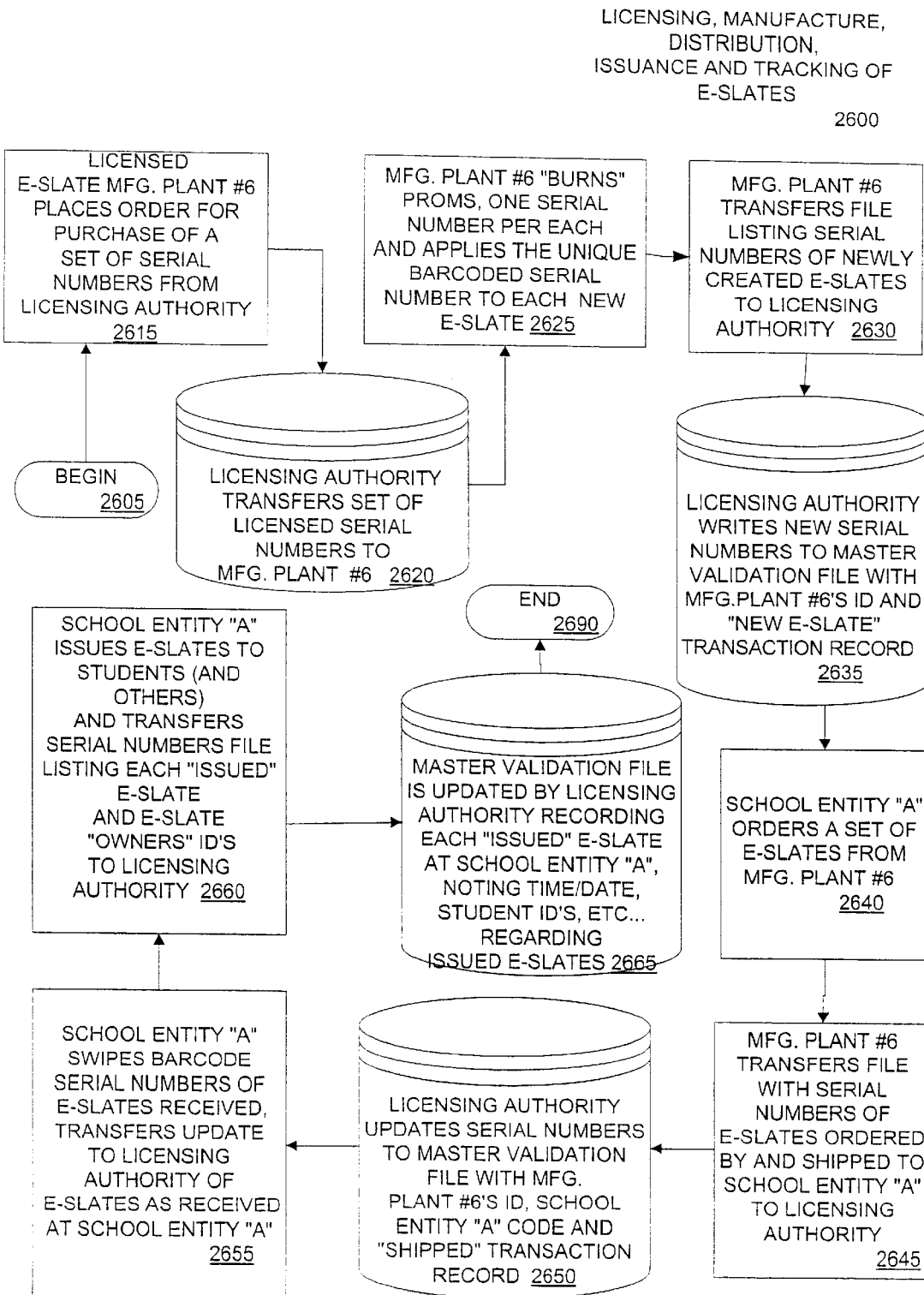
FIG. 26 is a block diagram representation of the licensing, manufacture, distribution, issuance, and tracking of e-Slate devices.

FIG. 26 is a flowchart representation of the process utilized for the licensing, manufacture, distribution, issuance and tracking of the e-Slates. The process commences at block 2605. In accordance with block 2615, a licensed e-Slate manufacturing plant places an order for purchase of a set of serial numbers from a licensing authority. Then, in accordance with step 2620, the licensing authority transfers a set of licensed serial numbers to that particular plant. The licensing authority may be the international clearinghouse 200, a national clearinghouse 300 or a some other private or governmental entity empowered to license e-Slates for manufacture. The manufacturing plant will utilize the serial numbers, to burn or record one serial number for each e-Slate and applies a unique barcoded serial number to each e-Slate, all in accordance with step 2625. The barcode number may be the serial number set forth in barcode format or it may be some number derived from the serial number through some cryptographic hash function or similar transform. In other words, conventional cryptographic techniques may be utilized to mask, conceal, or otherwise secret all or portions of any particular serial number. Next, in accordance with step 2630, the plant transfers a file listing the serial numbers of newly created e-Slates to the licensing authority. In accordance with step 2635, the licensing authority writes new serial numbers to a master validation file with the licensed manufacturers identification numbers and the new e-Slate transaction record. In accordance with step 2640, a school entity "A" may order a set of e-Slates from a manufacturing plant. A school entity might be an entire school district 500 or just a local school campus 600. Then in accordance with step 2645, the manufacturing plant transfers a file with serial numbers of the e-Slates ordered by and shipped to the school entity "A" to the licensing authority. Then, in accordance with step 2650, the licensing authority then will update the serial numbers to a master validation file with the manufacturing plant's ID number, school "A's" identity code, and a record that the order has been "shipped" in order to document the transaction and generate a transaction record. Next, in accordance with step 2655, school "A" swipes the barcode serial numbers of the e-Slates that are received in order to enter the receipt of the e-Slate devices. The school will transfer an update to a licensing authority of the e-Slate in order to document the receipt at school "A." This is also done in accordance with step 2655. Next, in accordance with step 2660, school "A" issues e-Slates to students and others and then transfers the serial numbers file listings for each issued e-Slate and the student's ID to a licensing authority. In accordance with step 2665, a master validation file is updated by the licensing authority, recording each issued e-Slate at school "A" noting the time and date of issue, the student's ID, and other information documenting and relating to the issued e-Slate. The process then ends in accordance with block 2690.

Figure 27:
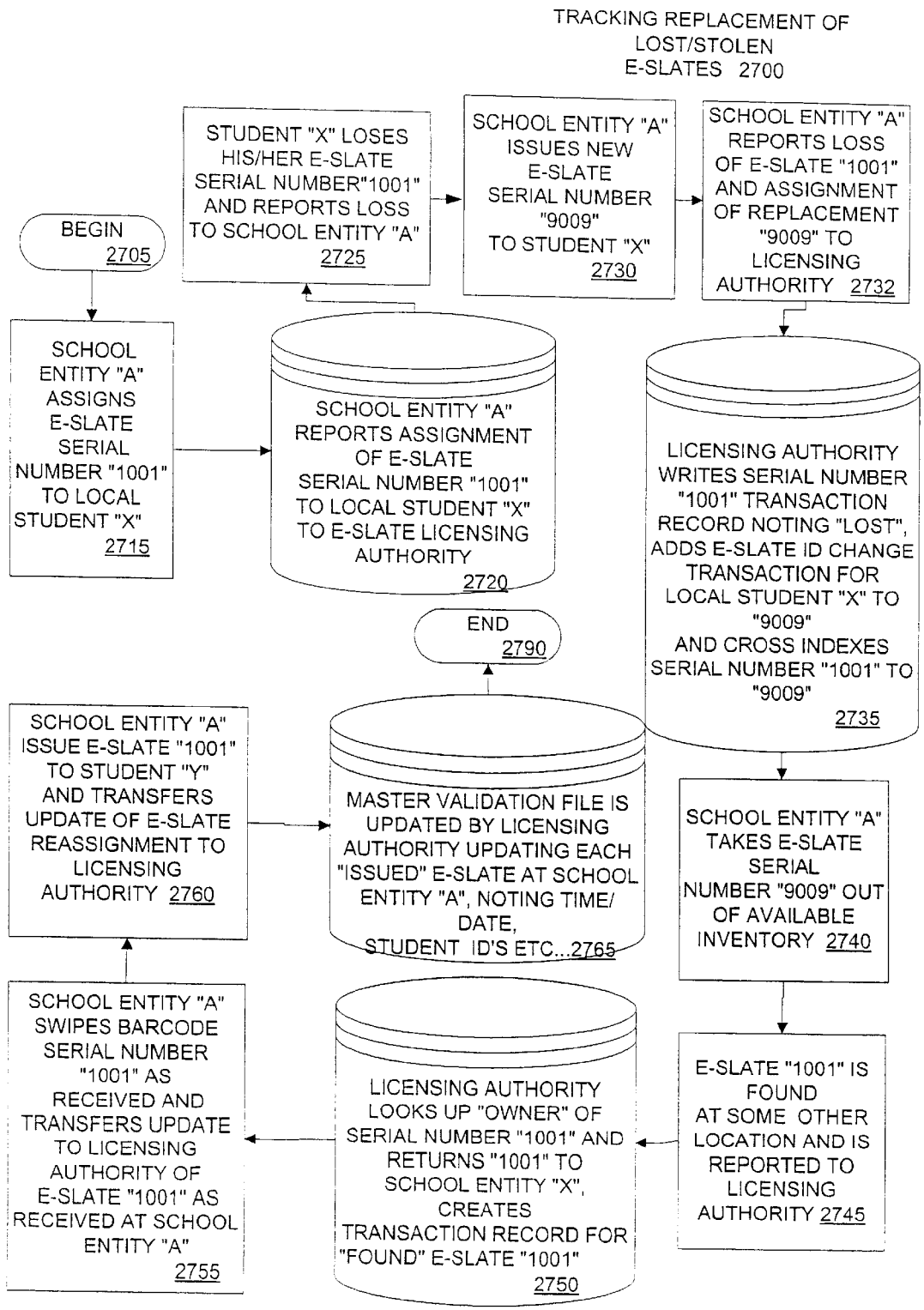
FIG. 27 is the flowchart representation of the preferred process of tracking the replacement of lost or stolen e-Slate devices.

FIG. 27 is a flowchart representation of the procedure for tracking and replacing lost and/or stolen e-Slate devices. The process begins at block 2705, and continues at block 2715, wherein school "A" assigns an e-Slate serial number of "1001" to student "X", in accordance with block 2715. Then, in accordance with block 2725, student "X" loses his or her e-slate which carries serial number 1001, and reports the loss to school "A". In accordance with step 2730, school "A" issues a new e-Slate serial number of "9009" to student "X". Then in accordance with step 2732, school "A" reports the loss of the e-Slate device having serial number "1001" and the assignment and replacement of the e-Slate with an e-Slate carrying a serial number of "9009" to the licensing authority. The licensing authority may constitute a for-profit or a not-for-profit entity which specializes in the issuance of serial numbers and the tracking of devices. Then, in accordance with step 2735, the licensing authority writes serial number "1001" to its transaction record noting that this device has been "lost." Additionally, it adds the e-Slate ID change transaction for student "X" so that new serial number "9009" is associated with student "X". The licensing entity cross-indexes serial number "1001" to "9009". This is all done in accordance with step 2735. Next, in accordance with step 2740, school "A" takes the e-Slate serial number "9009" out of its available inventory. Then in accordance with step 2745, e-Slate serial number "1001" is found at some other location and is reported to the licensing authority. In accordance with step 2750, the licensing authority looks up the identity of the "owner" associated with serial number "1001". The search returns the data which indicates that serial number "1001" has been assigned to student "X" at school "A". The licensing authority then creates a transaction record which indicates that e-Slate serial number "1001" has been "found." Next, in accordance with step 2755, school "A" swipes the barcode serial number "1001" as "received" and transfers an update to the licensing authority which indicates that e-Slate serial number "1001" has been "received" at school "A". Next, in accordance with step 2760, school "A" issues e-Slate serial number "1001" to student "Y" and transfers an update of the e-Slate reassignment to the licensing authority. In accordance with step 2765, the licensing authority updates its master validation file in order to identify the reissuance of e-Slate serial number "1001" at school entity "A" to student "Y" and notes all other appropriate information such as the time and date, the student's ID, address, and any other pertinent information. The process ends at step 2790.

FIGS. 28A and 28B are graphical depictions of exemplary records maintained in the master validation file 2800 of a licensing authority. As is shown, a number of fields are maintained. As is shown, the fields include the following fields: e-Slate serial number; time/date of transaction; reporting entity ID; and transaction. As is shown, a variety of different types of transactions are identified in this exemplary validation master file. The reporting entities include the licensing authority, manufacturing plants, schools, and reporting entities. The types of transactions which are recorded include the issuance of serial numbers, and the recordation of serial numbers into programmable read only memory (PROM), the manufacture of a device, the shipment of a unit, the receipt of a unit, the identity of the unit issued to a particular student, the report of a lost device, the report of a replacement of a lost device, the report of a found unit, the shipment of units between entities, the receipt back into inventory of available units, the transfer of a student, the graduation of a student, the recordation of biographic or biometric information, the occurrence of an attempt at false registration, and information related to the safety of a student.

FIG. 29 is a pictorial representation of a student's transaction records 2900 in a licensing authority's master validation file. As is shown, a number of fields are maintained in the student transaction record, including the following specific fields: local student ID; time/date of transaction; reporting entity ID; and a transaction. As is shown, a variety of entities are reporting information including a variety of school entities, reporting entities, and the licensing authority. This student transaction record represents a record of all activity related to the e-Slate devices which have been related over time to particular students.

FIG. 30 is a pictorial representation of a school entity and ID structure 3000. As is shown, a number of fields are maintained, each relating to three school entities ("A," "B," and "C"). As is shown, the fields include the following specific fields: student example, country code, state code, regional education service center, state district code, district campus code, and local student ID. The three exemplary school entities include two in the United States and one in Mexico. More particularly, school entities "A" and "B" are located in the United States, while school entity "C" is located in Mexico City, Mexico. As is shown, several exemplary student records are shown.

Taken together, FIGS. 28A, 28B, 29, and 30 provide exemplary database records relating to activities concerning a student and/or his issued e-Slate device. A variety of other types of records may be kept, but these represent certain basic types of transactions or events which must be recorded or maintained in a database in order to ensure integrity in the issuance and use of e-Slate devices.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended claims will cover any such modifications or embodiments that fall within the scope of the invention.

What is claimed is:

1. An education apparatus, comprising:
   (a) a portable unit issued to a student by a school, including at least:
      (1) a relatively small housing;
      (2) a touch-sensitive screen carried by said relatively small housing, dimensioned to generally correspond to a preselected page format;
      (3) a central processing unit and associated memory located in said relatively small housing for recording programs and data and for executing program instructions;
      (4) at least one biometric reader system for securing selected data carried in said memory;
   (b) a cradle system for releasable electrically coupling to said portable unit;
   (c) a school network, coupling through said cradle system to said portable unit;
   (d) wherein said portable unit is operable in a plurality of modes of operation including:
      (1) a course book mode of operation wherein course materials are presented to said student through said portable unit;
      (2) a homework mode of operation wherein homework exercises are assigned, presented, recorded, and returned through coordinated operation of said portable unit and said school network;
      (3) a school record mode of operation wherein school-related records are maintained at least in part in said portable unit and at least in part in said school network; and
      (4) a home-to-school communication mode of operation wherein bi-directional communication is facilitated between parents of said student and school officials, including teachers, through coordinated operation of said portable unit and said school network.

2. An education apparatus according to claim 1, wherein said portable unit of said education apparatus further includes:
   (5) an audio output device carried by said relatively small housing for outputting audio messages.

3. An education apparatus according to claim 1, wherein said portable unit of said education apparatus further includes:
   (5) a microphone carried by said relatively small housing for receiving audio input from at least one of said student and said student's parents.

4. An education apparatus according to claim 1, wherein said portable unit of said education apparatus further includes:
   (5) a biometric on-button operatively associated with said at least one biometric reader system for receiving instructions to change the operating state of said portable unit, while simultaneously receiving biometric input data.

5. An education apparatus according to claim 1, wherein said portable unit of said education apparatus further includes:

(5) at least one unique identifier relatively permanently associated with said portable unit including at least one of the following identifiers: a nameplate in a human-readable format, a serial number in a human-readable format, a serial number in a barcode readable format, an electronic recordation of the student's name, an electronic recordation of the serial number associated with said portable unit, an electronic recordation of at least one biometric measurement which is uniquely associated with said portable unit and operatively associated with said at least one biometric reader system.

6. An education apparatus according to claim 1, wherein said portable unit further includes:
(5) a stylus releasably carried by said relatively small housing.

7. An education apparatus according to claim 1, wherein said portable unit further includes:
(5) a stylus with a plurality of stylus tips, with at least one tip utilized for touch-sensitive interaction with said touch-sensitive screen of said portable unit, and at least one stylus tip adapted to allow said student to mark on at least one relatively transparent overlay sheet adapted to be registered with said touch-sensitive screen.

8. An education apparatus according to claim 1, wherein said portable unit further includes:
(5) a rechargeable power supply carried within said relatively small housing and utilized to provide electrical power to electrical power consuming components carried by said relatively small housing including said central processing unit and said at least one biometric reader system when said portable unit is not cradled into said cradle system.

9. An education apparatus according to claim 1, wherein said portable unit further includes:
(5) a communication system carried by said relatively small housing adapted to allow at least one of wide area network and local area network bidirectional communication with communicants remotely located from said portable unit.

10. An education apparatus according to claim 1, wherein said portable unit further includes:
(5) a handgrip aperture formed at a distal end of said relatively small housing adapted to be engaged by one hand of said user during transporting said portable unit about.

11. An education apparatus according to claim 1, wherein said portable unit further includes:
(5) an external connection for releasable electrical connection to an external power source which at least supplements an internal battery pack carried by said portable unit.

12. An education apparatus according to claim 1, wherein said portable unit further includes:
(5) an external microphone jack carried by said relatively small housing adapted to electrically releasably engage with an external microphone.

13. An education apparatus according to claim 1, wherein said portable unit further includes:
(5) a headphone jack externally accessible from said relatively small housing and adapted to releasably electrically connect to an external headphone system.

14. An education apparatus according to claim 1, wherein said portable unit further includes:
(5) at least one cradle connection accessible from the exterior of said relatively small housing and adapted to releasably mechanically and electrically couple with said cradle system when said portable unit is placed therein.

15. An education apparatus according to claim 1, wherein said cradle system includes:
(1) a plurality of electrical connections to allow peripheral devices to electrically connect through said cradle system to said portable unit, including at least one of the following peripheral devices: an external keyboard, an external power supply system, an external battery charger, a video camera system, a CD/DVD system, a network interface system, a telephone modem, a universal serial bus port.

16. An education apparatus according to claim 1, wherein said cradle system facilitates the bidirectional communication of information between said school network and said portable unit.

17. An education apparatus according to claim 1, wherein connection of said portable unit to said cradle system initiates a relatively automatic replication of predetermined datasets between said school network and databases maintained in said memory of said portable unit.

18. An education apparatus according to claim 1, wherein said school network includes a local area network hub which facilitates communication between said portable unit and said school network.

19. An education apparatus according to claim 1, wherein said school network includes a local area network hub which facilitates communication between said portable unit issued to said student and other portable units issued to school personnel through a data replication process which relatively automatically moves predetermined datasets between said portable units and said school network.

20. An education apparatus according to claim 1, wherein said school network maintains a plurality of databases including at least one of the following databases: a teacher database, an administration database, a student database, a parent database, and a biometrics database.

21. An education apparatus according to claim 1, wherein said school network includes means for displaying content on an electrically actuable large format screen display.

22. An education apparatus according to claim 1, wherein said school network includes a means for receiving and delivering audio information in a classroom environment.

23. An education apparatus according to claim 1, wherein said school network further includes at least one network interface which facilitates communication through at least one of a local area network and a wide area network during education activities.

24. A method of educating a student, comprising:
(a) providing and issuing to said student by a school a portable unit, including:
(1) a relatively small housing;
(2) a touch-sensitive screen carried by said relatively small housing, dimensioned to generally correspond to a preselected page format;
(3) a central processing unit and associated memory located in said relatively small housing for recording programs and data and for executing program instructions;
(4) at least one biometric reader system for securing selected data carried in said memory;
(5) a cradle system for releasable electrically coupling to said portable unit;
(b) providing a school network, and said network through said cradle system to said portable unit;
(c) presenting course materials to said student during a course book mode of operation wherein course materials are presented to said student through said portable unit;

(d) presenting homework during a homework mode of operation wherein homework exercises are assigned, presented, recorded, and returned through coordinated operation of said portable unit and said school network;

(e) maintaining school records during a school record mode of operation wherein school-related records are maintained at least in part in said portable unit and at least in part in said school network; and (f) communicating during a home-to-school communication mode of operation wherein bi-directional communication is facilitated between parents of said student and school officials, including teachers, through coordinated operation of said portable unit and said school network.

25. A method of educating according to claim 24, wherein said portable unit of said education apparatus further includes:

(6) an audio output device carried by said relatively small housing for outputting audio messages.

26. A method of educating according to claim 24, wherein said portable unit of said education apparatus further includes:

(6) a microphone carried by said relatively small housing for receiving audio input from at least one of said student and said student's parents.

27. A method of educating according to claim 24, wherein said portable unit of said education apparatus further includes:

(6) a biometric on-button operatively associated with said at least one biometric reader system for receiving instructions to change the operating state of said portable unit, while simultaneously receiving biometric input data.

28. A method of educating according to claim 24, wherein said portable unit of said education apparatus further includes:

(6) at least one unique identifier relatively permanently associated with said portable unit including at least one of the following identifiers: a nameplate in a human-readable format, a serial number in a human-readable format, a serial number in a barcode readable format, an electronic recordation of the student's name, an electronic recordation of the serial number associated with said portable unit, an electronic recordation of at least one biometric measurement which is uniquely associated with said portable unit and operatively associated with said at least one biometric reader system.

29. A method of educating according to claim 24, wherein said portable unit further includes:

(6) a stylus releasably carried by said relatively small housing.

30. A method of educating according to claim 24, wherein said portable unit further includes:

(6) a stylus with a plurality of stylus tips, with at least one tip utilized for touch-sensitive interaction with said touch-sensitive screen of said portable unit, and at least one stylus tip adapted to allow said student to mark on at least one relatively transparent overlay sheet adapted to be registered with said touch-sensitive screen.

31. A method of educating according to claim 24, wherein said portable unit further includes:

(6) a rechargeable power supply carried within said relatively small housing and utilized to provide electrical power to electrical power consuming components carried by said relatively small housing including said central processing unit and said at least one biometric reader system when said portable unit is not cradled into said cradle system.

32. A method of educating according to claim 24, wherein said portable unit further includes:

(6) a communication system carried by said relatively small housing adapted to allow at least one of wide area network and local area network bidirectional communication with communicants remotely located from said portable unit.

33. A method of educating according to claim 24, wherein said portable unit further includes:

(6) a handgrip aperture formed at a distal end of said relatively small housing adapted to be engaged by one hand of said user during transporting said portable unit about.

34. A method of educating according to claim 24, wherein said portable unit further includes:

(6) an external connection for releasable electrical connection to an external power source which at least supplements an internal battery pack carried by said portable unit.

35. A method of educating according to claim 24, wherein said portable unit further includes:

(6) an external microphone jack carried by said relatively small housing adapted to electrically releasably engage with an external microphone.

36. A method of educating according to claim 24, wherein said portable unit further includes:

(6) a headphone jack externally accessible from said relatively small housing and adapted to releasably electrically connect to an external headphone system.

37. A method of educating according to claim 24, wherein said portable unit further includes:

(6) at least one cradle connection accessible from the exterior of said relatively small housing and adapted to releasably mechanically and electrically couple with said cradle system when said portable unit is placed therein.

38. A method of educating according to claim 24, wherein said cradle system includes:

(1) a plurality of electrical connections to allow peripheral devices to electrically connect through said cradle system to said portable unit, including at least one of the following peripheral devices: an external keyboard, an external power supply system, an external battery charger, a video camera system, a CD/DVD system, a network interface system, a telephone modem, a universal serial bus port.

39. A method of educating according to claim 24, wherein said cradle system facilitates the bidirectional communication of information between said school network and said portable unit.

40. A method of educating according to claim 24, wherein connection of said portable unit to said cradle system initiates a relatively automatic replication of predetermined datasets between said school network and databases maintained in said memory of said portable unit.

41. A method of educating according to claim 24, wherein said school network includes a local area network hub which facilitates communication between said portable unit and said school network.

42. A method of educating according to claim 24, wherein said school network includes a local area network hub which facilitates communication between said portable unit issued to said student and other portable units issued to school personnel through a data replication process which relatively automatically moves predetermined data sets between said portable units and said school network.

43. A method of educating according to claim 24, wherein said school network maintains a plurality of databases including at least one of the following databases: a teacher database, an administration database, a student database, a parent database, and a biometrics database.

44. A method of educating according to claim 24, wherein said school network includes means for displaying content on an electrically actuable large format screen display.

45. A method of educating according to claim 24, wherein said school network includes a means for receiving and delivering audio information in a classroom environment.

46. A method of educating according to claim 24, wherein said school network further includes at least one network interface which facilitates communication through at least one of a local area network and a wide area network during education activities.

* * * * *